US010887193B2

(12) United States Patent
Carrigan et al.

(10) Patent No.: US 10,887,193 B2
(45) Date of Patent: Jan. 5, 2021

(54) USER INTERFACES FOR UPDATING NETWORK CONNECTION SETTINGS OF EXTERNAL DEVICES

(71) Applicant: Apple Inc., Cupertino, CA (US)

(72) Inventors: Taylor G. Carrigan, San Francisco, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 58 days.

(21) Appl. No.: 16/144,264

(22) Filed: Sep. 27, 2018

(65) Prior Publication Data
US 2019/0372862 A1   Dec. 5, 2019

Related U.S. Application Data

(60) Provisional application No. 62/679,947, filed on Jun. 3, 2018.

(51) Int. Cl.
*G06F 15/173* (2006.01)
*H04L 12/24* (2006.01)

(52) U.S. Cl.
CPC .......... *H04L 41/22* (2013.01); *H04L 41/0813* (2013.01); *H04L 41/0876* (2013.01); *H04L 41/0889* (2013.01); *H04L 41/12* (2013.01)

(58) Field of Classification Search
CPC ..... H04L 41/22; H04L 41/12; H04L 41/0883; H04L 41/0803; H04W 8/005; H04M 1/72533
See application file for complete search history.

(56) References Cited

U.S. PATENT DOCUMENTS 4,803,487 A   2/1989   Willard et al.
5,617,031 A   4/1997   Tuttle
(Continued)

FOREIGN PATENT DOCUMENTS

CN   1556955 A   12/2004
CN   1705346 A   12/2005
(Continued)

OTHER PUBLICATIONS

Corrected Notice of Allowance received for U.S. Appl. No. 14/839,897, dated Jan. 23, 2019, 6 pages.
(Continued)

*Primary Examiner* — Suraj M Joshi
*Assistant Examiner* — Jaren Means
(74) *Attorney, Agent, or Firm* — Dentons US LLP

(57) ABSTRACT

The present disclosure generally relates to managing network connection settings of external devices. In some embodiments, an electronic device with a display and one or more wireless antennas, while the electronic device is connected, via the one or more wireless antennas, to a first local area network, displays a first external device management interface, wherein: the first external device management interface is associated with a first external device that is not connected to the first local area network; and the first external device management interface includes a first affordance. The electronic device receives a user input corresponding to selection of the first affordance and, in response to receiving the user input corresponding to selection of the first affordance, causes the first external device to connect to the first local area network.

30 Claims, 36 Drawing Sheets

(56) References Cited

U.S. PATENT DOCUMENTS

| | | |
|---|---|---|
| 5,825,353 A | 10/1998 | Will |
| 5,853,327 A | 12/1998 | Gilboa |
| 6,167,353 A | 12/2000 | Piernot et al. |
| 6,190,174 B1 | 2/2001 | Lam |
| 6,359,837 B1 | 3/2002 | Tsukamoto |
| 6,429,896 B1 | 8/2002 | Aruga et al. |
| 6,522,347 B1 | 2/2003 | Sakai et al. |
| 6,809,724 B1 | 10/2004 | Shiraishi et al. |
| 6,809,759 B1 | 10/2004 | Chiang |
| 6,819,867 B2 | 11/2004 | Mayer, Jr. et al. |
| 6,889,138 B1 | 5/2005 | Krull et al. |
| 7,463,304 B2 | 12/2008 | Murray |
| 7,653,883 B2 | 1/2010 | Hotelling et al. |
| 7,656,393 B2 | 2/2010 | King et al. |
| 7,843,471 B2 | 11/2010 | Doan et al. |
| 7,905,815 B2 | 3/2011 | Ellis et al. |
| 8,189,087 B2 | 5/2012 | Misawa et al. |
| 8,624,836 B1 | 1/2014 | Miller et al. |
| 8,675,084 B2 | 3/2014 | Bolton et al. |
| 8,742,890 B2 | 6/2014 | Gocho et al. |
| 8,762,895 B2 | 6/2014 | Mehta et al. |
| 8,894,462 B2 | 11/2014 | Leyland et al. |
| 8,983,539 B1 | 3/2015 | Kim et al. |
| 9,146,124 B2 | 9/2015 | Parada et al. |
| 9,172,866 B2 | 10/2015 | Ito et al. |
| 9,405,766 B2 | 8/2016 | Robbin et al. |
| 9,423,868 B2 | 8/2016 | Iwasaki |
| 9,451,144 B2 | 9/2016 | Dye |
| 9,544,563 B1 | 1/2017 | Cheng et al. |
| 9,547,419 B2 | 1/2017 | Yang et al. |
| 9,574,896 B2 | 2/2017 | McGavran et al. |
| 9,628,950 B1 | 4/2017 | Noeth et al. |
| 9,652,741 B2 | 5/2017 | Goldberg et al. |
| 9,820,323 B1 | 11/2017 | Young et al. |
| 9,892,715 B2 | 2/2018 | Komulainen et al. |
| 9,942,463 B2 | 4/2018 | Kuo et al. |
| 9,973,674 B2 | 5/2018 | Dye et al. |
| 10,135,905 B2 | 11/2018 | Chaudhri et al. |
| 10,216,392 B2 | 2/2019 | Zhao |
| 10,299,300 B1 | 5/2019 | Young |
| 2001/0031622 A1 | 10/2001 | Kivela et al. |
| 2002/0068600 A1 | 6/2002 | Chihara et al. |
| 2002/0140803 A1 | 10/2002 | Gutta et al. |
| 2002/0142734 A1 | 10/2002 | Wickstead |
| 2002/0171737 A1 | 11/2002 | Tullis et al. |
| 2003/0025802 A1 | 2/2003 | Mayer, Jr. et al. |
| 2003/0128237 A1 | 7/2003 | Sakai |
| 2003/0151982 A1 | 8/2003 | Brewer et al. |
| 2003/0171984 A1 | 9/2003 | Wodka et al. |
| 2004/0044953 A1 | 3/2004 | Watkins et al. |
| 2004/0100389 A1 | 5/2004 | Naito et al. |
| 2005/0117601 A1 | 6/2005 | Anderson et al. |
| 2005/0134695 A1 | 6/2005 | Deshpande et al. |
| 2005/0237194 A1 | 10/2005 | Voba |
| 2006/0079973 A1 | 4/2006 | Bacharach |
| 2006/0135064 A1 | 6/2006 | Cho et al. |
| 2006/0217104 A1 | 9/2006 | Cho |
| 2007/0025711 A1 | 2/2007 | Marcus et al. |
| 2007/0040810 A1 | 2/2007 | Dowe et al. |
| 2007/0096283 A1 | 5/2007 | Ljung et al. |
| 2007/0109417 A1 | 5/2007 | Hyttfors et al. |
| 2007/0165103 A1 | 7/2007 | Arima et al. |
| 2007/0191008 A1 | 8/2007 | Bucher et al. |
| 2007/0254640 A1 | 11/2007 | Bliss |
| 2007/0259654 A1 | 11/2007 | Oijer |
| 2008/0004113 A1 | 1/2008 | Avery et al. |
| 2008/0077673 A1 | 3/2008 | Thomas |
| 2008/0120029 A1 | 5/2008 | Zelek et al. |
| 2008/0165136 A1 | 7/2008 | Christie et al. |
| 2008/0214191 A1 | 9/2008 | Yach et al. |
| 2008/0259829 A1 | 10/2008 | Rosenblatt |
| 2008/0284855 A1 | 11/2008 | Umeyama et al. |
| 2009/0060170 A1 | 3/2009 | Coughlan et al. |
| 2009/0088207 A1 | 4/2009 | Sweeney et al. |
| 2009/0102933 A1 | 4/2009 | Harris et al. |
| 2009/0144391 A1 | 6/2009 | Jung et al. |
| 2009/0195402 A1 | 8/2009 | Izadi et al. |
| 2009/0195497 A1 | 8/2009 | Fitzgerald et al. |
| 2009/0203315 A1 | 8/2009 | Kawabata et al. |
| 2009/0207743 A1 | 8/2009 | Huq et al. |
| 2009/0222748 A1 | 9/2009 | Lejeune et al. |
| 2009/0228868 A1 | 9/2009 | Forstall et al. |
| 2009/0231960 A1 | 9/2009 | Hutcheson |
| 2009/0239587 A1 | 9/2009 | Negron et al. |
| 2009/0311993 A1 | 12/2009 | Horodezky |
| 2009/0315671 A1 | 12/2009 | Gocho et al. |
| 2009/0325630 A1 | 12/2009 | Tiitola et al. |
| 2010/0026640 A1 | 2/2010 | Kim et al. |
| 2010/0138764 A1 | 6/2010 | Hatambeiki et al. |
| 2010/0149090 A1 | 6/2010 | Morris et al. |
| 2010/0162160 A1 | 6/2010 | Stallings et al. |
| 2010/0178873 A1 | 7/2010 | Lee et al. |
| 2010/0228836 A1 | 9/2010 | Lehtovirta et al. |
| 2010/0287513 A1 | 11/2010 | Singh et al. |
| 2010/0289910 A1 | 11/2010 | Kamshilin et al. |
| 2011/0058052 A1 | 3/2011 | Bolton et al. |
| 2011/0059769 A1 | 3/2011 | Brunolli |
| 2011/0081860 A1 | 4/2011 | Brown et al. |
| 2011/0106921 A1 | 5/2011 | Brown et al. |
| 2011/0115932 A1 | 5/2011 | Shin et al. |
| 2011/0153628 A1 | 6/2011 | Basu et al. |
| 2011/0159469 A1 | 6/2011 | Hwang et al. |
| 2011/0159927 A1 | 6/2011 | Choi |
| 2012/0019400 A1 | 1/2012 | Patel et al. |
| 2012/0044062 A1 | 2/2012 | Jersa et al. |
| 2012/0051560 A1 | 3/2012 | Sanders |
| 2012/0069206 A1 | 3/2012 | Hsieh |
| 2012/0071146 A1 | 3/2012 | Shrivastava et al. |
| 2012/0089300 A1 | 4/2012 | Wolterman |
| 2012/0115608 A1 | 5/2012 | Pfeifer et al. |
| 2012/0120277 A1 | 5/2012 | Tsai et al. |
| 2012/0192094 A1 | 7/2012 | Goertz |
| 2012/0198531 A1 | 8/2012 | Ort et al. |
| 2012/0236037 A1 | 9/2012 | Lessing et al. |
| 2012/0287290 A1 | 11/2012 | Jain |
| 2012/0316777 A1 | 12/2012 | Kitta |
| 2012/0320141 A1 | 12/2012 | Bowen et al. |
| 2013/0027341 A1 | 1/2013 | Mastandrea |
| 2013/0038771 A1 | 2/2013 | Brunner et al. |
| 2013/0057472 A1 | 3/2013 | Dizac et al. |
| 2013/0065482 A1 | 3/2013 | Trickett |
| 2013/0076591 A1 | 3/2013 | Sirpal et al. |
| 2013/0085931 A1 | 4/2013 | Runyan |
| 2013/0093904 A1 | 4/2013 | Wagner et al. |
| 2013/0106603 A1 | 5/2013 | Weast et al. |
| 2013/0117693 A1 | 5/2013 | Anderson et al. |
| 2013/0125016 A1 | 5/2013 | Pallakoff et al. |
| 2013/0134212 A1 | 5/2013 | Chang |
| 2013/0141325 A1 | 6/2013 | Bailey |
| 2013/0141331 A1 | 6/2013 | Shiu et al. |
| 2013/0141362 A1 | 6/2013 | Asanuma et al. |
| 2013/0166679 A1 | 6/2013 | Kuwahara |
| 2013/0201098 A1 | 8/2013 | Schilit et al. |
| 2013/0219285 A1 | 8/2013 | Iwasaki |
| 2013/0219303 A1 | 8/2013 | Eriksson et al. |
| 2013/0222270 A1 | 8/2013 | Winkler et al. |
| 2013/0223279 A1 | 8/2013 | Tinnakornsrisuphap et al. |
| 2013/0286251 A1 | 10/2013 | Wood et al. |
| 2013/0329074 A1 | 12/2013 | Zhang et al. |
| 2013/0331130 A1 | 12/2013 | Lee |
| 2013/0339436 A1 | 12/2013 | Gray |
| 2013/0346882 A1 | 12/2013 | Shiplacoff et al. |
| 2014/0006949 A1 | 1/2014 | Briand et al. |
| 2014/0007021 A1 | 1/2014 | Akiyama et al. |
| 2014/0015546 A1 | 1/2014 | Frederick |
| 2014/0022399 A1 | 1/2014 | Rashid et al. |
| 2014/0033100 A1 | 1/2014 | Noda et al. |
| 2014/0037107 A1 | 2/2014 | Marino, Jr. et al. |
| 2014/0040831 A1 | 2/2014 | Akasaka et al. |
| 2014/0073252 A1 | 3/2014 | Lee et al. |
| 2014/0075311 A1 | 3/2014 | Boettcher et al. |
| 2014/0078371 A1 | 3/2014 | Kinoshita et al. |
| 2014/0084857 A1 | 3/2014 | Liu et al. |
| 2014/0104449 A1 | 4/2014 | Masarik et al. |

(56) References Cited

U.S. PATENT DOCUMENTS

| | | |
|---|---|---|
| 2014/0118563 A1 | 5/2014 | Mehta et al. |
| 2014/0122331 A1 | 5/2014 | Vaish et al. |
| 2014/0123043 A1 | 5/2014 | Schmidt et al. |
| 2014/0142851 A1 | 5/2014 | Larmo et al. |
| 2014/0143678 A1 | 5/2014 | Mistry et al. |
| 2014/0143737 A1 | 5/2014 | Mistry et al. |
| 2014/0149859 A1 | 5/2014 | Van Dyken et al. |
| 2014/0156801 A1 | 6/2014 | Fernandes et al. |
| 2014/0160033 A1 | 6/2014 | Brikman et al. |
| 2014/0160304 A1 | 6/2014 | Galor et al. |
| 2014/0164544 A1 | 6/2014 | Gagneraud |
| 2014/0167986 A1 | 6/2014 | Parada et al. |
| 2014/0173455 A1 | 6/2014 | Shimizu et al. |
| 2014/0180582 A1 | 6/2014 | Pontarelli et al. |
| 2014/0184524 A1 | 7/2014 | Schiefer et al. |
| 2014/0191715 A1 | 7/2014 | Wechlin et al. |
| 2014/0204229 A1 | 7/2014 | Leung et al. |
| 2014/0210708 A1 | 7/2014 | Simmons et al. |
| 2014/0218599 A1 | 8/2014 | Nakamura et al. |
| 2014/0228063 A1 | 8/2014 | Harris et al. |
| 2014/0237389 A1 | 8/2014 | Ryall et al. |
| 2014/0240577 A1 | 8/2014 | Masugi |
| 2014/0273975 A1 | 9/2014 | Barat et al. |
| 2014/0282068 A1 | 9/2014 | Levkovitz et al. |
| 2014/0310598 A1 | 10/2014 | Sprague et al. |
| 2014/0320387 A1 | 10/2014 | Eriksson et al. |
| 2014/0337450 A1 | 11/2014 | Choudhary et al. |
| 2014/0337748 A1 | 11/2014 | Lee |
| 2014/0343843 A1 | 11/2014 | Yanku |
| 2014/0359481 A1 | 12/2014 | Dawson et al. |
| 2014/0365113 A1 | 12/2014 | Mcgavran et al. |
| 2014/0368719 A1 | 12/2014 | Gando et al. |
| 2014/0370807 A1 | 12/2014 | Lei et al. |
| 2015/0017956 A1 | 1/2015 | Jeong |
| 2015/0022674 A1 | 1/2015 | Koss et al. |
| 2015/0035762 A1 | 2/2015 | Lu |
| 2015/0049233 A1 | 2/2015 | Choi |
| 2015/0061972 A1 | 3/2015 | Seo et al. |
| 2015/0065035 A1 | 3/2015 | Kim et al. |
| 2015/0067580 A1 | 3/2015 | Um et al. |
| 2015/0094031 A1 | 4/2015 | Liu |
| 2015/0094050 A1 | 4/2015 | Bowles et al. |
| 2015/0094093 A1 | 4/2015 | Pierce et al. |
| 2015/0131121 A1 | 5/2015 | Kang |
| 2015/0189162 A1 | 7/2015 | Kuo et al. |
| 2015/0194050 A1 | 7/2015 | Lee |
| 2015/0243246 A1 | 8/2015 | Mun et al. |
| 2015/0264202 A1 | 9/2015 | Pawlowski |
| 2015/0287403 A1 | 10/2015 | Holzer zaslansky et al. |
| 2015/0297185 A1 | 10/2015 | Mccormack et al. |
| 2015/0358043 A1 | 12/2015 | Jeong et al. |
| 2016/0014266 A1 | 1/2016 | Bhatt |
| 2016/0018846 A1 | 1/2016 | Zenoff |
| 2016/0021168 A1 | 1/2016 | Chaudhri et al. |
| 2016/0028869 A1 | 1/2016 | Bhatt |
| 2016/0043905 A1 | 2/2016 | Fiedler |
| 2016/0048369 A1 | 2/2016 | Zenoff |
| 2016/0048370 A1 | 2/2016 | Zenoff |
| 2016/0050476 A1 | 2/2016 | Patil |
| 2016/0061613 A1 | 3/2016 | Jung et al. |
| 2016/0062567 A1 | 3/2016 | Yang et al. |
| 2016/0062572 A1 | 3/2016 | Yang et al. |
| 2016/0116941 A1 | 4/2016 | Kuwabara et al. |
| 2016/0134737 A1 | 5/2016 | Pulletikurty |
| 2016/0156597 A1 | 6/2016 | Meng et al. |
| 2016/0195864 A1* | 7/2016 | Kim .................. H04L 12/2816 709/221 |
| 2016/0202866 A1 | 7/2016 | Zambetti |
| 2016/0209939 A1 | 7/2016 | Zambetti et al. |
| 2016/0246566 A1 | 8/2016 | Fullerton et al. |
| 2016/0259489 A1 | 9/2016 | Yang |
| 2016/0260414 A1 | 9/2016 | Yang |
| 2016/0269176 A1 | 9/2016 | Pang et al. |
| 2016/0337206 A1* | 11/2016 | Bugenhagen .......... H04L 12/28 |
| 2016/0345039 A1 | 11/2016 | Billmeyer |
| 2017/0006210 A1 | 1/2017 | Dye et al. |
| 2017/0011210 A1 | 1/2017 | Cheong et al. |
| 2017/0031648 A1 | 2/2017 | So et al. |
| 2017/0083188 A1 | 3/2017 | Yang et al. |
| 2017/0134553 A1 | 5/2017 | Jeon et al. |
| 2017/0160098 A1 | 6/2017 | Mcgavran et al. |
| 2017/0185373 A1 | 6/2017 | Kim et al. |
| 2017/0195772 A1 | 7/2017 | Han et al. |
| 2017/0205854 A1 | 7/2017 | Zenoff |
| 2017/0322713 A1 | 11/2017 | Hwang et al. |
| 2017/0357477 A1 | 12/2017 | Im et al. |
| 2018/0069957 A1 | 3/2018 | Mushikabe et al. |
| 2018/0262677 A1 | 9/2018 | Dye et al. |
| 2018/0329585 A1 | 11/2018 | Carrigan et al. |
| 2018/0329586 A1 | 11/2018 | Sundstrom et al. |
| 2018/0341448 A1 | 11/2018 | Behzadi et al. |
| 2019/0037004 A1 | 1/2019 | Chaudhri et al. |
| 2019/0121300 A1 | 4/2019 | Peterson et al. |
| 2019/0146422 A1 | 5/2019 | Meyer et al. |
| 2019/0187861 A1 | 6/2019 | Yang |
| 2019/0265849 A1 | 8/2019 | Yang et al. |
| 2019/0306607 A1 | 10/2019 | Clayton et al. |
| 2020/0159374 A1 | 5/2020 | Yang et al. |
| 2020/0213437 A1 | 7/2020 | Bhatt |

FOREIGN PATENT DOCUMENTS

| | | |
|---|---|---|
| CN | 101243383 A | 8/2008 |
| CN | 101427574 A | 5/2009 |
| CN | 101433034 A | 5/2009 |
| CN | 202309894 U | 7/2012 |
| CN | 102830795 A | 12/2012 |
| CN | 103970208 A | 8/2014 |
| CN | 104024987 A | 9/2014 |
| CN | 203930358 U | 11/2014 |
| CN | 104205785 A | 12/2014 |
| CN | 104272854 A | 1/2015 |
| CN | 104281430 A | 1/2015 |
| CN | 104346297 A | 2/2015 |
| CN | 104956182 A | 9/2015 |
| EP | 836074 A2 | 4/1998 |
| EP | 1406176 A1 | 4/2004 |
| EP | 1614992 A1 | 1/2006 |
| EP | 1705883 A1 | 9/2006 |
| EP | 1858238 A2 | 11/2007 |
| EP | 1953663 A1 | 8/2008 |
| EP | 2096413 A1 | 9/2009 |
| EP | 2306692 A1 | 4/2011 |
| EP | 2367098 A2 | 9/2011 |
| EP | 2428947 A2 | 3/2012 |
| EP | 2466260 A1 | 6/2012 |
| EP | 2523439 A1 | 11/2012 |
| EP | 2632131 A1 | 8/2013 |
| EP | 2720442 A1 | 4/2014 |
| EP | 2892240 A1 | 7/2015 |
| EP | 3032537 A2 | 6/2016 |
| EP | 3057342 A1 | 8/2016 |
| EP | 3073703 A1 | 9/2016 |
| EP | 3276905 A1 | 1/2018 |
| EP | 3379853 A1 | 9/2018 |
| GB | 2402105 A | 12/2004 |
| JP | 11-183183 A | 7/1999 |
| JP | 2009-502048 A | 1/2009 |
| JP | 2014-53692 A | 3/2014 |
| JP | 2014-123169 A | 7/2014 |
| TW | 201012152 A | 3/2010 |
| TW | 201215086 A | 4/2012 |
| TW | M474482 U | 3/2014 |
| TW | 201509168 A | 3/2015 |
| WO | 2007/008321 A2 | 1/2007 |
| WO | 2007/105937 A1 | 9/2007 |
| WO | 2007/142703 A1 | 12/2007 |
| WO | 2007/149731 A1 | 12/2007 |
| WO | 2011/063516 A1 | 6/2011 |
| WO | 2012/172970 A1 | 12/2012 |
| WO | 2013/169849 A2 | 11/2013 |
| WO | 2013/169875 A2 | 11/2013 |
| WO | 2014/171734 A2 | 10/2014 |

(56) References Cited

FOREIGN PATENT DOCUMENTS

| WO | 2015/061831 A1 | 5/2015 |
|---|---|---|
| WO | 2018/084802 A1 | 5/2018 |
| WO | 2018/098136 A1 | 5/2018 |

OTHER PUBLICATIONS

Notice of Allowance received for U.S. Appl. No. 14/839,903, dated Jan. 3, 2019, 7 pages.
Office Action received for Chinese Patent Application No. 201610084974.1, dated Dec. 5, 2018, 6 pages (3 pages of English Translation and 3 pages of Official Copy).
Office Action received for European Patent Application No. 17184710.6, dated Dec. 21, 2018, 7 pages.
Notice of Acceptance received for Australian Patent Application No. 2018247345, dated May 15, 2019, 3 pages.
Decision on Appeal received for U.S. Appl. No. 14/863,099, mailed on Aug. 22, 2019, 9 pages.
Brief Communication regarding Oral Proceedings received for European Patent Application No. 17184710.6, dated Feb. 19, 2020, 2 pages.
Office Action received for Chinese Patent Application No. 201580077218.X, dated Feb. 3, 2020, 23 pages (6 pages of English Translation and 17 pages of Official Copy).
Result of Consultation received for European Patent Application No. 17184710.6, dated Feb. 21, 2020, 6 pages.
Result of Consultation received for European Patent Application No. 17184710.6, dated Feb. 28, 2020, 3 pages.
Chenzai, "Apple, please don't screw up notifications on the Apple Watch", Available online at:—https://digi.tech.qq.com/a/20140918/060747.htm. also published on the English webpage https://www.theverge.com/2014/9/9/6127913/apple-please-dont-screw-up-notifications-on-the-apple-watch, Sep. 18, 2014, 8 pages (4 pages of English Translation and 4 pages of Official Copy).
Notice of Allowance received for U.S. Appl. No. 16/407,584, dated Oct. 28, 2019, 5 pages.
Office Action received for Chinese Patent Application No. 201710657424.9, dated Sep. 17, 2019, 23 pages (11 pages of English Translation and 12 pages of Official Copy).
Notice of Allowance received for U.S. Appl. No. 15/366,607, dated Apr. 2, 2019, 2 pages.
Brief Communication regarding Oral Proceedings received for European Patent Application No. 17184710.6, dated Mar. 9, 2020, 2 pages.
Non-Final Office Action received for U.S. Appl. No. 16/281,838, dated Mar. 26, 2020, 18 pages.
International Search Report and Written Opinion received for PCT Patent Application No. PCT/US2019/024792, dated Jul. 18, 2019, 13 pages.
Notice of Allowance received for Chinese Patent Application No. 201610084974.1, dated Aug. 5, 2019, 2 pages (1 page of English Translation and 1 page of Official Copy).
Non-Final Office Action received for U.S. Appl. No. 16/407,584, dated Jul. 10, 2019, 8 pages.
Office Action received for Japanese Patent Application No. 2018-126311, dated Nov. 2, 2018, 4 pages (2 pages of English Translation and 2 pages of official copy).
Nozawa Naoki, et al., "iPad Perfect Manual for iOS 4", JPN, SOTEC Ltd., Yanagisawa Junichi, Dec. 31, 2010, pp. 189-190 (Official Copy Only) (See Communication under 37 CFR § 1.98(a) (3)).
Corrected Notice of Allowance received for U.S. Appl. No. 14/839,903, dated Mar. 1, 2019, 2 pages.
Decision on Appeal received for U.S. Appl. No. 14/774,664, mailed on Sep. 12, 2019, 8 pages.
Notice of Allowance received for Chinese Patent Application No. 201810321928.8, dated Sep. 11, 2019, 2 pages (1 page of English Translation and 1 page of Official Copy).

Summons to Attend Oral Proceedings received for European Patent Application No. 17184710.6, mailed on Sep. 17, 2019, 7 pages.
"3C Blogger Kisplay Share", Samsung Galaxy Tab S Hands-on SideSync 3.0 Is Amazing, Jul. 4, 2014, 4 pages (Official Copy only) (See Communication under 37 CFR § 1.98(a) (3)).
"Axiang's Network Notebook, Deep Analysis on Samsung's 2013 New Flagship: tell you what kind of mobile phone Galaxy S4 is!", Online Available at: <https://axiang.cc/archives/6115>, Apr. 22, 2013, 4 pages (Official Copy only) (See Communication under 37 CFR § 1.98(a) (3)).
Corrected Notice of Allowance received for U.S. Appl. No. 15/268,115, dated Apr. 13, 2018, 11 pages.
Corrected Notice of Allowance received for U.S. Appl. No. 15/268,115, dated Mar. 21, 2018, 9 pages.
Decision to Grant received for Danish Patent Application No. PA201570664, dated Feb. 20, 2017, 2 pages.
Decision to grant received for Danish Patent Application No. PA201570788, dated Jul. 10, 2017, 2 pages.
Decision to Grant received for Danish Patent Application No. PA201570791, dated Jun. 7, 2017, 2 pages.
Decision to Grant received for European Patent Application No. 15712218.5, dated Jun. 7, 2018, 2 pages.
"DslrDashboard", Online Available at: <https://www.youtube.com/watch?v=DD4dCVinreU >, Dec. 10, 2013, 1 page.
Extended European Search Report (includes Supplementary European Search Report and Search Opinion) received for European Patent Application No. 17184710.6, dated Nov. 28, 2017, 10 pages.
Final Office Action received for U.S. Appl. No. 14/839,897, dated Jan. 10, 2018, 16 pages.
Final Office Action received for U.S. Appl. No. 15/268,115, dated Oct. 11, 2017, 48 pages.
Final Office Action received for U.S. Appl. No. 14/839,903, dated Sep. 18, 2018, 11 pages.
"GT-19500 (Galaxy S4) User Manual, Samsung", Rev.1.1, May, 2013, 14 pages. (Official Copy only) (See Communication under 37 CFR § 1.98(a) (3)).
Intention to Grant received for Danish Patent Application No. PA201570773, dated Mar. 9, 2018, 2 pages.
Intention to Grant received for Danish Patent Application No. PA201570788, dated Mar. 27, 2017, 2 pages.
Intention to Grant received for Danish Patent Application No. PA201570791, dated Mar. 7, 2017, 2 pages.
Intention to Grant received for European Patent Application No. 15712218.5, dated Jan. 24, 2018, 7 pages.
International Preliminary Report on Patentability received for PCT Patent Application No. PCT/US2015/019298, dated Mar. 16, 2017, 12 pages.
International Preliminary Report on Patentability received for PCT Patent Application No. PCT/US2015/041424, dated Feb. 2, 2017, 13 Pages.
International Preliminary Report on Patentability received for PCT Patent Application No. PCT/US2015/047507, dated Mar. 16, 2017, 16 pages.
International Preliminary Report on Patentability received for PCT Patent Application No. PCT/US2015/055165, dated Sep. 21, 2017, 15 pages.
International Preliminary Report on Patentability received for PCT Patent Application No. PCT/US2016/016621, dated Aug. 24, 2017, 8 pages.
International Search Report and Written Opinion received for PCT Patent Application No. PCT/US2016/016621, dated May 9, 2016, 12 pages.
Non-Final Office Action received for U.S. Appl. No. 14/805,403, dated Nov. 16, 2017, 21 pages.
Non-Final Office Action received for U.S. Appl. No. 14/839,897, dated May 18, 2017 ,11 pages.
Non-Final Office Action received for U.S. Appl. No. 14/839,903, dated Feb. 26, 2018 ,10 pages.
Non-Final Office Action received for U.S. Appl. No. 14/839,913, dated Jul. 28, 2016, 12 pages.
Non-Final Office Action received for U.S. Appl. No. 14/864,011, dated Jun. 10, 2016 ,10 pages.

(56) References Cited

OTHER PUBLICATIONS

Non-Final Office Action received for U.S. Appl. No. 15/268,115, dated Apr. 13, 2017, 44 pages.
Non-Final Office Action received for U.S. Appl. No. 15/433,238, dated Nov. 3, 2017, 6 pages.
Notice of Acceptance received for Australian Patent Application No. 2015385757, dated Jul. 16, 2018, 3 pages.
Notice of Allowance received for Chinese Patent Application No. 201580046237.6, dated Aug. 29, 2018, 4 pages (1 page of English Translation and 3 pages of Official copy).
Notice of Allowance received for Danish Patent Application No. PA201570771, dated Sep. 2, 2016, 2 pages.
Notice of Allowance received for Danish Patent Application No. PA201570773, dated Apr. 26, 2018, 2 pages.
Notice of Allowance received for Japanese Patent Application No. 2017-545733, dated Jun. 1, 2018, 4 pages (1 page of English Translation and 3 pages of Official copy).
Notice of Allowance received for Taiwanese Patent Application No. 104107328, dated Jun. 12, 2017, 3 pages (Official Copy Only) (See Communication under 37 CFR § 1.98(a) (3)).
Notice of Allowance received for Taiwanese Patent Application No. 104123593, dated Oct. 1, 2018, 6 pages (3 pages of English Translation and 3 pages Official Copy).
Notice of Allowance received for Taiwanese Patent Application No. 104128700, dated Mar. 27, 2017, 3 pages (Official Copy only) (See Communication under 37 CFR § 1.98(a) (3)).
Notice of Allowance received for Taiwanese Patent Application No. 104133756, dated Nov. 30, 2017, 5 pages (2 pages of English Translation and 3 pages of Official Copy).
Notice of Allowance received for Taiwanese Patent Application No. 104133757, dated Jan. 18, 2017, 3 pages (Official Copy only) (See Communication under 37 CFR § 1.98(a) (3)).
Notice of Allowance received for U.S. Appl. No. 14/641,251, dated Jun. 17, 2016, 2 pages.
Notice of Allowance received for U.S. Appl. No. 14/641,251, dated May 18, 2016, 13 pages.
Notice of Allowance received for U.S. Appl. No. 14/805,403, dated Jul. 11, 2018, 15 pages.
Notice of Allowance received for U.S. Appl. No. 14/839,897, dated Jun. 8, 2018, 11 pages.
Notice of Allowance received for U.S. Appl. No. 14/839,913, dated Aug. 11, 2016, 5 pages.
Notice of Allowance received for U.S. Appl. No. 14/864,011, dated Apr. 28, 2016, 5 pages.
Notice of Allowance received for U.S. Appl. No. 14/864,011, dated Oct. 5, 2016, 5 pages.
Notice of Allowance received for U.S. Appl. No. 15/268,115, dated Mar. 7, 2018, 15 pages.
Notice of Allowance received for U.S. Appl. No. 15/433,238, dated May 17, 2018, 7 pages.
Notice of Allowance received for U.S. Appl. No. 15/975,581, dated Oct. 3, 2018, 25 pages.
Office Action received for Australian Patent Application No. 2015385757, dated Sep. 11, 2017, 3 pages.
Office Action received for Australian Patent Application No. 2016218318, dated Aug. 24, 2018, 5 pages.
Office Action received for Australian Patent Application No. 2016218318, dated Sep. 26, 2018, 3 pages.
Office Action received for Chinese Patent Application No. 201580046237.6, dated Feb. 6, 2018, 10 pages (5 pages of English Translation and 5 pages of Official Copy).
Office Action received for Chinese Patent Application No. 201610084974.1, dated May 3, 2018, 12 pages (5 pages of English Translation and 7 pages of Official Copy).
Office Action received for Chinese Patent Application No. 201620119869.2, dated Jun. 3, 2016, 2 pages (1 page of English Translation and 1 page of Official copy).
Office Action received for Chinese Patent Application No. 201620119869.2, dated Nov. 22, 2016, 2 pages (Official Copy only) (See Communication under 37 CFR § 1.98(a) (3)).
Office Action received for Danish Patent Application No. PA201570664, dated Dec. 14, 2016, 2 pages.
Office Action received for Danish Patent Application No. PA201570664, dated Jun. 3, 2016, 3 pages.
Office Action received for Danish Patent Application No. PA201570771, dated Jun. 13, 2016, 3 pages.
Office Action received for Danish Patent Application No. PA201570773, dated Aug. 28, 2017, 3 pages.
Office Action received for Danish Patent Application No. PA201570773, dated Feb. 15, 2017, 3 pages.
Office Action received for Danish Patent Application No. PA201570773, dated Sep. 12, 2016, 3 pages.
Office Action received for Danish Patent Application No. PA201570788, dated Apr. 8, 2016, 11 pages.
Office Action received for Danish Patent Application No. PA201570788, dated Sep. 13, 2016, 3 pages.
Office action received for Danish Patent Application No. PA201570791, dated Sep. 6, 2016, 4 pages.
Office Action received for Danish Patent Application No. PA201670074, dated Jun. 28, 2016, 5 pages.
Office Action received for Danish Patent Application No. PA201670074, dated Mar. 16, 2017, 2 pages.
Office Action received for European Patent Application No. 15712218.5, dated Aug. 3, 2017, 4 pages.
Office Action received for European Patent Application No. 15787091.6, dated Oct. 8, 2018, 7 pages.
Office Action received for Japanese Patent Application No. 2017-545733, dated Feb. 13, 2018, 7 pages (3 pages of English Translation and 4 pages of Official Copy).
Office Action received for Taiwanese Patent Application No. 104123593, dated May 24, 2016, 57 pages (26 pages of English Translation and 31 pages of Official Copy).
Office Action received for Taiwanese Patent Application No. 104123593, dated Sep. 13, 2016, 8 pages (3 pages of English Translation and 5 pages of Official Copy).
Office Action received for Taiwanese Patent Application No. 104128700, dated Aug. 31, 2016, 13 pages (6 pages of English Translation and 7 pages of Official Copy).
Office Action received for Taiwanese Patent Application No. 104133756, dated May 17, 2017, 13 pages (6 pages of English Translation and 7 pages of Official Copy).
Office Action received for Taiwanese Patent Application No. 104133757, dated Jul. 6, 2016, 22 pages (9 pages of English Translation and 13 pages of Official Copy).
Office Action received for Taiwanese Patent Application No. 104107328, dated Dec. 28, 2016, 4 pages (1 page of Search Report and 3 pages of Official Copy) (See Communication under 37 CFR § 1.98(a) (3)).
"Remote Shot for SmartWatch 2", Android Apps on Google Play, Nov. 21, 2017, 3 pages.
Supplemental Notice of Allowance received for U.S. Appl. No. 14/805,403, dated Oct. 4, 2018, 3 pages.
Supplemental Notice of Allowance received for U.S. Appl. No. 15/433,238, dated Jun. 20, 2018, 2 pages.
Non Final Office Action received for U.S. Appl. No. 14/839,913, dated Mar. 2, 2016, 11 pages.
Non Final Office Action received for U.S. Appl. No. 14/864,011, dated Jan. 21, 2016, 10 pages.
Office Action received for Australian Patent Application No. 2016100155, dated May 4, 2016, 7 pages.
Fuji Film, "Taking Pictures Remotely: Free iPhone/Android App FUJI FILM Camera Remote", Online Available at: <http://app.fujifilm-dsc.com/en/camera_remote/guide05.html>, Apr. 22, 2014, 3 pages.
Office Action received for Danish Patent Application No. PA201570664, dated Mar. 15, 2016, 10 pages.
Office Action received for Danish Patent Application No. PA201570771, dated Mar. 17, 2016, 8 pages.
Office Action Received for Danish Patent Application No. PA201570773, dated Mar. 18, 2016, 9 pages.
Office action received for Danish Patent Application No. PA201570791, dated Apr. 6, 2016, 12 pages.
Office Action received for Danish Patent Application No. PA201670074, dated Apr. 7, 2016, 8 pages.

(56) References Cited

OTHER PUBLICATIONS

International Search Report and Written Opinion received for PCT Patent Application No. PCT/US2015/019298, dated Jul. 13, 2015, 17 pages.
International Search Report and Written Opinion received for PCT Patent Application No. PCT/US2015/041424, dated Mar. 31, 2016, 18 pages.
Invitation to Pay Additional Fees received for PCT Patent Application No. PCT/US2015/041424, dated Nov. 12, 2015, 6 pages.
International Search Report and Written Opinion received for PCT Application No. PCT/US2015/047507, dated Feb. 22, 2016, 22 pages.
Invitation to Pay Additional Fees received for PCT Patent Application No. PCT/US2015/047507, dated Jan. 4, 2016, 8 pages.
International Search Report and Written Opinion received for PCT Patent Application No. PCT/US2015/055165, dated Apr. 20, 2016, 22 pages.
Invitation to Pay Additional Fees received for PCT Patent Application No. PCT/US2015/055165, dated Jan. 18, 2016, 6 pages.
Playmemories Camera Apps, "PlayMemories Camera Apps Help Guide" Available Online at: <https://www.playmemoriescameraapps.com/portal/manual/IS9104-NPIA09014_00-F00002/en/index.html>, 2012, 3 pages.
Techsmith, "Snagit ® 11 Snagit 11.4 Help", Online Available at: <http://assets.techsmith.com/Downloads/ua-tutorials-snagit-11/Snagit_11.pdf>, Jan. 2014, 2 pages.
Techsmith, "Snagit ® 11 Snagit 11.4 Help", Online Available at: <http://assets.techsmith.com/Downloads/ua-tutorials-snagit-11/Snagit_11.pdf >, Jan. 2014, 146 pages.
Walker, Alissa, "Apple Watch's Walking Directions Buzz Your Wrist When It's Time to Turn", Online Available at: <http://gizmodo.com/apple-watch-will-give-you-a-buzz-when-its-time-to-turn-1632557384>, Sep. 9, 2014, 2 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available Online at: http://www.xperiablog.net/2014/06/13/action-camera-extension-gives-smartwatchsmartband-owners-ability-to-control-sony-wireless-cameras/>, Jun. 13, 2014, 10 pages.
Non-Final Office Action received for U.S. Appl. No. 16/147,523, dated Dec. 27, 2019, 11 pages.
Advisory Action received for U.S. Appl. No. 14/863,099, dated Sep. 8, 2016, 3 pages.
Examiner's Answer to Appeal Brief received for U.S. Appl. No. 14/774,664, dated May 31, 2018, 28 pages.
Examiner's Answer to Appeal Brief received for U.S. Appl. No. 14/863,099, dated Jul. 28, 2017, 31 pages.
Final Office Action received for U.S. Appl. No. 14/774,664, dated Aug. 25, 2017, 23 pages.
Final Office Action received for U.S. Appl. No. 14/863,099, dated Apr. 21, 2016, 20 pages.
International Preliminary Report on Patentability received for PCT Patent Application No. PCT/US2014/027882, dated Sep. 24, 2015, 8 pages.
International Search Report and Written Opinion received for PCT Patent Application No. PCT/US2013/032498, dated Feb. 10, 2014, 18 pages.
International Search Report and Written Opinion received for PCT Patent Application No. PCT/US2014/027882, dated Oct. 10, 2014, 11 pages.
Invitation to Pay Additional Fees received for PCT Patent Application No. PCT/US2014/027882, dated Aug. 5, 2014, 2 pages.
Non-Final Office Action received for U.S. Appl. No. 14/774,664, dated Mar. 7, 2017, 23 pages.
Non-Final Office Action received for U.S. Appl. No. 14/863,099, dated Dec. 2, 2015, 12 pages.
Notice of Acceptance received for Australian Patent Application No. 2016218318, dated Jul. 3, 2019, 3 pages.
Office Action received for Chinese Patent Application No. 201810321928.8, dated Jul. 2, 2019, 10 pages (5 pages of English Translation and 5 pages of Official Copy).
Office Action received for European Patent Application No. 15787091.6, dated Aug. 2, 2019, 8 pages.
Dharmasena, Anusha, "iMessage-send as text message Option", YouTube, Available online at: https://www.youtube.com/watch?v=hXG-MdIW6FA, Feb. 18, 2013, 1 page.
Invitation to Pay Search Fees received for European Patent Application No. 15753796.0, dated Mar. 24, 2020; 3 pages.
Office Action received for Australian Patent Application No. 2018247345, dated May 6, 2019, 2 pages.
Corrected Notice of Allowance received for U.S. Appl. No. 14/839,903, dated Feb. 13, 2019, 2 pages.
Notice of Allowance received for Japanese Patent Application No. 2018-126311, dated Feb. 1, 2019, 4 pages (1 page of English Translation and 3 pages of Official copy).
Notice of Allowance received for U.S. Appl. No. 15/366,607, dated Feb. 21, 2019, 9 pages.
Applicant-Initiated Interview Summary received for U.S. Appl. No. 16/147,523, dated Apr. 27, 2020, 3 pages.
Intention to Grant received for European Patent Application No. 15787091.6, dated Apr. 23, 2020, 7 pages.
Itjungles, "iPhone 6: How to Pair with Another Bluetooth Device", Available Online at: https://www.youtube.com/watch?v=9setanYtHAk, Aug. 5, 2015, 3 pages.
Final Office Action received for U.S. Appl. No. 16/147,523, dated Aug. 4, 2020, 15 pages.
Office Action received for European Patent Application No. 15753796.0, dated Aug. 4, 2020, 9 pages.
Applicant-Initiated Interview Summary received for U.S. Appl. No. 16/749,929, dated Oct. 13, 2020, 4 pages.
Intention to Grant received for European Patent Application No. 15787091.6, dated Sep. 30, 2020, 7 pages.
Applicant-Initiated Interview Summary received for U.S. Appl. No. 16/281,838, dated Jun. 2, 2020, 5 pages.
Office Action received for Chinese Patent Application No. 201910990432.4, dated May 18, 2020, 15 pages (9 pages of English Translation and 6 pages of Official Copy).
Decision to Refuse received for European Patent Application No. 17184710.6, dated Jun. 16, 2020, 9 pages.
Non-Final Office Action received for U.S. Appl. No. 16/749,929, dated May 13, 2020, 11 pages.
Notice of Allowance received for Chinese Patent Application No. 201710657424.9, dated May 8, 2020, 2 pages (1 page of English Translation and 1 page of Official Copy).
Notice of Allowance received for U.S. Appl. No. 16/281,838, dated Aug. 26, 2020, 9 pages.

* cited by examiner

800 ↘

802
While the electronic device is connected, via the one or more wireless antennas, to a first local area network, display a first external device management interface, wherein: the first external device management interface is associated with a first external device that is not connected to the first local area network; and the first external device management interface includes a first affordance.

↓

804
Receive a user input corresponding to selection of the first affordance.

↓

806
In response to receiving the user input corresponding to selection of the first affordance, cause the first external device to connect to the first local area network.

USER INTERFACES FOR UPDATING NETWORK CONNECTION SETTINGS OF EXTERNAL DEVICES

CROSS-REFERENCE TO RELATED APPLICATIONS

This application claims priority to U.S. Provisional Application No. 62/679,947, entitled "USER INTERFACES FOR UPDATING NETWORK CONNECTION SETTINGS OF EXTERNAL DEVICES", filed Jun. 3, 2018, the entire contents of which are hereby incorporated by reference.

FIELD

The present disclosure relates generally to computer user interfaces, and more specifically to techniques for managing network connection settings of an external device.

BACKGROUND

The number of electronic devices, and particularly smart devices, in users' homes continues to increase. These devices are increasingly being interconnected with each other, are increasingly more capable, and are performing more complex tasks. As such, these devices are increasingly expected to have thoughtfully-designed user interfaces.

BRIEF SUMMARY

Some techniques for managing network connection settings of an external device using electronic devices, however, are generally cumbersome and inefficient. For example, some existing techniques use a complex and time-consuming user interface, which may include multiple key presses or keystrokes. For further example, some existing techniques do not provide any notification relating to potential issues with a network setting of an external device. Existing techniques require more time than necessary, wasting user time and device energy. This latter consideration is particularly important in battery-operated devices.

Accordingly, the present technique provides electronic devices with faster, more efficient methods and interfaces for managing network connection settings of an external device. Such methods and interfaces optionally complement or replace other methods for managing network connection settings of an external device. Such methods and interfaces reduce the cognitive burden on a user and produce a more efficient human-machine interface. Such methods and interfaces can reduce the number of unnecessary, extraneous, or repetitive user inputs for managing network settings of an external device. For battery-operated computing devices, such methods and interfaces conserve power and increase the time between battery charges.

In accordance with some embodiments, a method is performed at a device with a display and one or more wireless antennas. The method comprises: while the electronic device is connected, via the one or more wireless antennas, to a first local area network, displaying a first external device management interface, wherein: the first external device management interface is associated with a first external device that is not connected to the first local area network; and the first external device management interface includes a first affordance; receiving a user input corresponding to selection of the first affordance; and in response to receiving the user input corresponding to selection of the first affordance, causing the first external device to connect to the first local area network.

In accordance with some embodiments, a non-transitory computer-readable storage medium is described. The non-transitory computer-readable storage medium stores one or more programs configured to be executed by one or more processors of an electronic device with a display and one or more wireless antennas, the one or more programs including instructions for: while the electronic device is connected, via the one or more wireless antennas, to a first local area network, displaying a first external device management interface, wherein: the first external device management interface is associated with a first external device that is not connected to the first local area network; and the first external device management interface includes a first affordance; receiving a user input corresponding to selection of the first affordance; and in response to receiving the user input corresponding to selection of the first affordance, causing the first external device to connect to the first local area network.

In accordance with some embodiments, an electronic device is described. The electronic device comprises: a display; one or more wireless antennas; one or more processors; and memory storing one or more programs configured to be executed by the one or more processors, the one or more programs including instructions for: while the electronic device is connected, via the one or more wireless antennas, to a first local area network, displaying a first external device management interface, wherein: the first external device management interface is associated with a first external device that is not connected to the first local area network; and the first external device management interface includes a first affordance; receiving a user input corresponding to selection of the first affordance; and in response to receiving the user input corresponding to selection of the first affordance, causing the first external device to connect to the first local area network.

In accordance with some embodiments, an electronic device is described. The electronic device comprises: a display; one or more wireless antennas; while the electronic device is connected, via the one or more wireless antennas, to a first local area network, means for displaying a first external device management interface, wherein: the first external device management interface is associated with a first external device that is not connected to the first local area network; and the first external device management interface includes a first affordance; means for receiving a user input corresponding to selection of the first affordance; and means for, responsive to receiving the user input corresponding to selection of the first affordance, causing the first external device to connect to the first local area network.

In accordance with some embodiments, a transitory computer-readable storage medium is described. The transitory computer-readable storage medium stores one or more programs configured to be executed by one or more processors of an electronic device with a display and one or more wireless antennas, the one or more programs including instructions for: while the electronic device is connected, via the one or more wireless antennas, to a first local area network, displaying a first external device management interface, wherein: the first external device management interface is associated with a first external device that is not connected to the first local area network; and the first external device management interface includes a first affordance; receiving a user input corresponding to selection of the first affordance; and in response to receiving the user input corresponding to selection of the first affordance, causing the first external device to connect to the first local area network.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing network connection settings of an external device, thereby increasing the effectiveness, efficiency, and user satisfaction with such devices. Such methods and interfaces may complement or replace other methods for managing network connection settings of an external device.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 8A-8C is a flow diagram illustrating a process for configuring an electronic device in accordance with some embodiments.

DESCRIPTION OF EMBODIMENTS

Figure 1A:
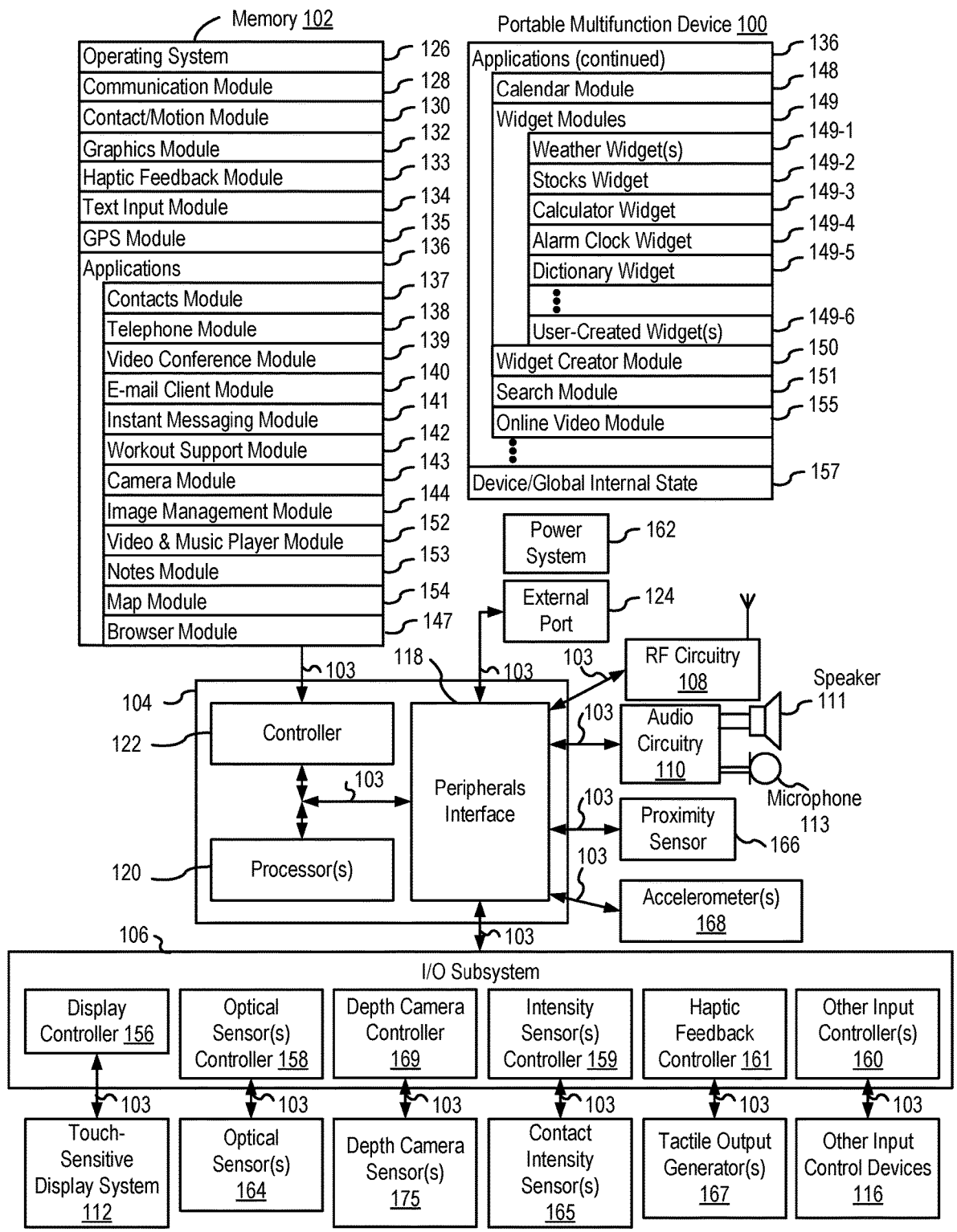
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing network connection settings of an external device. For example, there is a need for methods and interfaces that provide the ability to resolve a mismatch between network connection settings between two devices. Such techniques can reduce the cognitive burden on a user who manages network connection settings of an external device, thereby enhancing productivity. Further, such techniques can reduce processor and battery power otherwise wasted on redundant user inputs.

Below, FIGS. 1A-1B, 2, 4A-4B, and 5A-5J provide a description of exemplary devices for performing the techniques for managing network connection settings of an external device. FIGS. 6A-6G illustrate exemplary techniques and user interfaces for configuring an electronic device. FIGS. 7A-7J illustrate exemplary techniques and user interfaces for configuring an electronic device. FIGS. 8A-8C is a flow diagram illustrating a process for configuring an electronic device in accordance with some embodiments. The user interfaces in FIGS. 6A-6G and 7A-7J are used to illustrate the processes described below, including the processes in FIGS. 8A-8C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
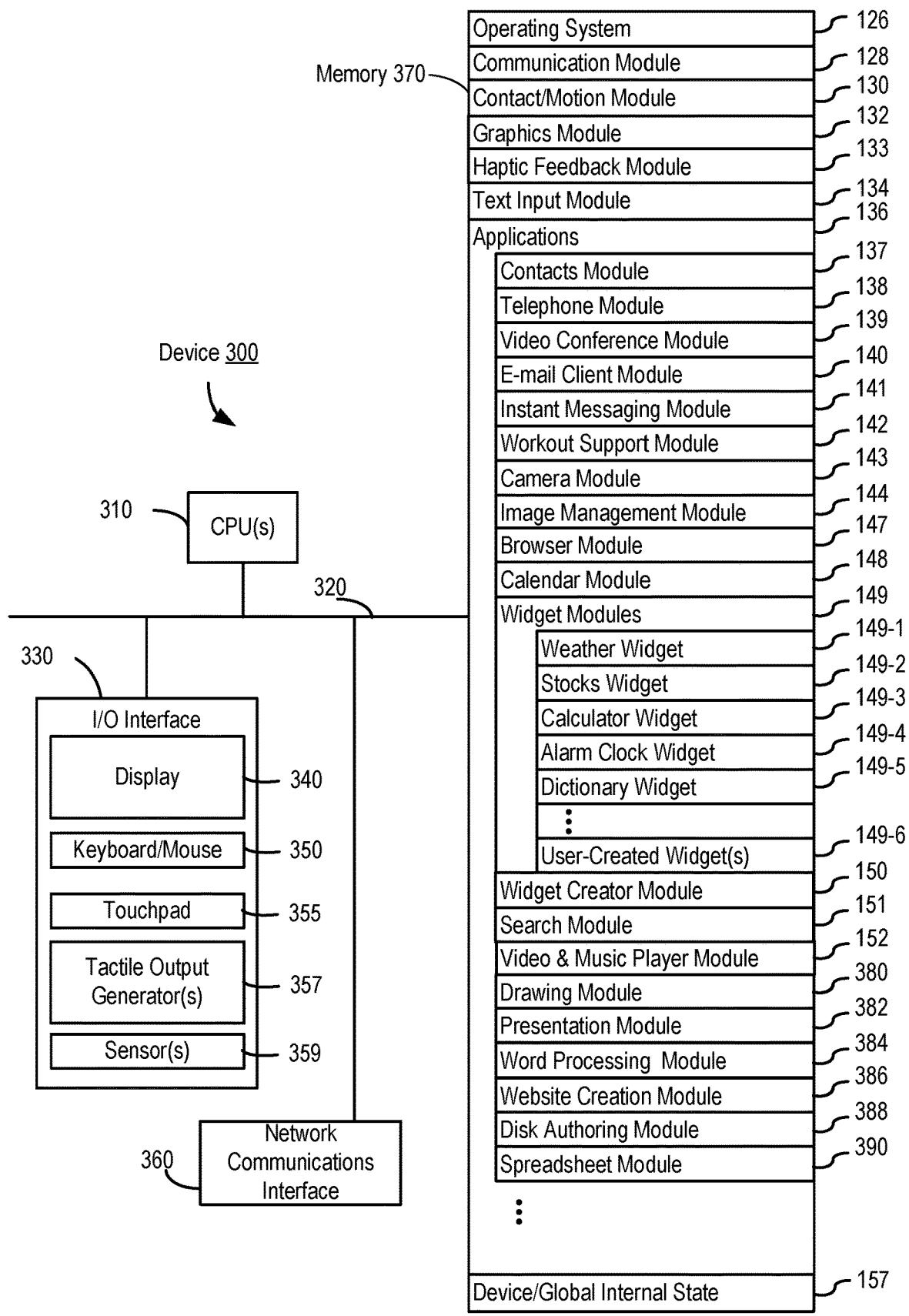
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation., contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RIF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
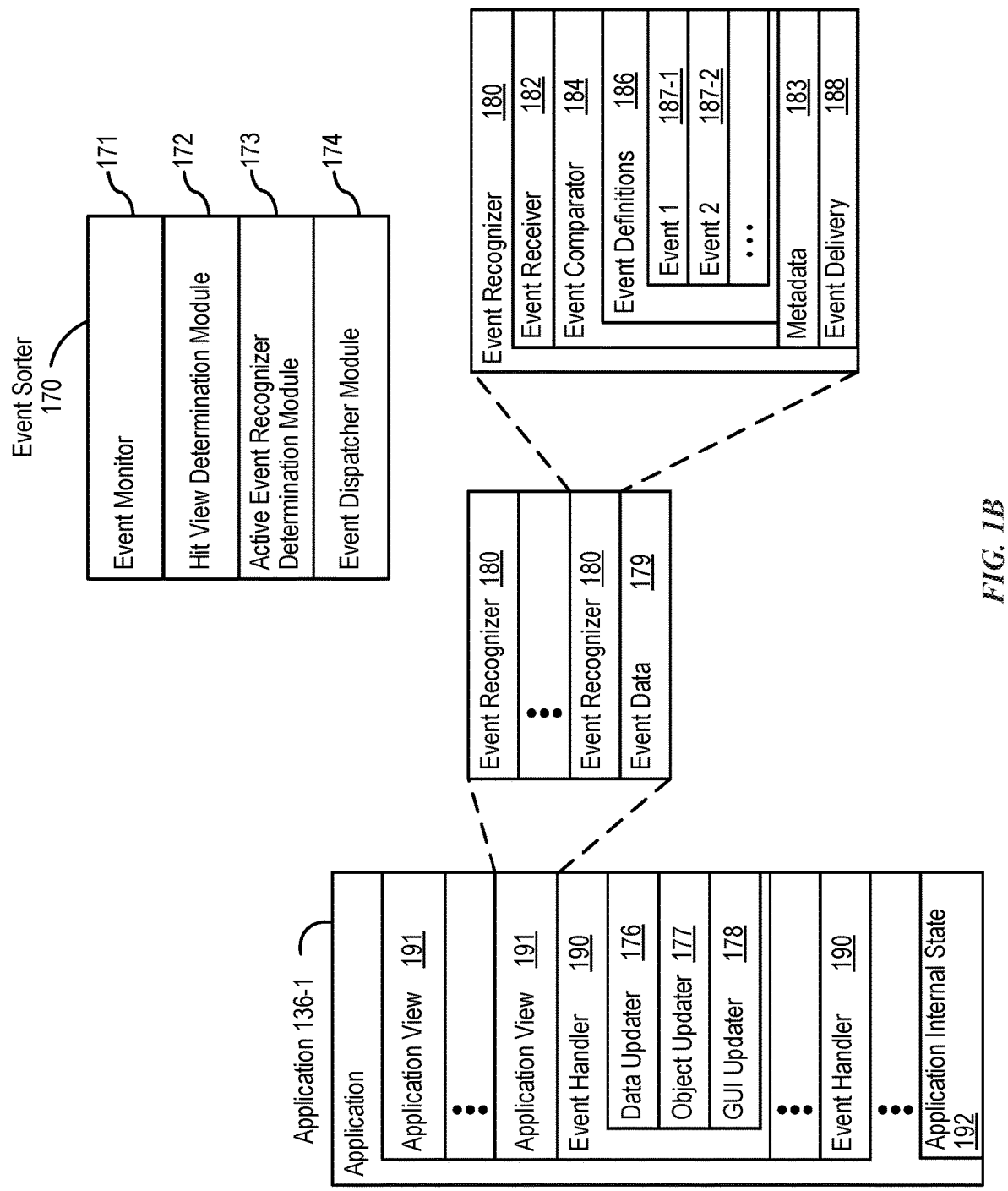
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
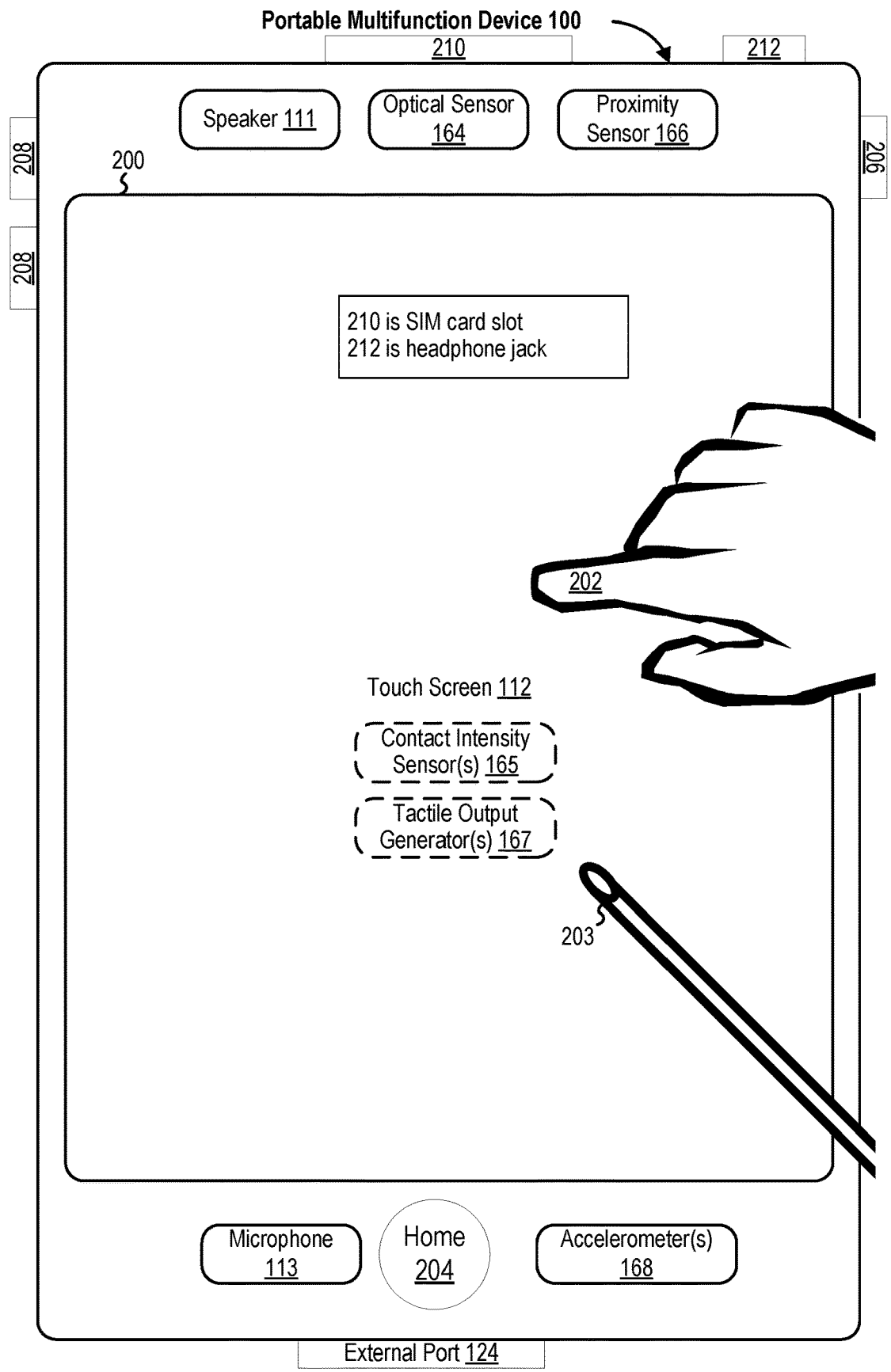
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG.

1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
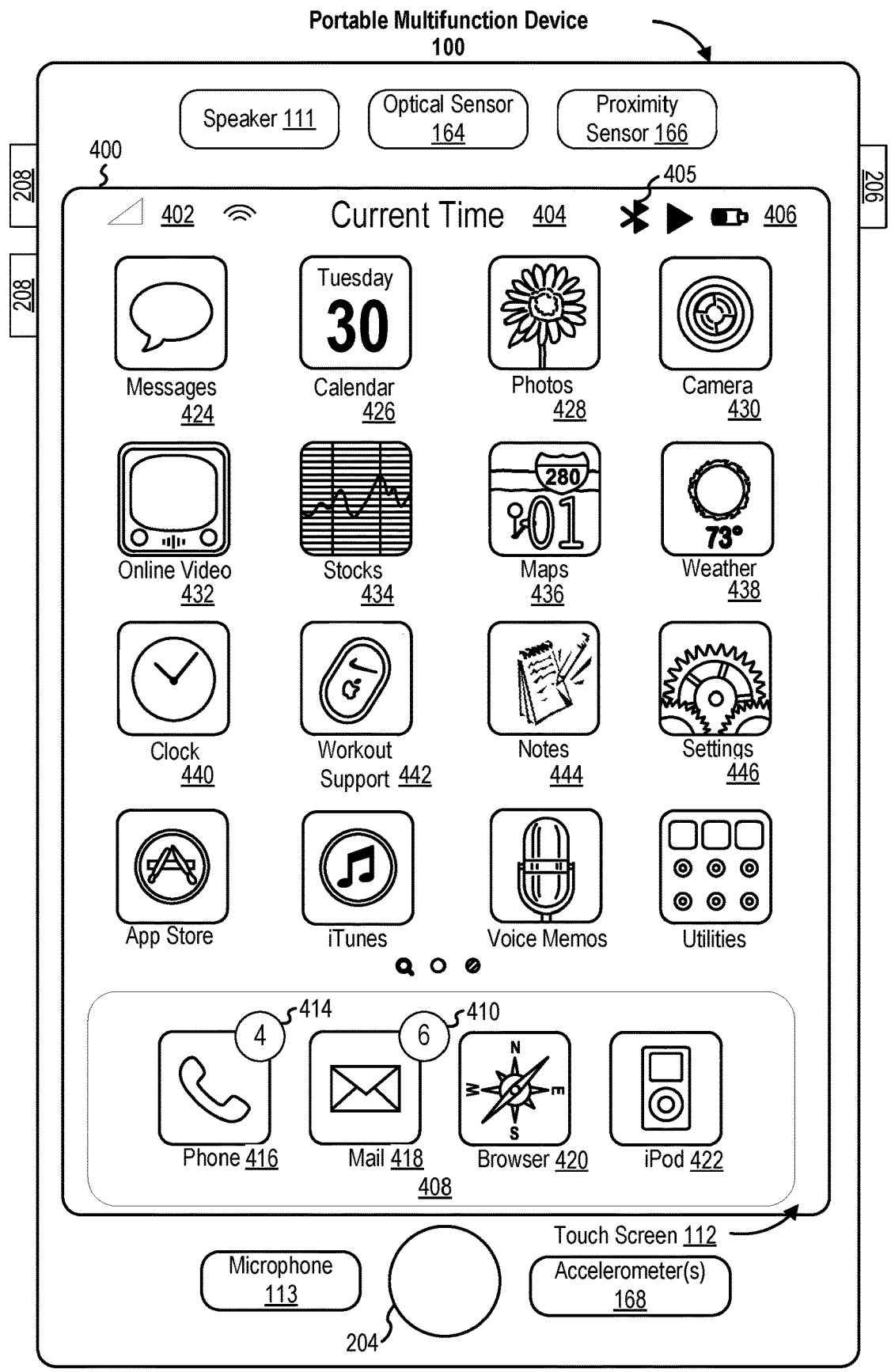
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
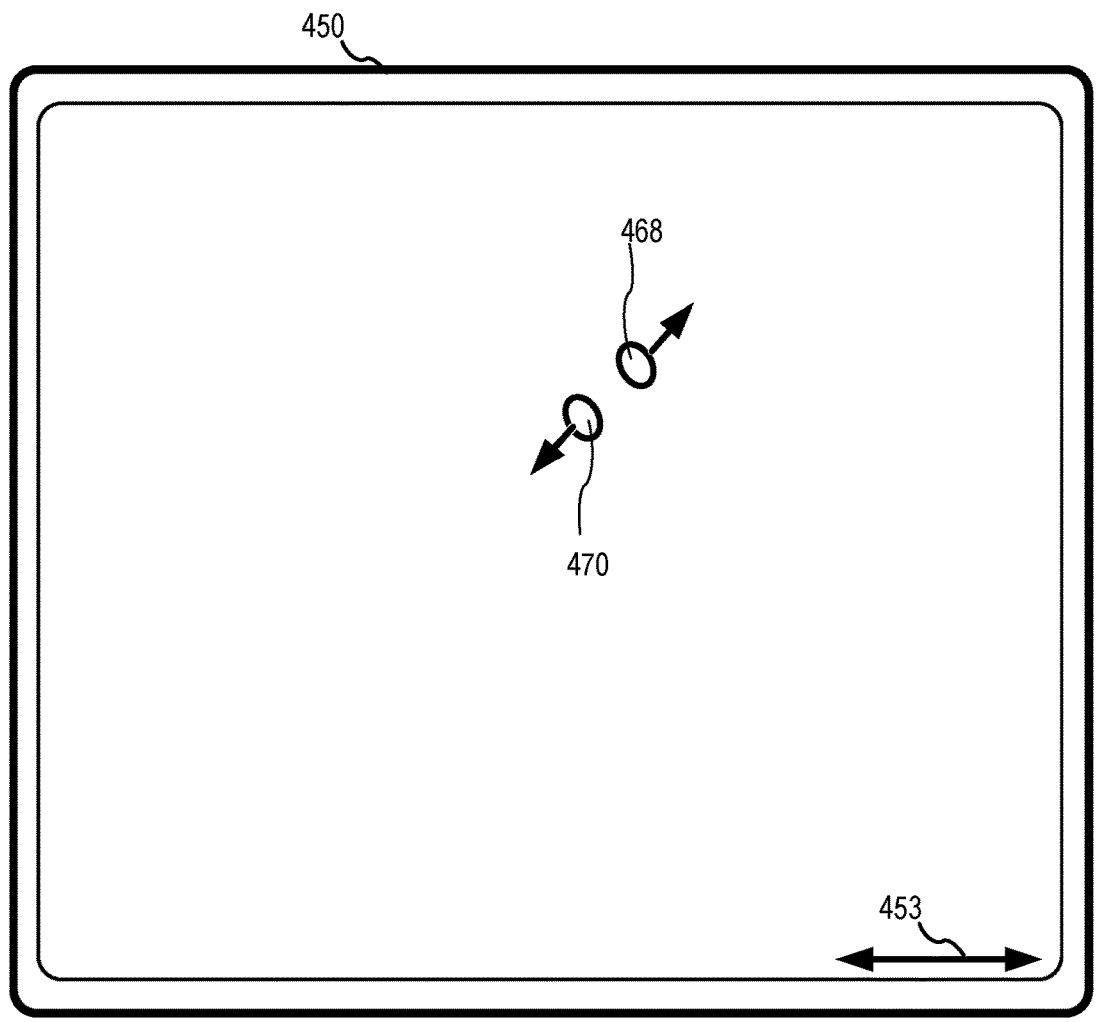
FIG. 4B illustrates an exemplary user interface for a multifunction device with a touch-sensitive surface that is separate from the display in accordance with some embodiments.
Figure 4B:
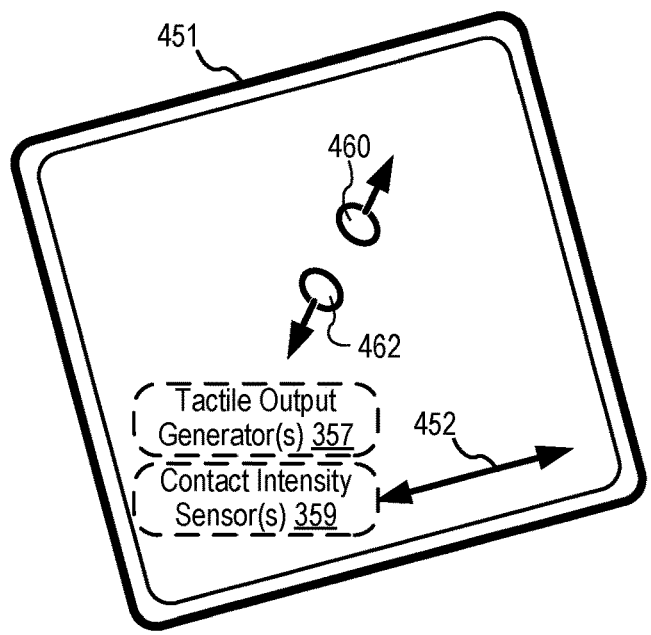

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
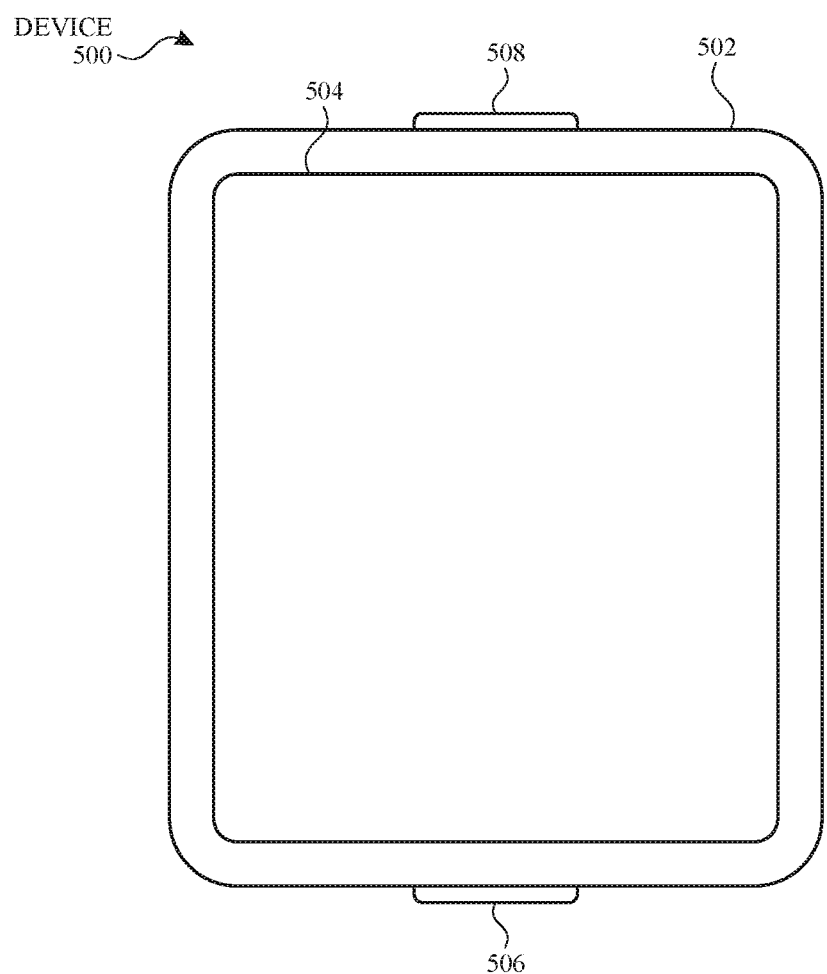
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
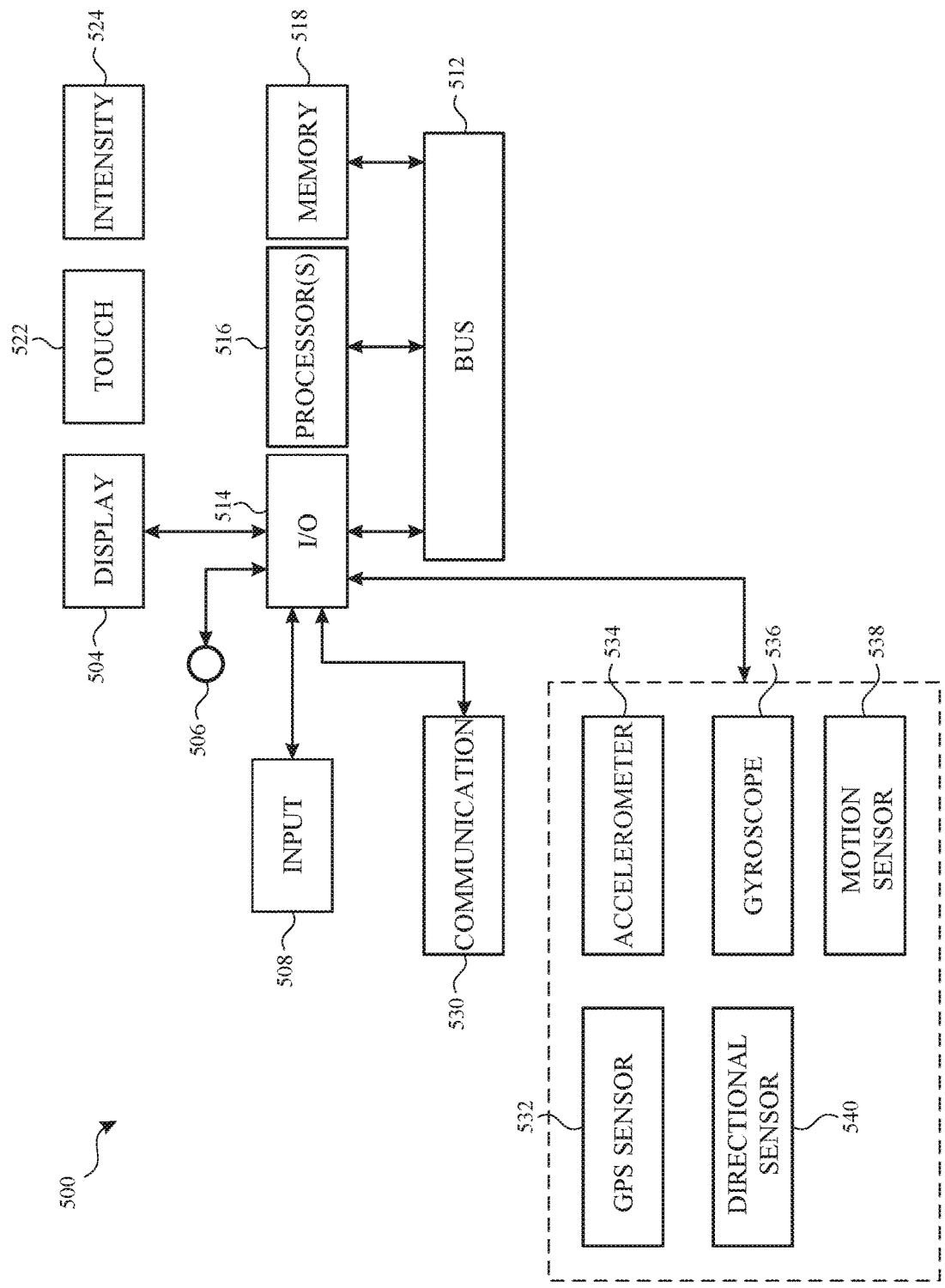
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 800 (FIG. 8A-8C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
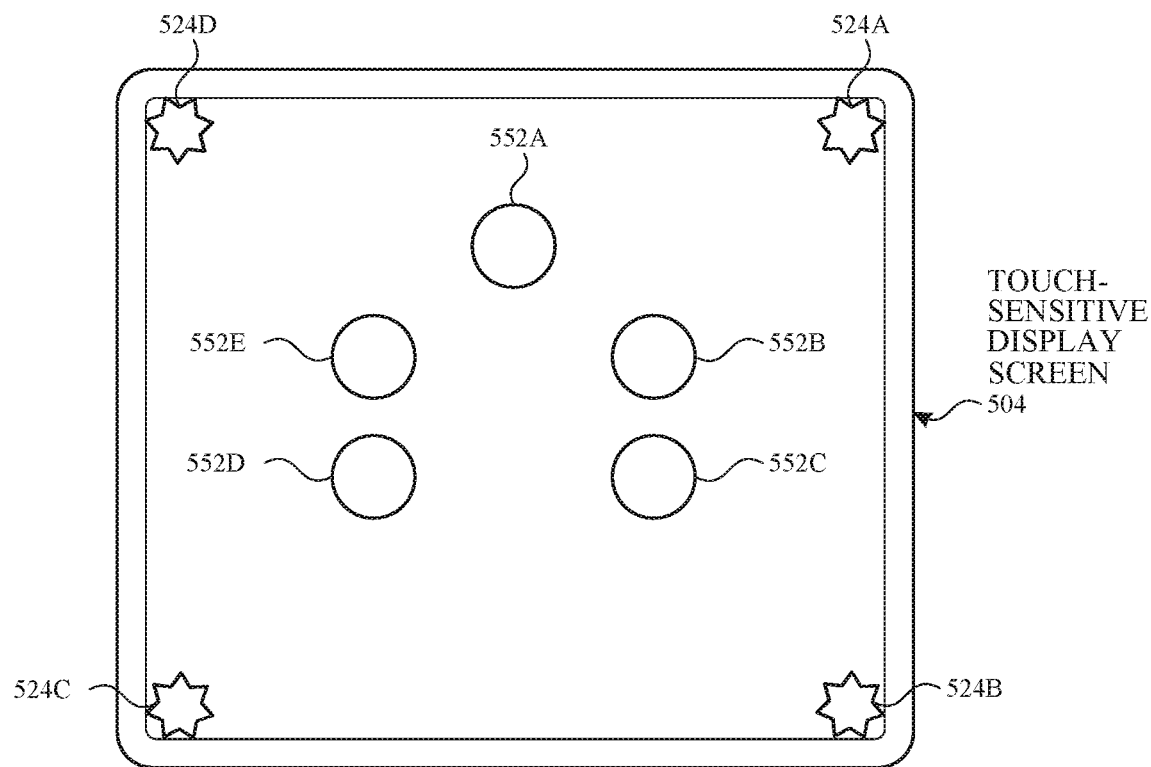
FIGS. 5C-5D illustrate exemplary components of a personal electronic device having a touch-sensitive display and intensity sensors in accordance with some embodiments.
Figure 5C:
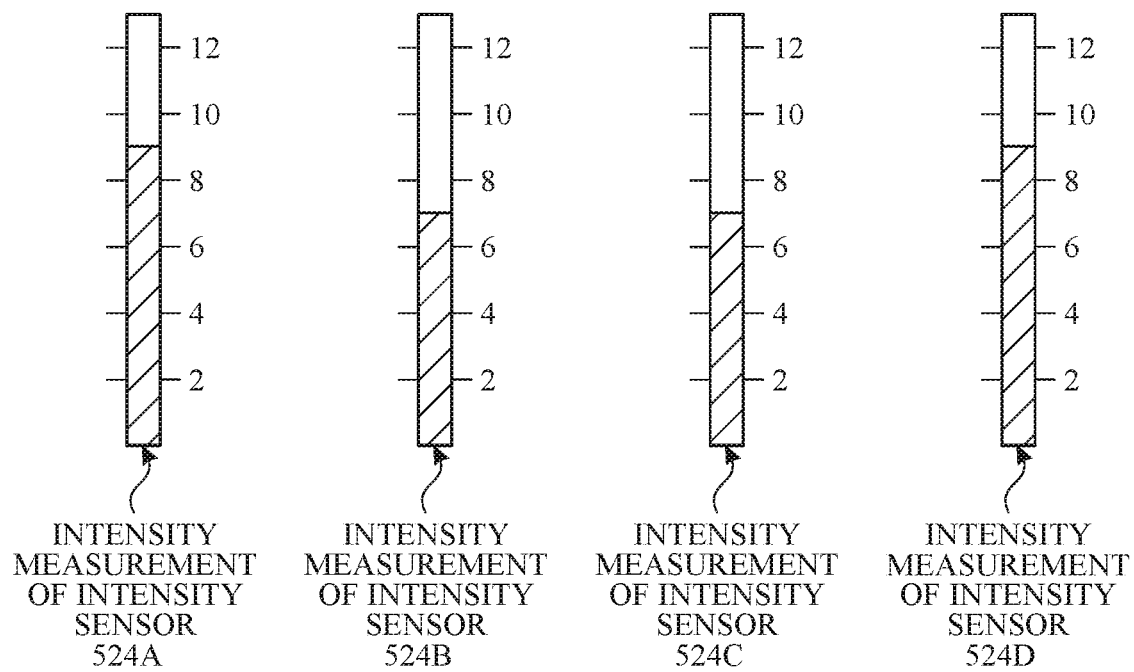
Figure 5D:
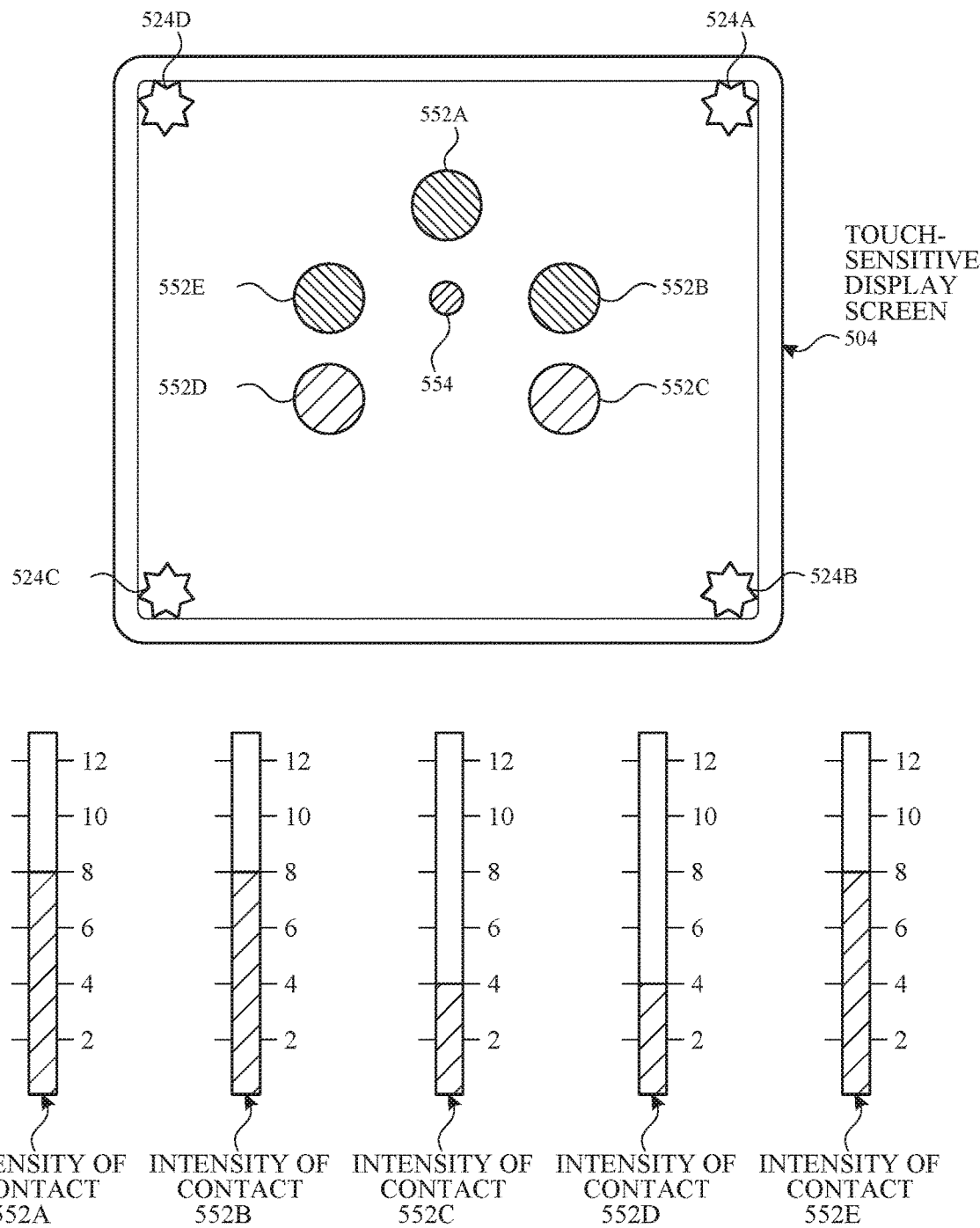

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
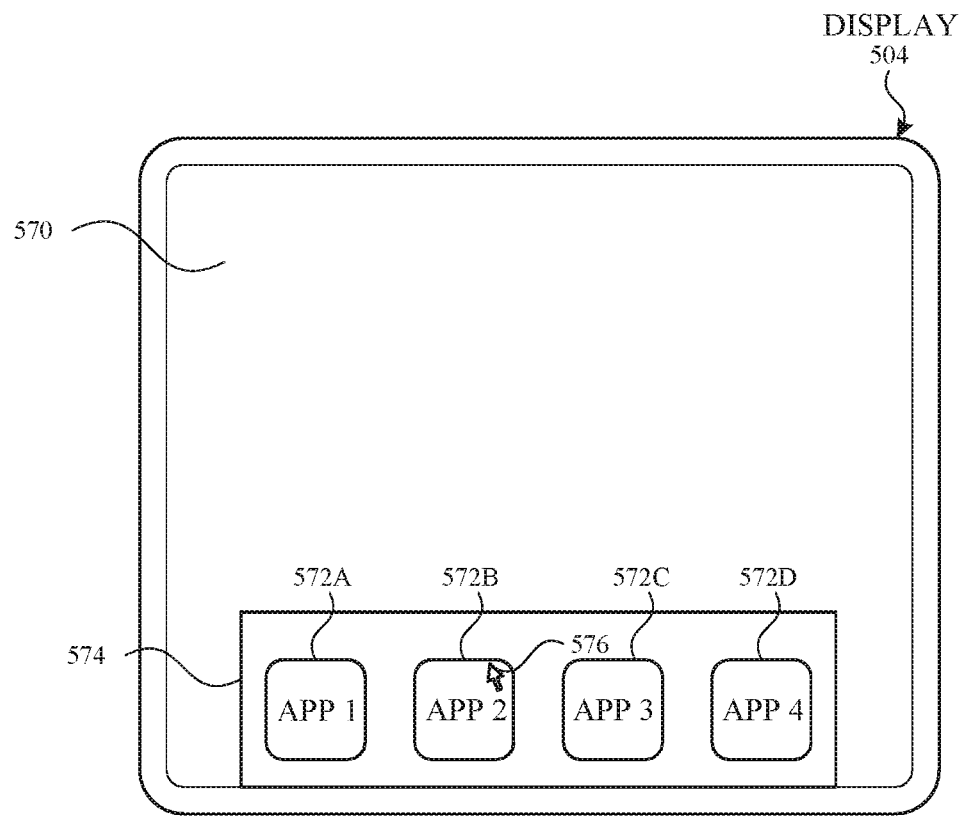
FIGS. 5E-5H illustrate exemplary components and user interfaces of a personal electronic device in accordance with some embodiments.
Figure 5E:
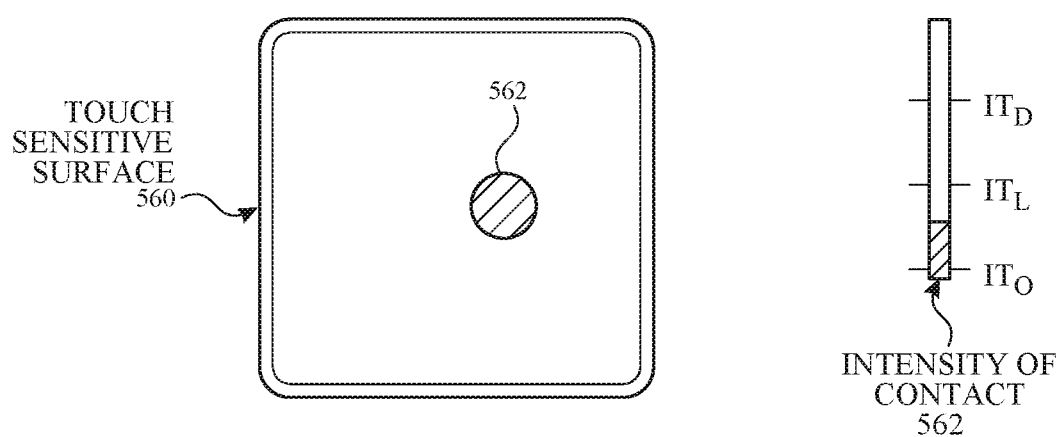
Figure 5F:
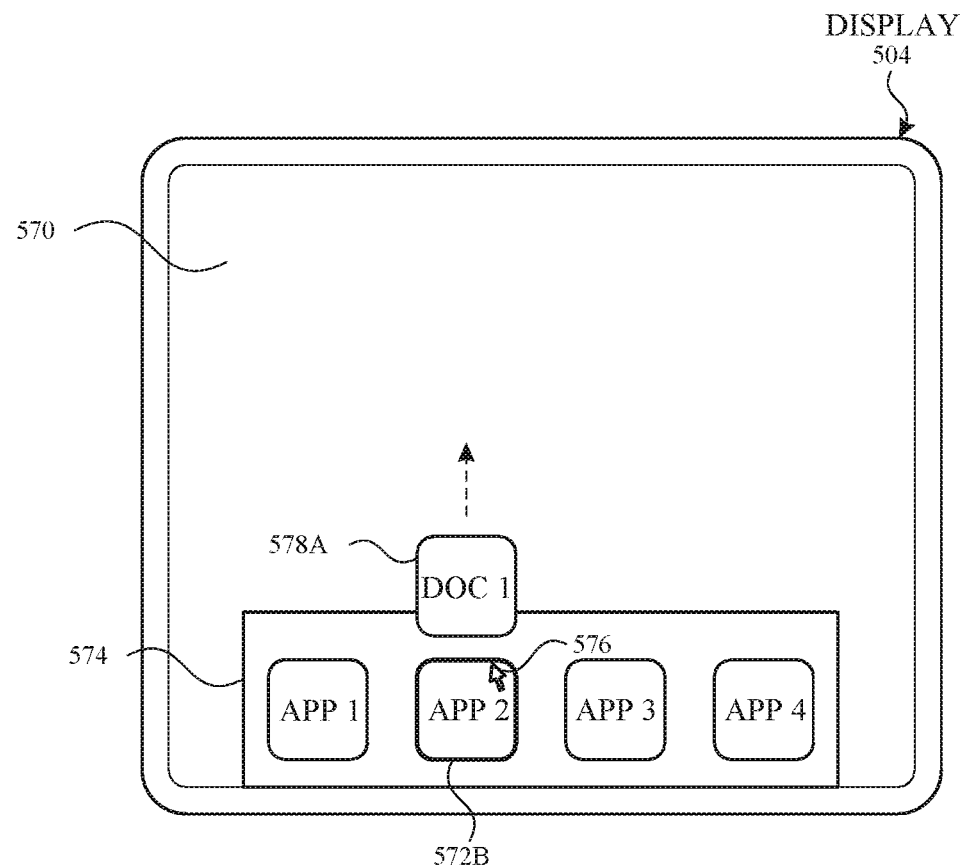
Figure 5F:
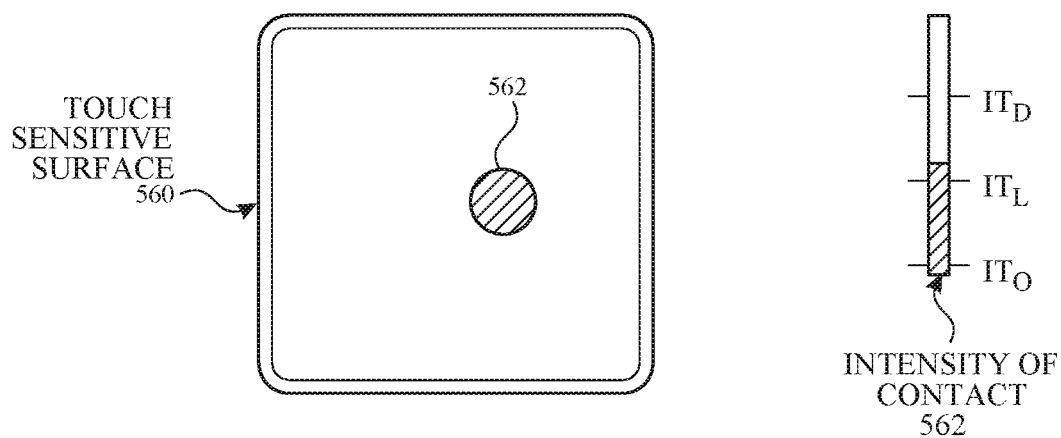
Figure 5G:
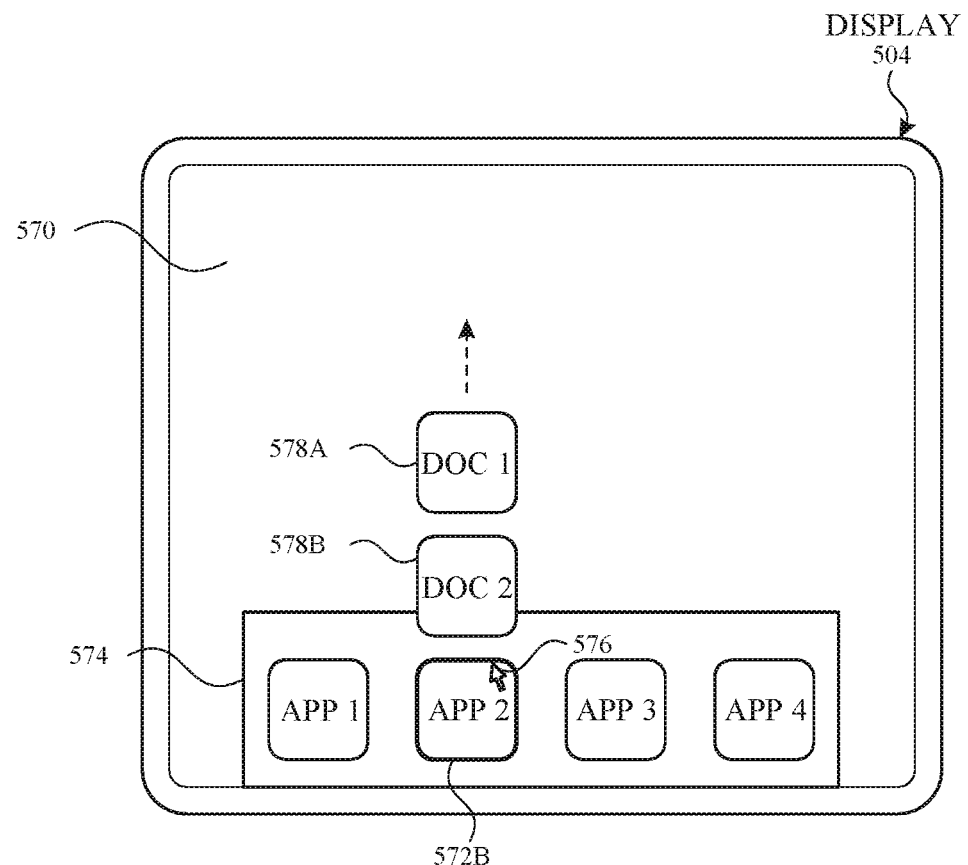
Figure 5G:
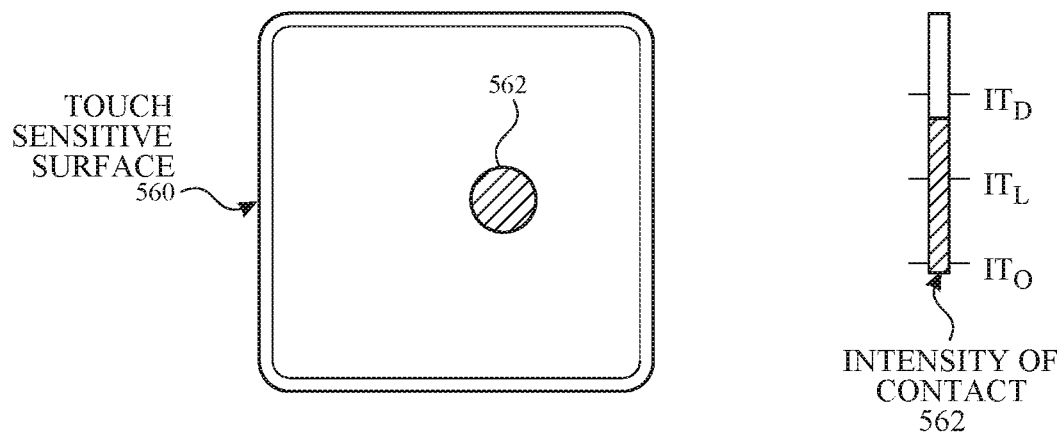
Figure 5H:
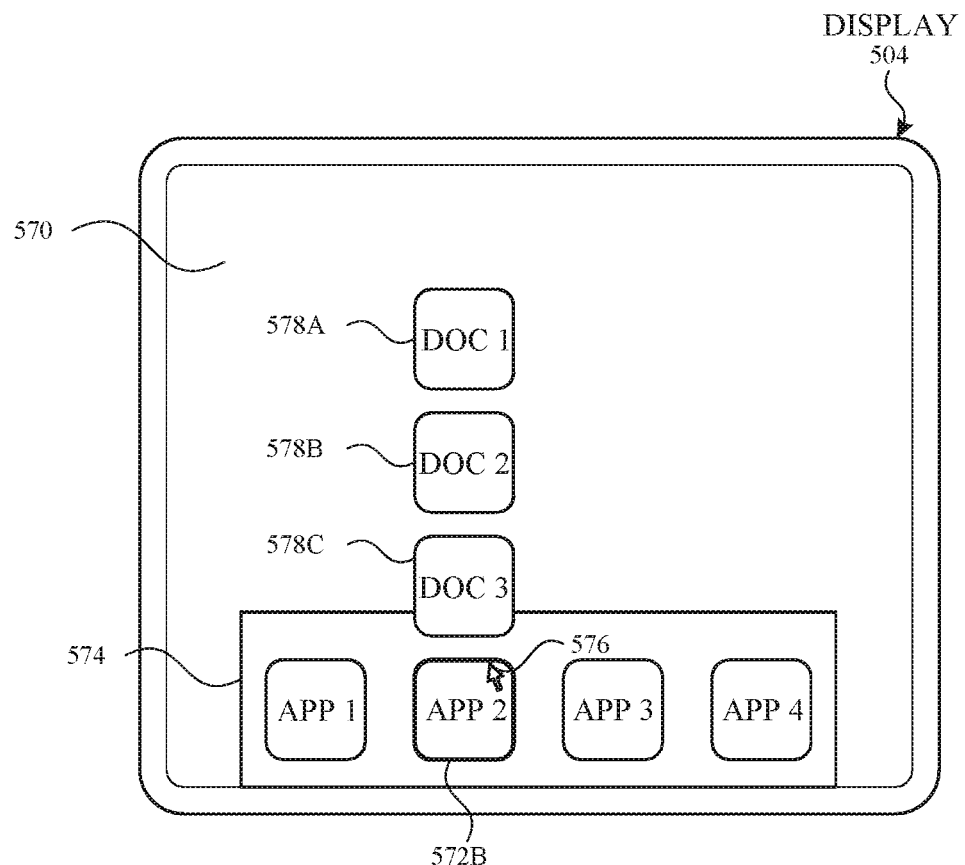
Figure 5H:
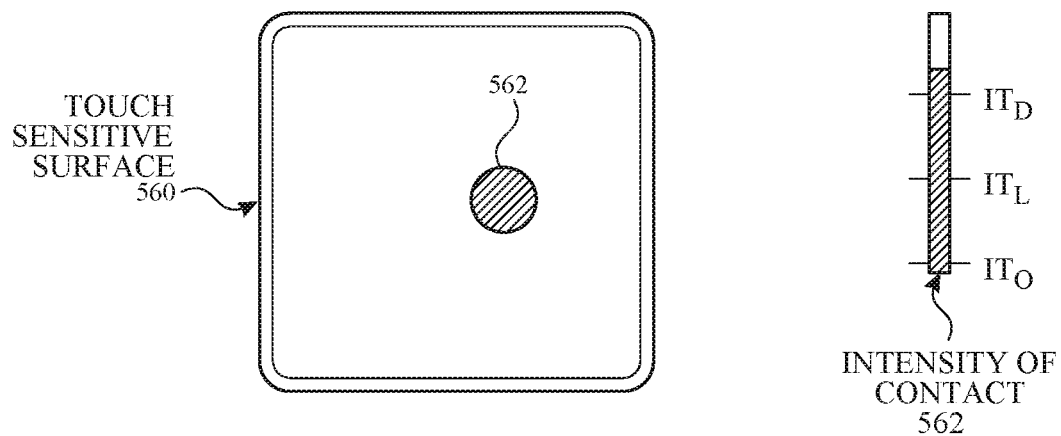

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5I:
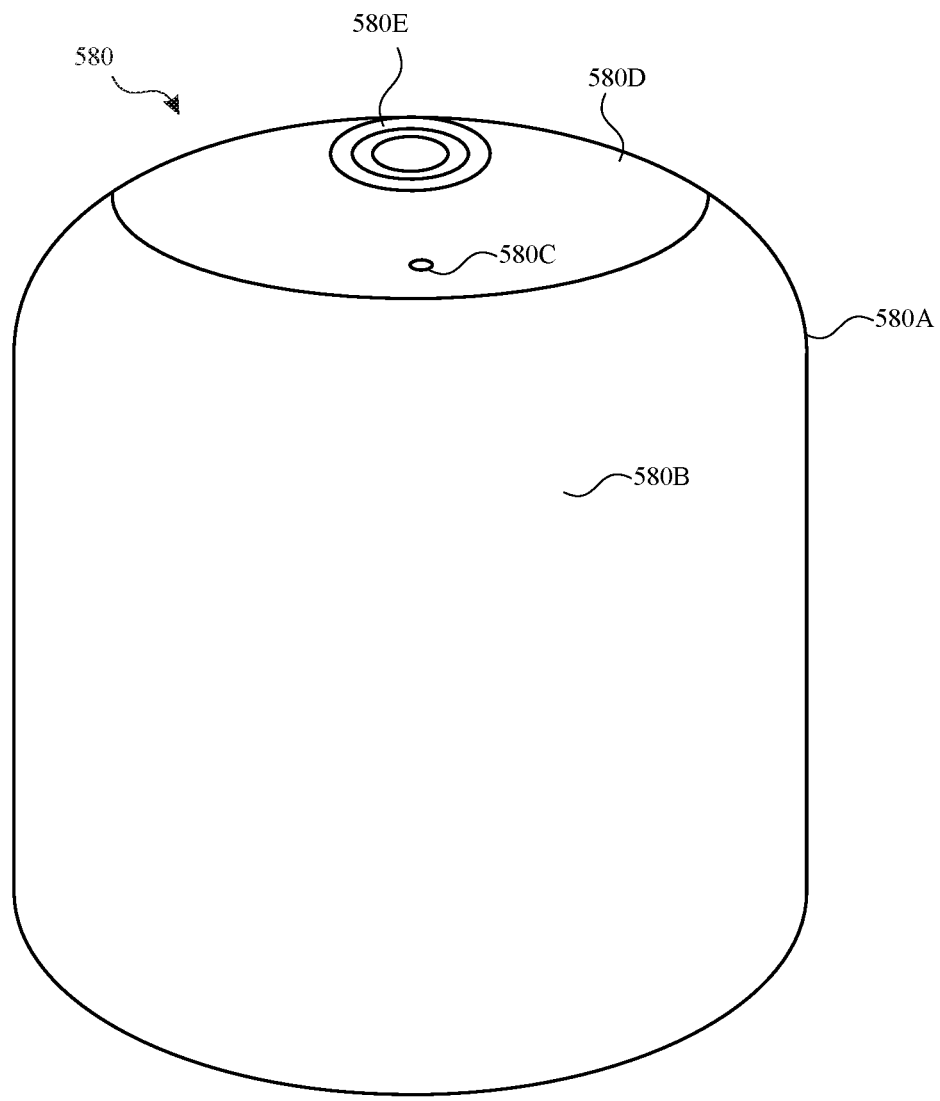
FIG. 5I illustrates an electronic device in accordance with some embodiments.

FIG. 5I illustrates exemplary electronic device 580. Device 580 includes body 580A. In some embodiments, device 580 can include some or all of the features described with respect to devices 100, 300, and 500 (e.g., FIGS. 1A-5B). In some embodiments, device 580 has one or more speakers 580B (concealed in body 580A), one or more microphones 580C, one or more touch-sensitive surfaces 580D, and one or more displays 580E. Alternatively, or in addition to a display and touch-sensitive surface 580D, the device has a touch-sensitive display (also referred to as a touchscreen). As with devices 100, 300, and 500, in some embodiments, touch-sensitive surface 580D (or the touch screen) optionally includes one or more intensity sensors for detecting intensity of contacts (e.g., touches) being applied. The one or more intensity sensors of touch-sensitive surface 580D (or the touchscreen) can provide output data that represents the intensity of touches. The user interface of device 580 can respond to touches based on their intensity, meaning that touches of different intensities can invoke different user interface operations on device 580. In some embodiments, the one or more displays 580E are one or more light-emitting diodes (LEDs). For example, a display can be a single LED, an LED cluster (e.g., a red, a green, and a blue LED), a plurality of discrete LEDs, a plurality of discrete LED clusters, or other arrangement of one or more LEDs. For example, the display 580E can be an array of nine discrete LED clusters arranged in a circular shape (e.g., a ring). In some examples, the one or more displays are comprised of one or more of another type of light-emitting elements.

Figure 5J:
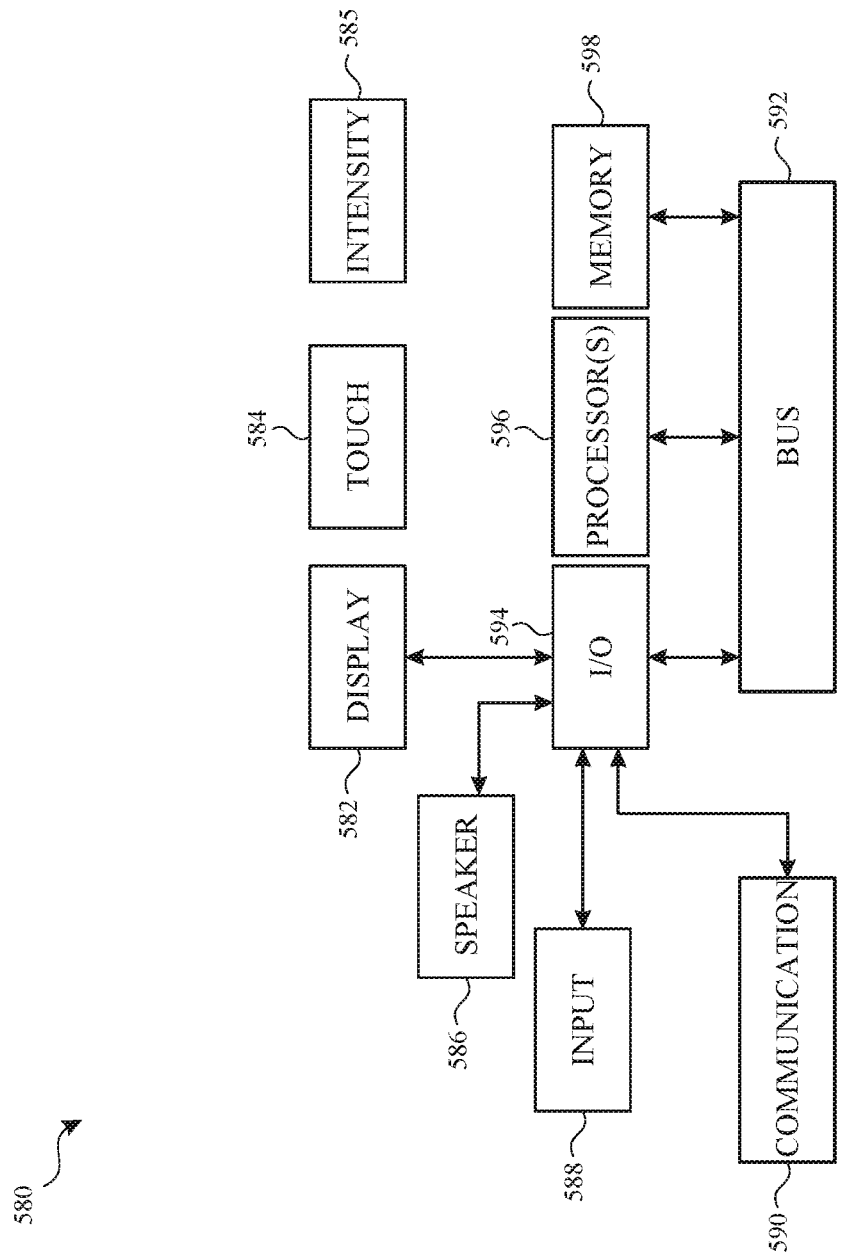
FIG. 5J is a block diagram illustrating an electronic device in accordance with some embodiments.

FIG. 5J depicts exemplary personal electronic device 580. In some embodiments, device 580 can include some or all of the components described with respect to FIGS. 1A, 1B, 3, and 5A-5B. Device 580 has bus 592 that operatively couples I/O section 594 with one or more computer processors 596 and memory 598. I/O section 594 can be connected to display 582, which can have touch-sensitive component 584 and, optionally, intensity sensor 585 (e.g., contact intensity sensor). In some embodiments, touch-sensitive component 584 is a separate component than display 582. In addition, I/O section 594 can be connected with communication unit 590 for receiving application and operating system data, using Wi-Fi, Bluetooth, near field communication (NFC), cellular, and/or other wireless communication techniques. Device 580 can include input mechanisms 588. Input mechanism 588 is, optionally, a button, in some examples. Input mechanism 588 is, optionally, a microphone, in some examples. Input mechanism 588 is, optionally, a plurality of microphones (e.g., a microphone array).

Electronic device 580 includes speaker 586 for outputting audio. Device 580 can include audio circuitry (e.g., in I/O section 594) that receives audio data, converts the audio data to an electrical signal, and transmits the electrical signal to speaker 586. Speaker 586 converts the electrical signal to human-audible sound waves. The audio circuitry (e.g., in I/O section 594) also receives electrical signals converted by a microphone (e.g., input mechanism 588) from sound waves. The audio circuitry (e.g., in I/O section 594) converts the electrical signal to audio data. Audio data is, optionally, retrieved from and/or transmitted to memory 598 and/or RF circuitry (e.g., in communication unit 590) by I/O section 594.

Memory 598 of personal electronic device 580 can include one or more non-transitory computer-readable storage mediums, for storing computer-executable instructions, which, when executed by one or more computer processors 596, for example, can cause the computer processors to perform the techniques described below, including process 800 (FIG. 8A-8C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 580 is not limited to the components and configuration of FIG. 5J, but can include other or additional components in multiple configurations.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6G illustrate exemplary user interfaces for using a first device to configure a second device, in accordance with some embodiments. The user interfaces in these figures are used to illustrate the processes described below, including the processes in FIG. 8A-8C.

Figure 6A:
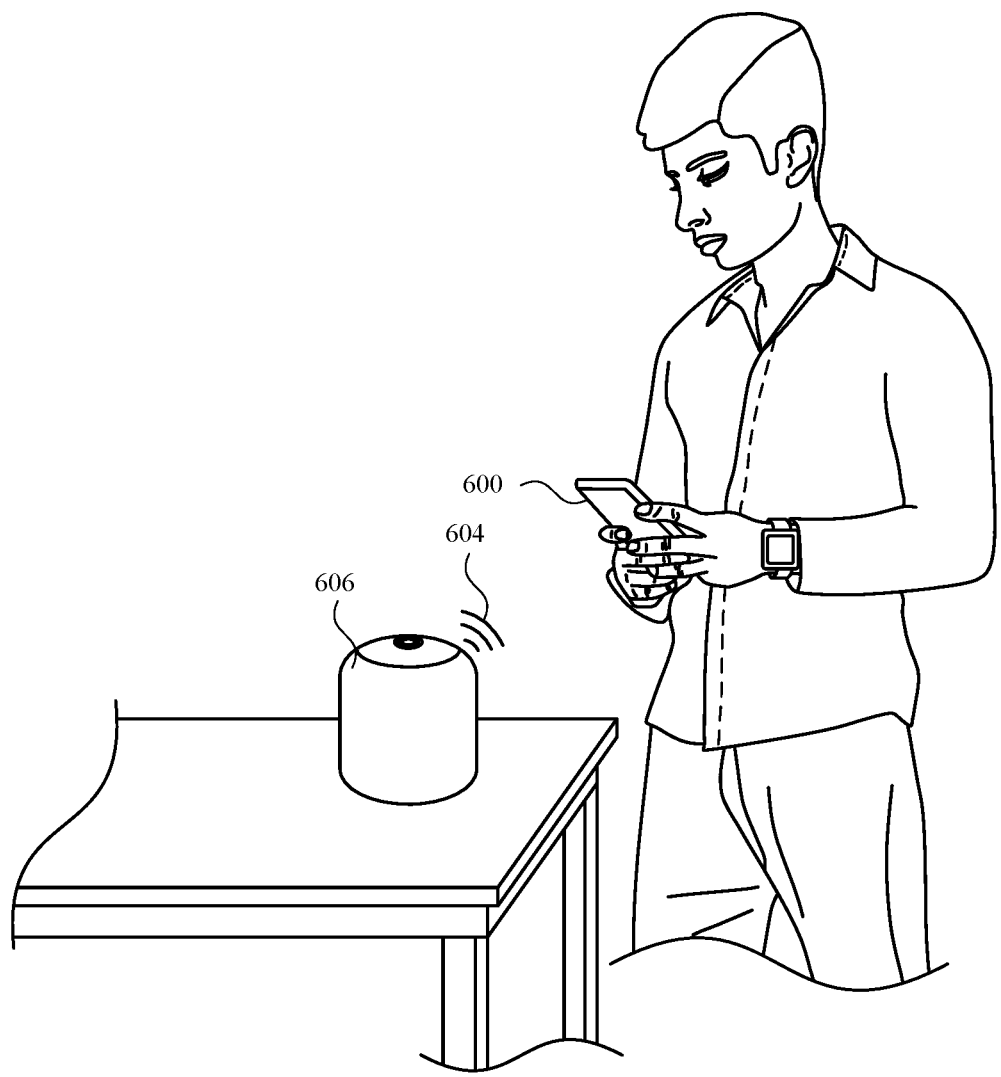
FIGS. 6A-6G illustrate exemplary techniques and user interfaces for configuring an electronic device in accordance with some embodiments.

FIG. 6A illustrates a scenario in which a user brings device 600 into close proximity to device 606. In this example, device 600 is being used to configure device 606 (e.g., an initial configuration after powering on device 606 for the first time). In some embodiments, device 606 includes one or more features of device 580 as described above. In some embodiments, device 606 includes one or more features of device 100, 300, or 500. In some embodiments, device 600 includes one or more features of device 100, 300, or 500. In this example, device 600 is a smartphone device and device 606 is a smart speaker device (also referred to as a "network connected speaker").

As shown in FIG. 6A, device 606 has limited display capabilities, and thus configuration of device 606 can be made easier by the use of another device 600 having more robust display capabilities. In some embodiments, device 606 is a smart home device (e.g., a network connected speaker) that a user places within their home (e.g., in one location, or moving between many locations). In such case, the user has physical access to the device when configuring it, and thus the use of physical proximity can be used as part of an intuitive and easy to use interface for configuring the device 606. Thus, rather than making a user navigate various menus attempting to establish or access communication between a personal device (e.g., device 600) and the device 606, a user can place their personal device near device 606 as shown in FIG. 6A, for example, as part of a configuration process.

As shown in FIG. 6A, device 606 is outputting an audio tone signal 604 (e.g., representing sound waves). In some embodiments, device 606 outputs an audio tone signal (e.g., 604) in response to an indication that device 600 is in close proximity to device 606. In some embodiments, device 600 outputs an audio tone signal (not illustrated) in response to an indication that device 600 is in close proximity to device 606. In some embodiments, the audio tone signals from devices 600 and 606 are synchronized (e.g., are outputted concurrently). In some embodiments, one of the audio tone signals are staggered in time (e.g., device 600 plays a tone first, followed by device 606). In some embodiments, the audio tone signals are harmonically related or compatible.

In some embodiments, an audio tone signal is only output by one device (e.g., to be configured, such as device 606) that is in close proximity to device 600, other than device 600. For example, in some situations, device 600 is placed in close proximity to multiple other devices that can be configured using device 600. For example, a user may have purchased two speakers (e.g., such as device 606) and wishes to configure one of them. In such case, it is useful to the user to be aware of which speaker device 600 has connected to and that will be configured, for example, according to the techniques described below. Thus, even though device 600 is brought into close proximity to two configurable devices, only the configurable device (e.g., device 606) that will be configured during the configuration process will output an audio tone in response to an indication that device 600 is in close proximity.

Figure 6B:
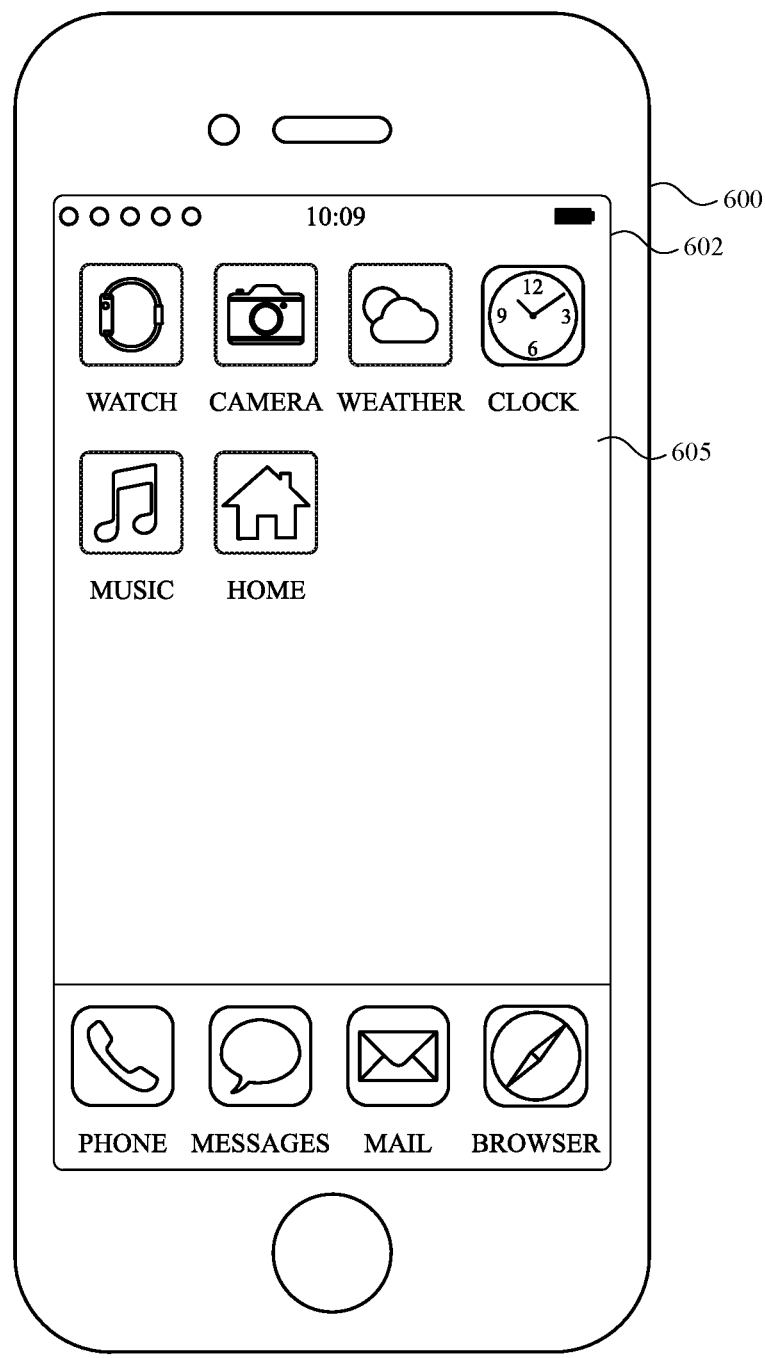

FIG. 6B depicts an exemplary state of device 600 immediately prior to being placed in close proximity to device 606. As shown in FIG. 6B, device 600 displays a home screen 605 on display 602. At FIG. 6C, device 600 is placed into close proximity to device 606 (e.g., is within the proximity zone 608).

Figure 6C:
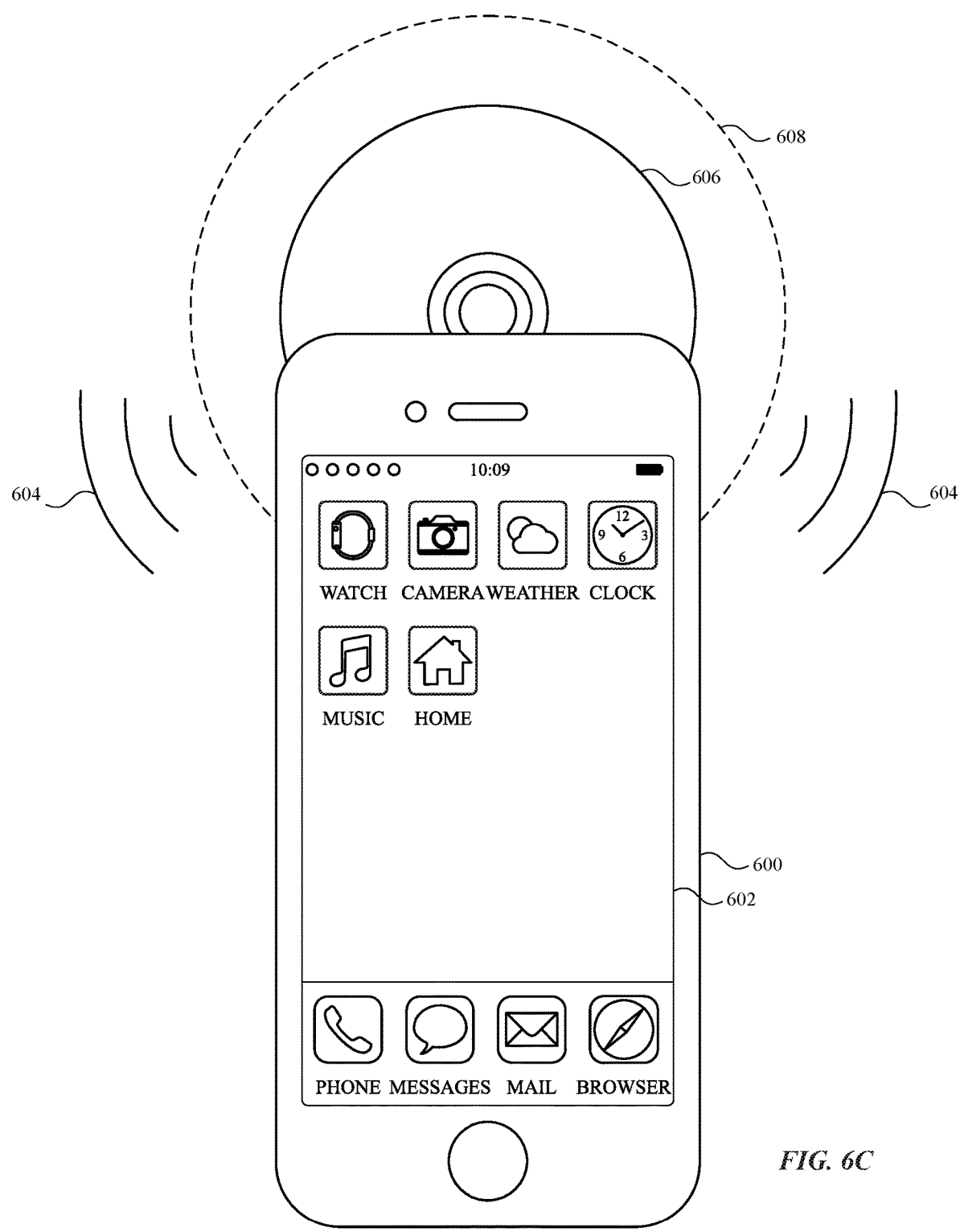

FIG. 6C includes a proximity condition range indicator 608. A proximity condition range indicator is also referred to herein as a "proximity zone indicator" or simply as a "proximity zone". In FIG. 6C, device 600 is within the area indicated by proximity condition range indicator 608 (e.g., is within a threshold distance to device 606). Proximity condition range indicator 608 is included as a visual aid, and is intended to represent a physical proximity (threshold distance) that would satisfy a proximity condition. For example, proximity condition range indicator 608 can represent the range of a near-field communication detection circuitry of device 606. In some embodiments, any appropriate technique can be used to detect proximity between devices. For example, Bluetooth Low Energy is used. For example, peer-to-peer Wi-Fi can is used. For example, wide-band wireless connection is used. Wide-band wireless connection is used, for example, to determine one or more of: directionality, distance, and orientation, of one or more devices. Thus, presence of a detectable device within (e.g., partially or completely) within a threshold distance represented by the proximity condition range indicator 608 would satisfy a proximity condition, but would not if the detectable device is located outside of the range indicator 608. One of skill would appreciate that a detection range of physical proximity can be non-uniform, can be affected by numerous variables (e.g., wireless interference, air humidity, or the like), and can include points in space in three dimensions, all of which are intended to be within the scope of this disclosure. Thus, the graphical representation of proximity condition range indicator 608 is not intended to limit the scope of determining whether a proximity condition is satisfied.

As shown in FIG. 6C, device 606 and device 600 are close together and device 600 is at least partially within the proximity condition range indicator 608. Because proximity condition range indicator 608 represents a physical proximity that satisfies the proximity condition, the first device 606 detects an indication that a physical proximity between the first device and the second device 600 satisfies the proximity condition. In some examples, in accordance with detecting that a proximity condition is satisfied, device 606 initiates a configuration process. For example, the device 606 can enter a configuration mode for receiving configuration data (e.g., settings, account information, and the like) from device 600. In some examples, in accordance with detecting that a proximity condition is satisfied, device 606 proceeds to a next step in a configuration process. For example, if the device 606 is already in a configuration mode, the satisfaction of a proximity condition can cause the device 606 to proceed to a next step. For instance, satisfaction of the proximity condition can be required in order to verify the identity of the second device or verify that the user of device 600 has physical access to device 606 (e.g., is not a user outside of the home that is attempting to remotely access and configure device 606).

Figure 6D:
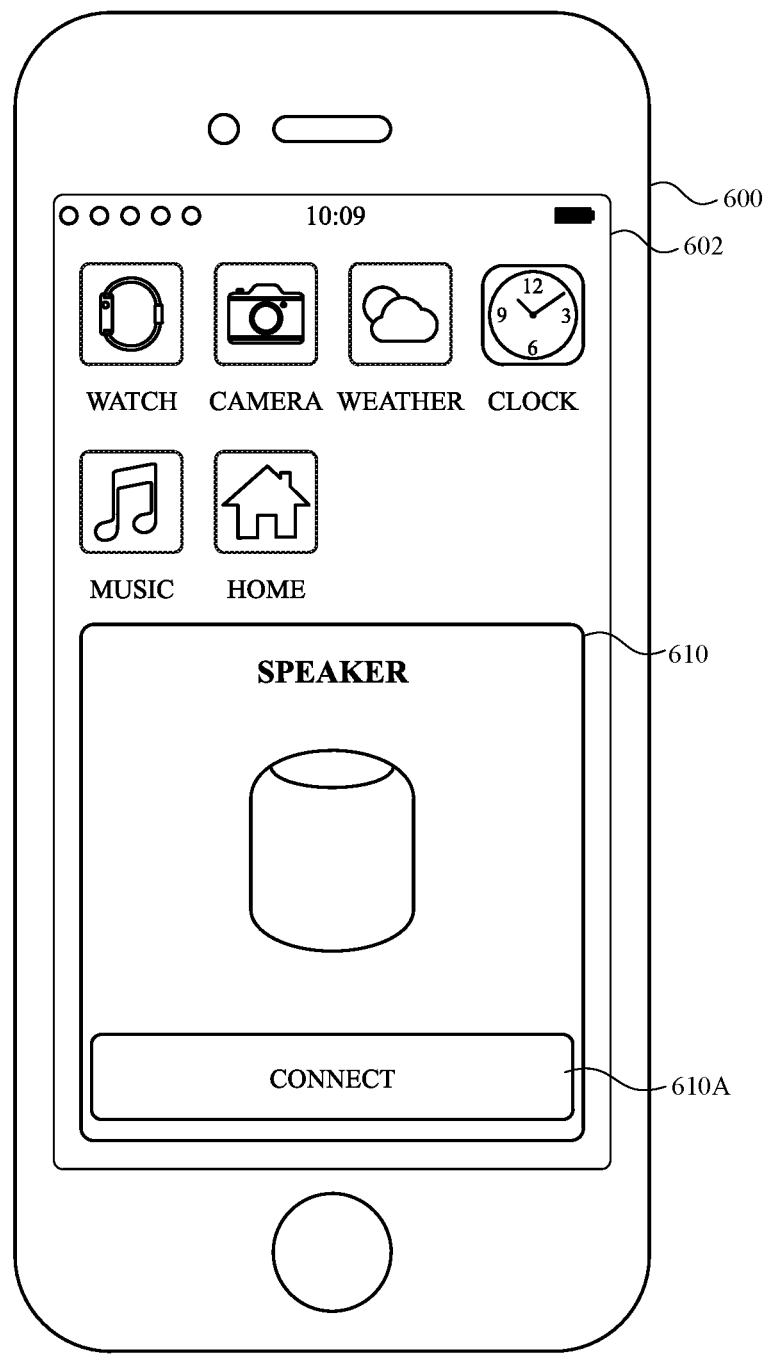

In some embodiments, in response to detecting an indication that device 600 entered into close proximity to device 606 (e.g., satisfied a proximity condition), device 600 displays proximity card 610, as shown in FIG. 6D.

FIGS. 6D-6G illustrate exemplary interfaces of a configuration process, in accordance with some embodiments. In this example, the configuration process is a process for configuring a second device using a first device. Thus, as shown, the interfaces are displayed on a first device (e.g., device 600), and the steps of the configuration process pertain to, for example, transmitting data to the second device (e.g., 606), selecting or entering configuration settings at the first device, and the like. In some embodiments, the steps shown in FIGS. 6D-6G can be displayed in any order (e.g., other than that shown or described herein). In some embodiments, one or more of the steps shown in FIG. 6D-6G are omitted from a configuration process. In some embodiments, one or more steps other than those shown in FIG. 6D-6G are included in a configuration process. In some embodiments, the first device and the second device are devices that include one or more features of devices 100, 300, 500, or 580.

FIG. 6D illustrates an exemplary setup card. In some embodiments, device 600 displays setup card 610 in response to being placed in close proximity to device 606. Thus, a setup card is also referred to herein as a "proximity card". In some embodiments, a device continues displaying a setup or proximity card after being removed from close proximity to another device. In some embodiments, device 600 displays setup card 610 in response to user input representing a request to initiate a configuration process of an external device (e.g., 606). For example, user input selection of a displayed affordance (e.g., without requiring proximity) can cause setup card 610 to be displayed.

As shown in FIG. 6D, setup card 610 includes an identification of the device to be configured, which is the device (e.g., 606) that device 600 was placed in close proximity to. As shown, setup card 610 includes the title "Speaker" (e.g., device 606 is a smart speaker), as well as an image depicting the device (e.g., in the shape of device 606 as shown in FIG. 6A). Setup card 610 also includes affordance 610A. In some embodiments, device 600 initiates a configuration process (or otherwise proceeds to a next step in a configuration process) in response to receiving selection of affordance 610A. During the configuration process, device 600 can display interfaces for configuring various features of device 606, including a voice assistant function, profile information, and network connection settings.

Figure 6E:
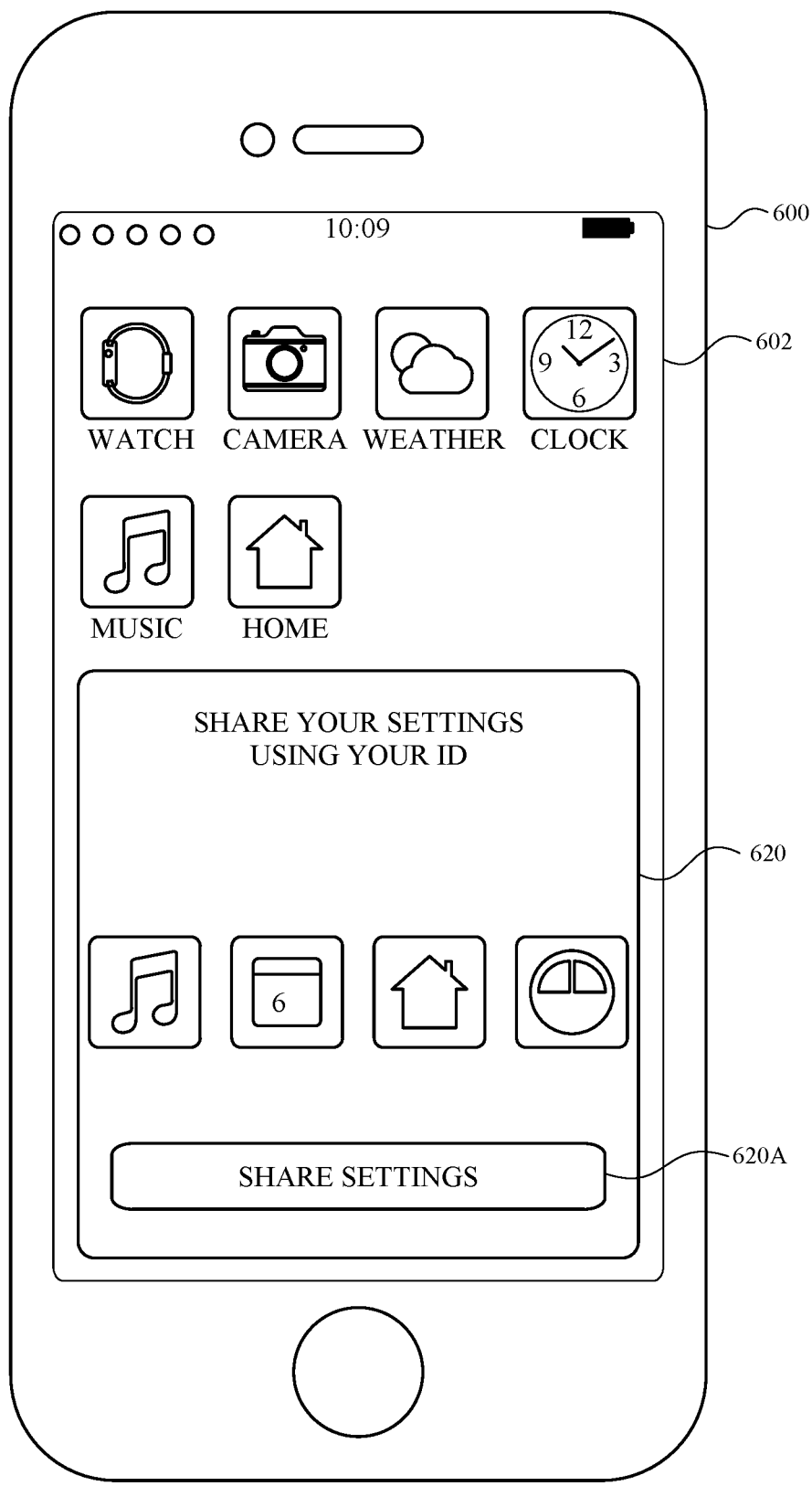

FIG. 6E illustrates an exemplary interface for sharing settings that can be displayed during a configuration process. Setup card 620 of FIG. 6E includes a prompt to the user to share settings with device 606 ("Share Settings"). In some embodiments, a prompt to share settings includes an indication of the settings to be shared. For example, setup card 620 includes graphical depictions representing the settings that will be shared between device 606 and device 600 (e.g., music data, calendar data, home data, or the like). In some embodiments, the settings shared are copied from the settings of the first device (e.g., 600). For example, device 600 configures device 606 to use preferences, profiles, and/or settings already associated with device 600. This can save the user the time and effort needed to manually select their preferred settings that already exist on device 600. In some embodiments, the shared settings data includes data configuring the second device (e.g., 606) to use a particular local area network (e.g., a Wi-Fi network). For example, in response to selection of affordance 620A, device 600 configures device 606 to connect to the Wi-Fi network that is being used by device 600 during the configuration process. In this example, device 600 configures device 606 to use the Wi-Fi network having the service set identifier ("SSID"): "OLD_NETWORK". For example, device 600 transmits (to device 606) the SSID of the network, along with any tokens, keys, or passwords necessary to gain access to the network "OLD_NETWORK", if the network is secured.

In some embodiments, device 600 transmits the settings information to device 606 in response to user input selection of the affordance 620A (labeled "Share Settings") of card 620. In some embodiments, in response to user input selection of the "Share Settings" affordance 620A of card 620, device 600 displays setup card 630 (FIG. 6F).

Figure 6F:
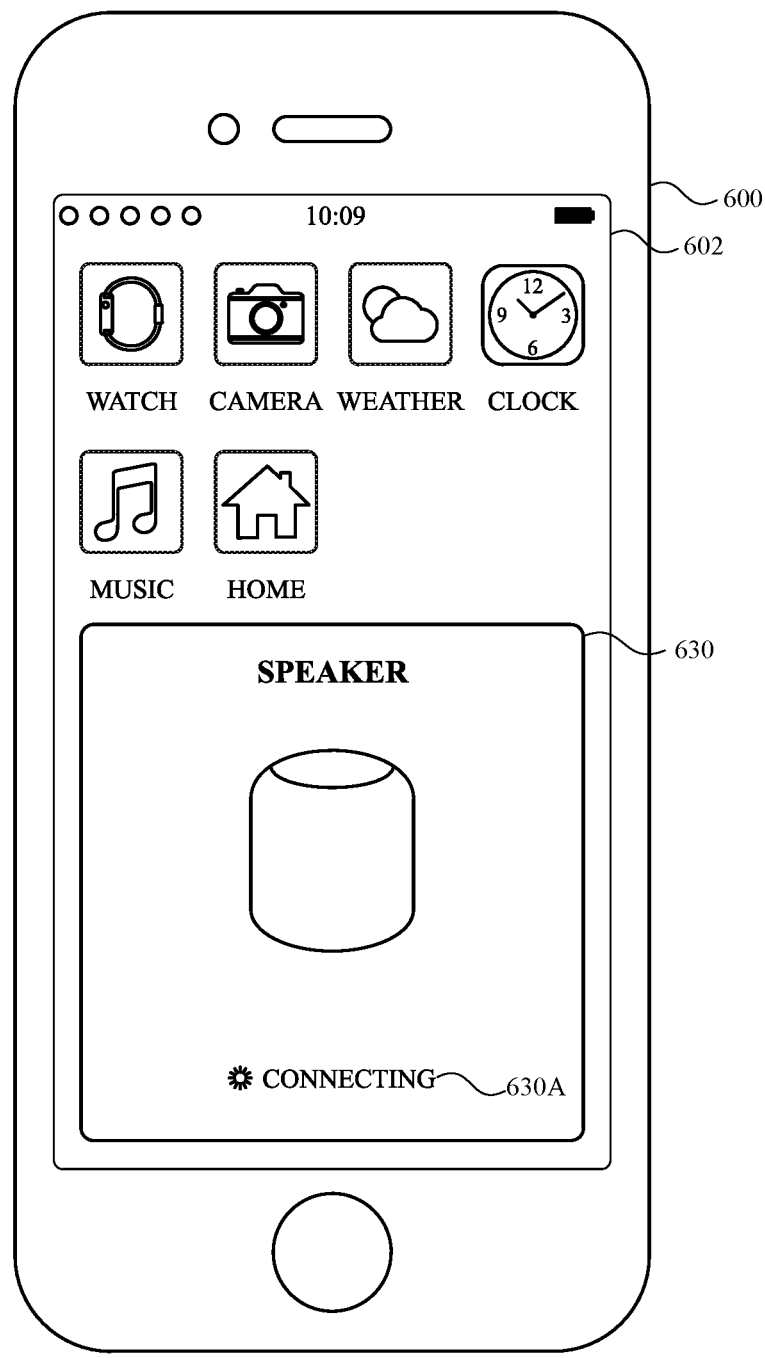

At FIG. 6F, device 600 displays setup card 630. In some embodiments, device 600 displays setup card 630 in response to user input selection of affordance 620A. In some examples, setup card 630 is displayed while device 600 exchanges data with device 606 (e.g., device 600 is transmitting settings data as described above). For example, setup card 630 includes status 630A showing that the devices are connecting (or otherwise exchanging data).

Figure 6G:
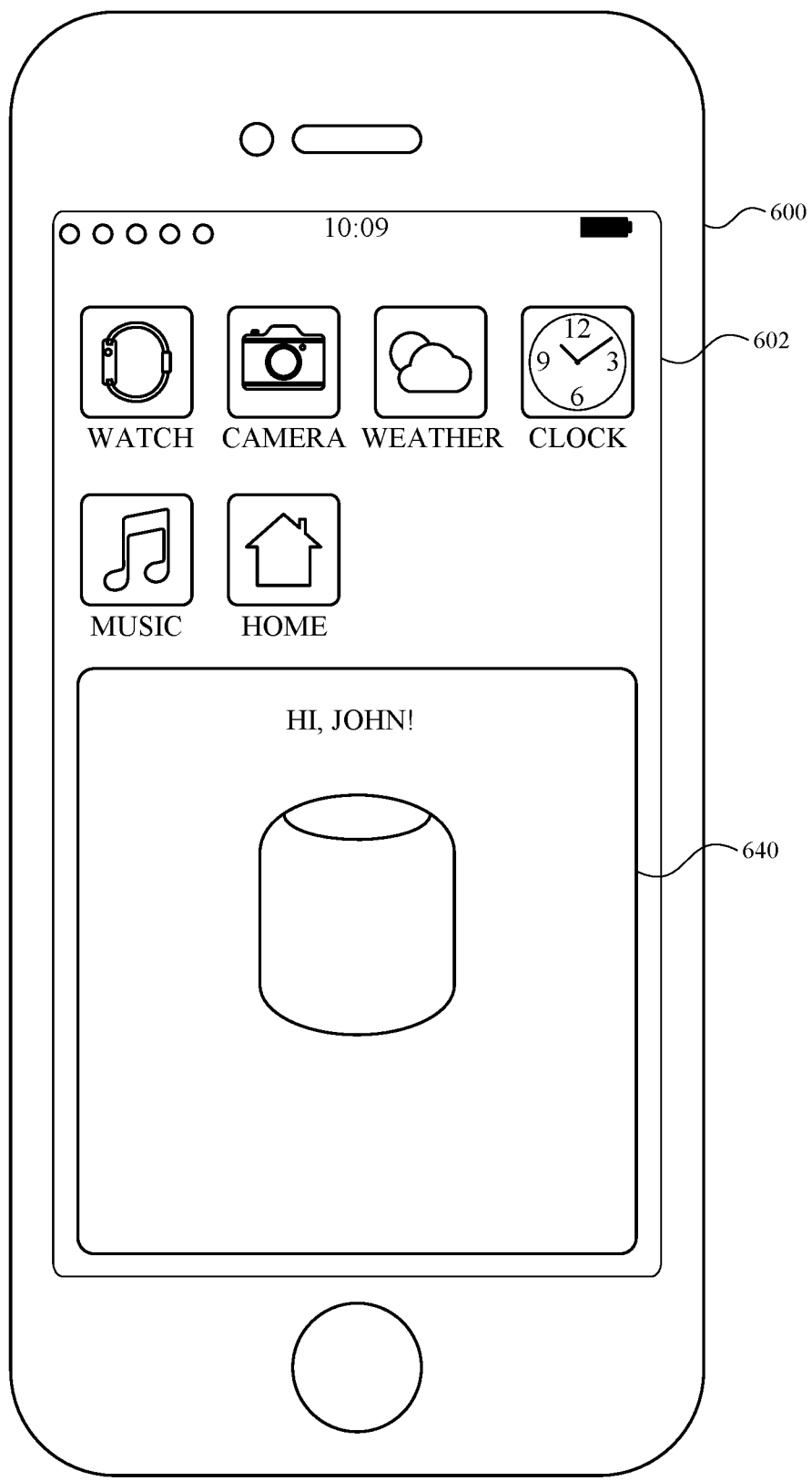

FIG. 6G illustrates an exemplary interface after successful configuration of a second device by a first device. FIG. 6G depicts setup card 640, which includes an indication of the user's name. In this example, the user ("John") is greeted by name ("Hi, John!"), indicating that device 606 successfully received the user's account data and/or other settings data. Device 600 optionally displays setup card 640 after setup card 630. In some embodiments, setup card 640, includes a depiction of device 606 and a check mark icon, indicating a successful data transfer (e.g., settings were successfully shared) or configuration (e.g., configuration is complete). In some embodiments, device 600 displays setup card 640 in response to user input representing a request to share settings (e.g., selection of affordance 620A).

Accordingly, upon successful configuration of device 606 with the settings of device 600, device 606 is configured to connect to the wireless network with the SSID "OLD_NETWORK". However, there may be situations in which the user would like to alter the network settings of the configured external device after the configuration process is complete, but without repeating the entire initial configuration process (e.g., which can involve deleting all settings on device 606). For example, the user of devices 600 and 606 can desire to make such a change to the network settings of the external device if they change the SSID of their home wireless network, if they move device 606 (e.g., temporarily) to a new location, or if their device 600 was connected to the wrong wireless network during the initial configuration process (e.g., inadvertently). Techniques and interfaces for doing so are now discussed.

FIGS. 7A-7J illustrate exemplary interfaces for configuring a network setting of an external electronic device. The interfaces can be displayed by a first electronic device and used to, for example, change the network settings of a second, external electronic device subsequent to completing configuration of the second electronic device. The user interfaces in these figures are used to illustrate the processes described below, including the processes in FIG. 8A-8C.

Figure 7A:
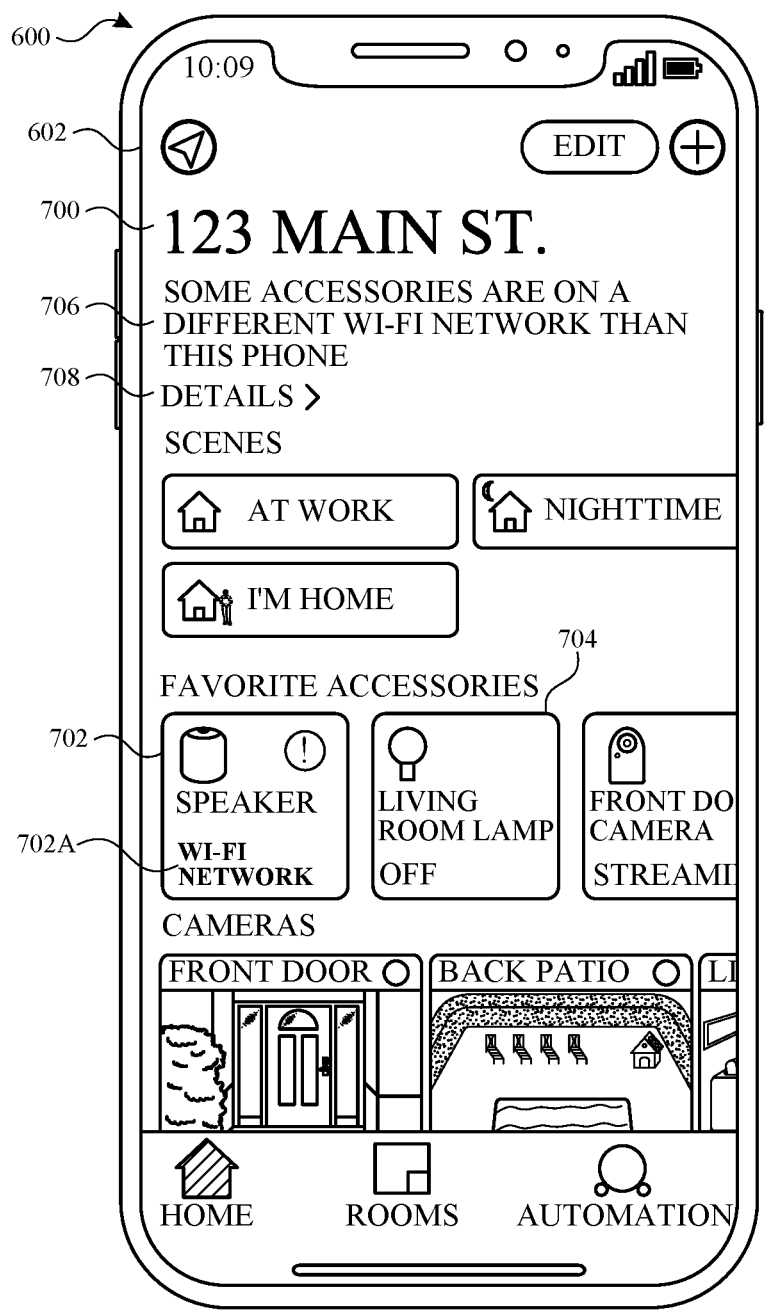
FIGS. 7A-7J illustrate exemplary techniques and user interfaces for configuring an electronic device in accordance with some embodiments.
Figure 8B:
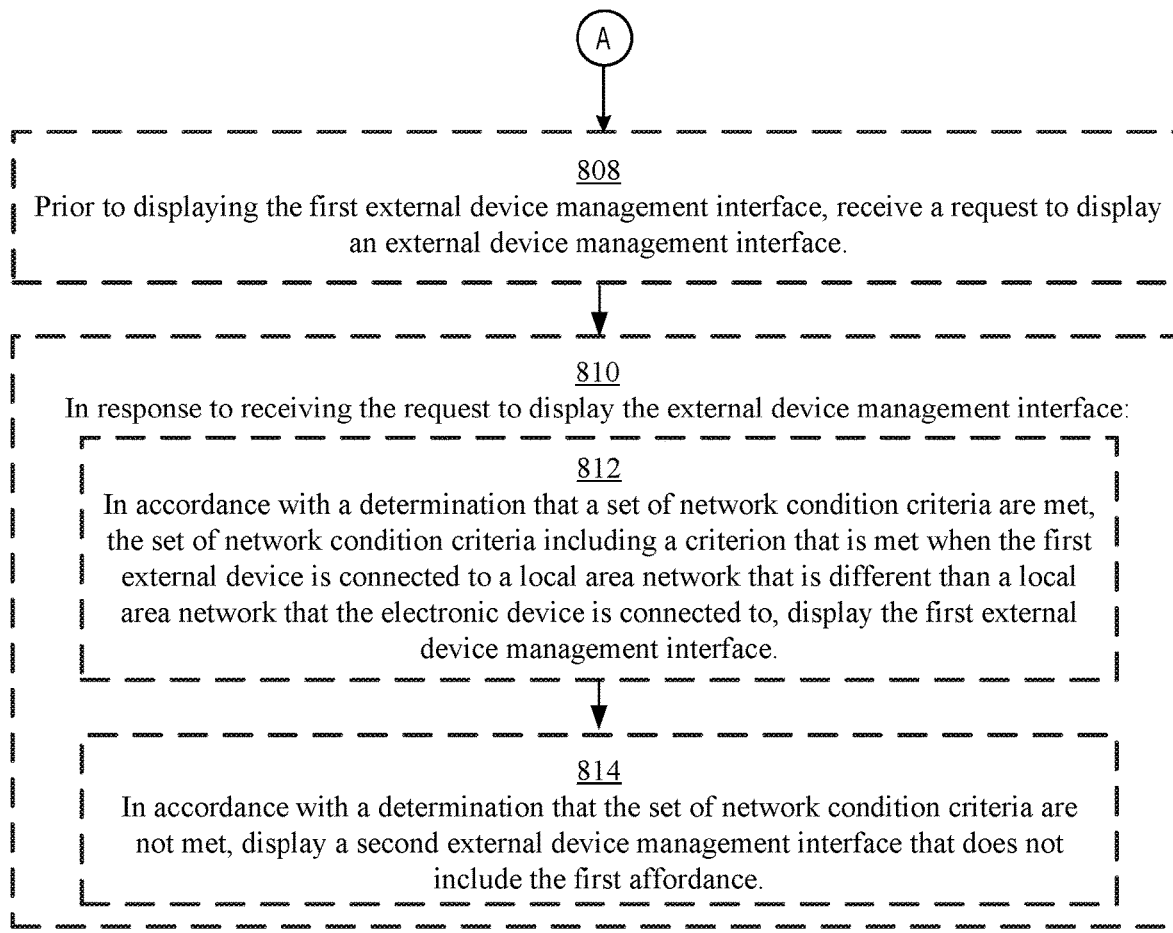
Figure 8B:
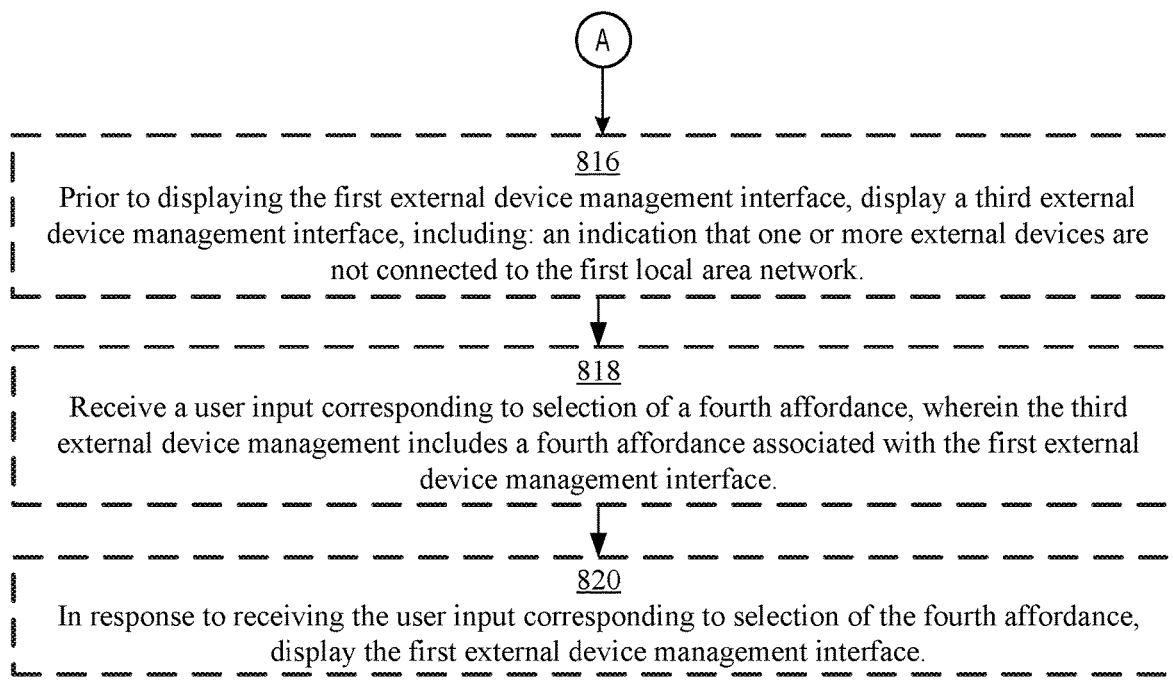
Figure 8C:
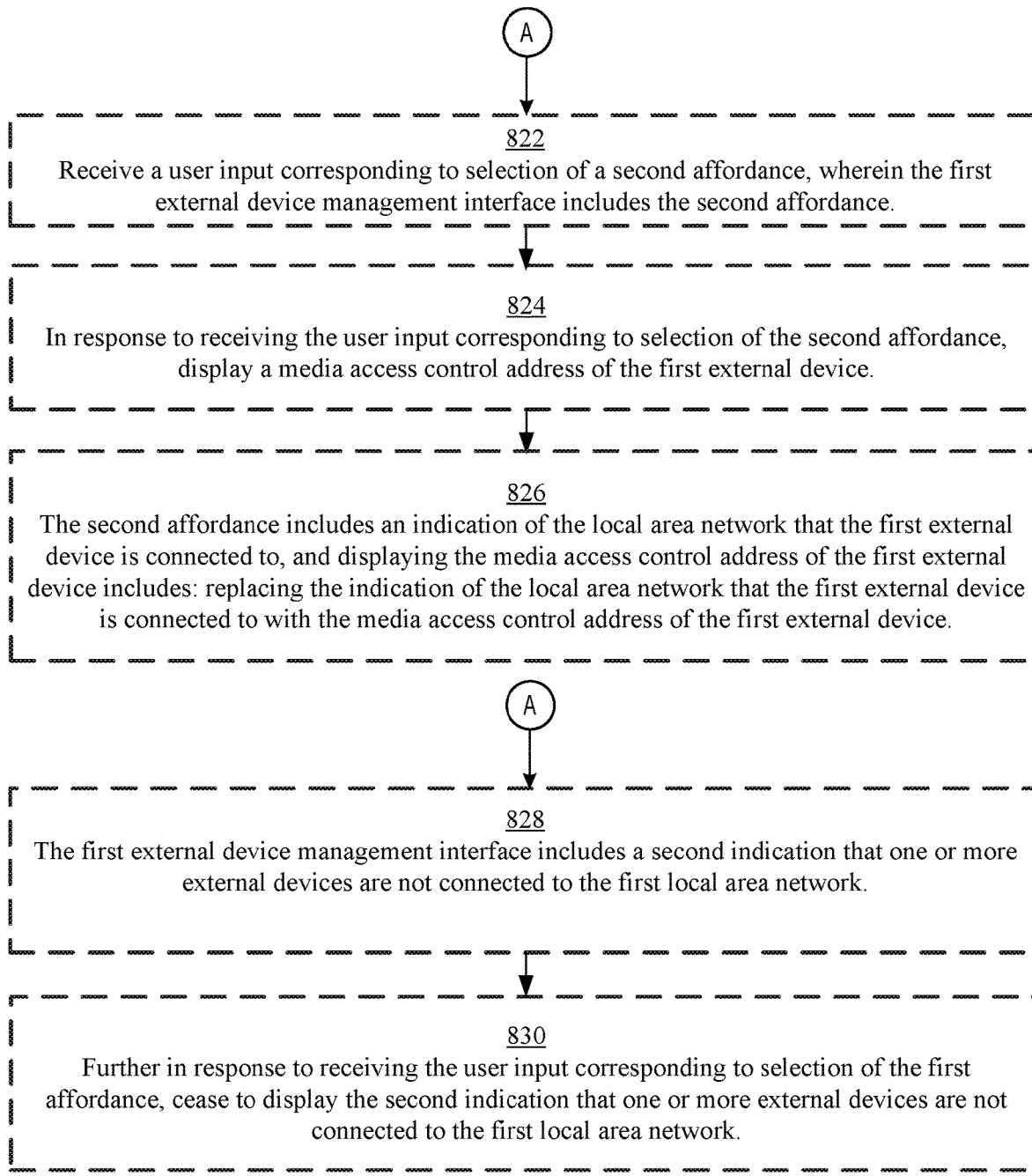

FIG. 7A illustrates electronic device 600 with touch-sensitive display 602. In FIG. 7A, device 600 displays a home user interface 700 of an application for managing devices (e.g., controllable devices) associated with a location 123 Main St. Home user interface 704 includes, inter alia, the name of the location (123 Main St.), a device representation 702 corresponding to a second electronic device (e.g., device 606), a device representation 704 corresponding to a third electronic device (e.g., a smart home device that is a lamp), a status message 706, and a status detail affordance 708.

As shown in FIG. 7A, device representation 702 represents an external electronic device, device 606. In this example, device 606 was configured in accordance with the setup process described above with respect to FIGS. 6A-6G. Thus, device 606 was configured with the wireless network settings of device 600 at the time of configuration, and is currently connected to the Wi-Fi network having the Wi-Fi SSID "OLD_NETWORK".

Device 600 can allow a user to subsequently (e.g., after the initial configuration) modify which local area network (e.g., Wi-Fi network) that device 606 connects to.

In some embodiments, the device (e.g., 600) displays an indication if the external device (e.g., 606) is connected to a different local area network than the device. For instance, in this example, device 600 is now currently connected to a local area network having the Wi-Fi SSID "NEW_NETWORK". Thus, as shown in FIG. 7A, home user interface 700 includes status message 706, which notifies of a mismatch between the local area network settings of the device (e.g., 600) and an external device (e.g., 606)—specifically, that a device (e.g., device 606) associated with the location and device 600 are respectively connected to different Wi-Fi networks. Status message 706 in FIG. 7A reads: "SOME ACCESSORIES ARE ON A DIFFERENT WI-FI NETWORK THAN THIS PHONE".

In some embodiments, a device representation (e.g., 702) corresponding to an external device includes a status message (e.g., 702A) identifying a mismatch between the network settings of the device (e.g., 600) and the corresponding external device (e.g., 606). For example, in FIG. 7A, device representation 702. Includes a status message 702A (e.g., and an exclamation icon) notifying that there is an issue with the Wi-Fi network settings of device 606.

In some embodiments, a status message (e.g., 706, 702A) is displayed in a different color than surrounding text. For example, the status message 702A can be displayed in a red color, while text surrounding text is black or grey, drawing the user's attention to the message.

In some embodiments, a status message (e.g., 706, 702A) is displayed only when the device (e.g., 600) and the external device (e.g., 606) are within a threshold proximity to each other. For example, if both device 600 and device 606 are connected to the Internet, device 600 can access and display the status of device 606 (e.g., at a home user interface), even when the devices are not in close proximity (e.g., device 600 is with the user at their place of work, and device 606 remains in the user's home several miles away from work). Given the distance, it is to be expected that the devices will be connected to different local area networks (e.g., device 600 is connected to the user's work network, and device 606 remains connected to the user's home network). In this way, when the user accesses home user interface 700 on device 600, they are not presented an irrelevant status message 706 notifying of a mismatch between the respective local area networks then being used by device 600 and device 606. In some embodiments, a threshold proximity is determined based on the devices being within the range of each other based on one or more of: Bluetooth (e.g., Bluetooth Low Energy) range or peer-to-peer Wi-Fi range. For example, device 600 detects that it is within peer-to-peer Wi-Fi range of device 606, and that device 606 is connected to a different wireless network, and thus displays status message 706 at home status interface 700. The threshold proximity used to conditionally display a status message (e.g., 706, 702A) can be the same or different (e.g., greater) than a threshold proximity used to initiate a configuration process, as described above with respect to FIGS. 6A-6G.

Figure 7B:
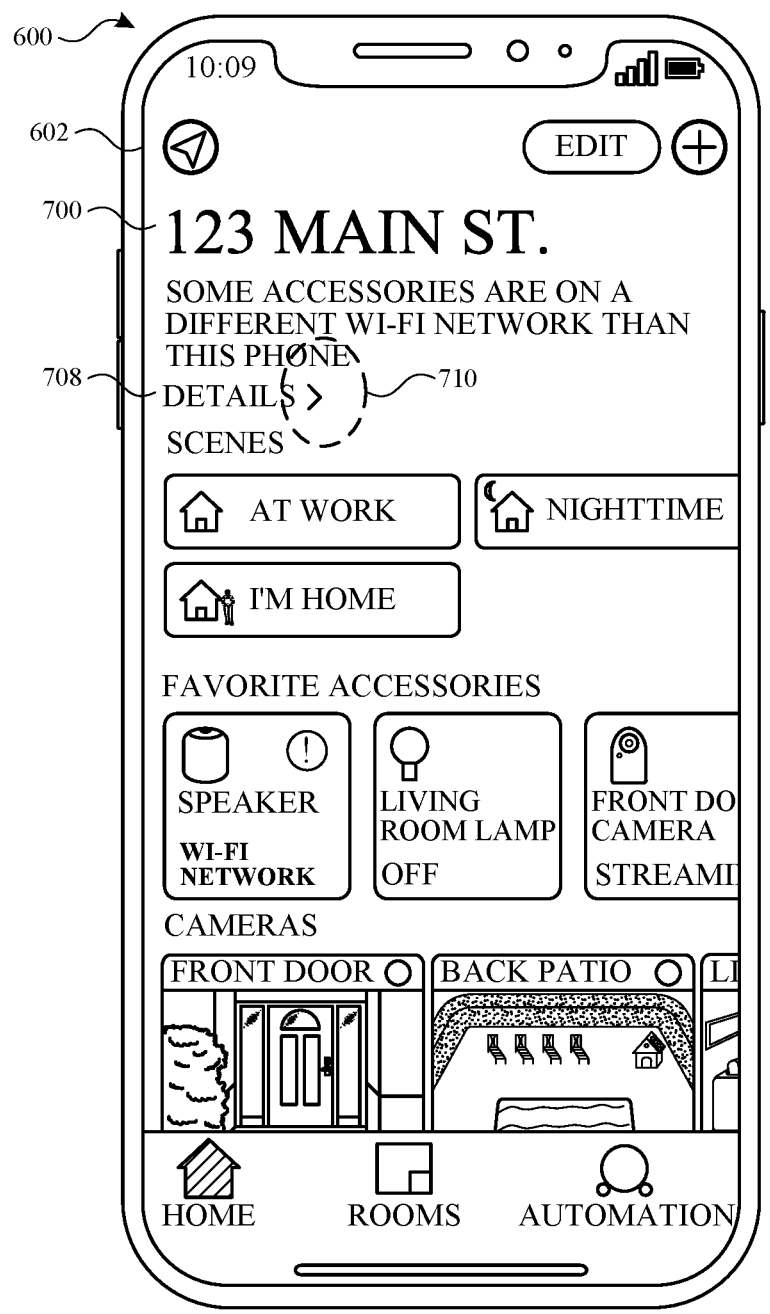
Figure 7C:
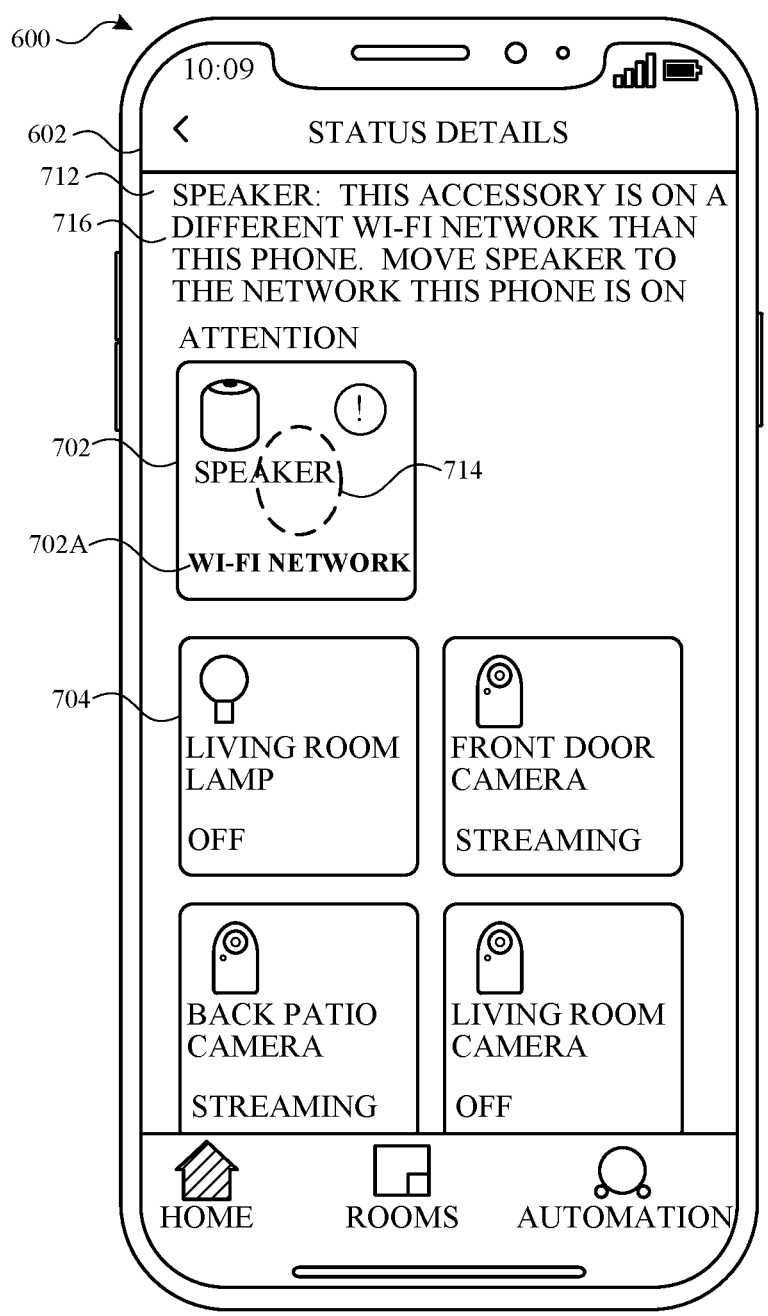

In FIG. 7B, device 600 receives (e.g., detects) user input 710 (e.g., a tap) representing selection of a status detail affordance 708 and, in response, displays home status interface 712 as shown in FIG. 7C. In some embodiments, user input representing selection of a status message (e.g., 706) causes the device to display a home status interface (e.g., 712).

FIG. 7C illustrates an exemplary home status interface 712. In some embodiments, a home status interface (e.g., 712) includes the status of one or more devices (e.g., 606) associated with the location (e.g., 123 Main St.) associated with the application for managing devices. In this example, home status interface 712 includes status message 716, identifying a mismatch between the network settings of the device (e.g., 600) and one or more accessories (e.g., devices) associated with the location (e.g., such as external device 606). Message 716 is similar to, and can include the features as described herein with respect to message 706. In FIG. 7C, message provides more detail (than message 706), and identifies the specific device(s) (in this example, the device named "SPEAKER") that has a mismatch of Wi-Fi with device 600. Message 716 reads: "SPEAKER: THIS ACCESSORY IS ON A DIFFERENT WI-FI NETWORK THAN THIS PHONE. MOVE SPEAKER TO THE NETWORK THIS PHONE IS ON". In some embodiments, a home status interface includes one or more device representations (e.g., 702). For example, home status interface 712 also includes device representation 702 associated with device 606, and device representation 704 associated with a smart device that is a lamp (e.g., that can be turned on or off using the application). In FIG. 7C, home status interface 712 includes device status information associated with a respective device representation. For example, device representation 702 includes status message 702A, and device representation 704 includes the status of the lamp ("OFF").

In some embodiments, a home status interface includes an area that includes one or more device representations of devices that are associated with a particular status (e.g., an error condition or abnormal status). For example, in FIG. 7C, home status interface 712 includes the area labeled with the heading "ATTENTION", and includes device representation 702 and status message 702A, indicating the Wi-Fi mismatch. Note that the remaining device representations (e.g., 704) with normal statuses (e.g., "OFF", "STREAMING"), are presented below device representation 702, and not in the area labeled "ATTENTION". In some embodiments, status message 716 is relevant to two or more devices identified having a mismatch in network settings. For example, if there were two devices with a network mismatch, message 716 can identify this issue and read "SPEAKER 1 AND SPEAKER 2: THESE ACCESSORIES ARE ON A DIFFERENT WI-FI NETWORK THAN THIS PHONE. MOVE THESE SPEAKERS TO THE NETWORK THIS PHONE IS ON." In such embodiments, representations of each of the two or more devices having a mismatch can be displayed under the indication "ATTENTION".

In some embodiments, status interface 712 is displayed without an affordance for changing the network setting of one or more external devices. In such embodiments, affordance 732 of FIG. 7E is the primary (or only) affordance for causing a network setting of the external device (e.g., 606) to be updated.

In some embodiments, at least a portion of a status message (e.g., 716) is an affordance for changing a network setting of one or more external devices. For example, at least a portion (e.g., the portion with text "MOVE THIS SPEAKER TO THE NETWORK THE PHONE IS ON") of message 716 can be selectable to cause the Wi-Fi mismatch to be resolved. In some embodiments, a status message (e.g., 716) is displayed concurrently with an affordance for changing a network setting of one or more external devices. For example, status message 716 can be displayed adjacent to a separate affordance. In some embodiments, a device (e.g., 600) receives user input representing selection of an affordance (e.g., 716) for changing a network setting of an external device (e.g., 606) displayed at a home status interface (e.g., 712) and, in response, causes a network setting of the external device (e.g., 606) to be updated. For example, user input representing selection of affordance 716 at home status interface 712 can cause device 600 to perform any of the functions described below with respect to selection of affordance 732 of FIG. 7E. For instance, device 600 can cause device 606 be connected to the network with the SSID "NEW_NETWORK" in response to receiving selection of affordance 716. In some embodiments, in response to receiving user input selection of an affordance (e.g., 713) at a home status interface, a device (e.g., 600) displays a device detail interface (e.g., 730). For example, in response to receiving selection of affordance 716, device 600 displays device detail interface 730 as shown in either of FIGS. 7E, 7F, or 7G.

At FIG. 7C, device 600 receives user input 714 corresponding to selection of device representation 702. In this example, user input 714 is a deep press (e.g., a touch with a characteristic intensity that exceeds an intensity threshold that is greater than a touch detection intensity threshold).

User input 714 can also be a tap gesture, or a tap and hold (e.g., a touch exceeding a threshold duration).

Figure 7D:
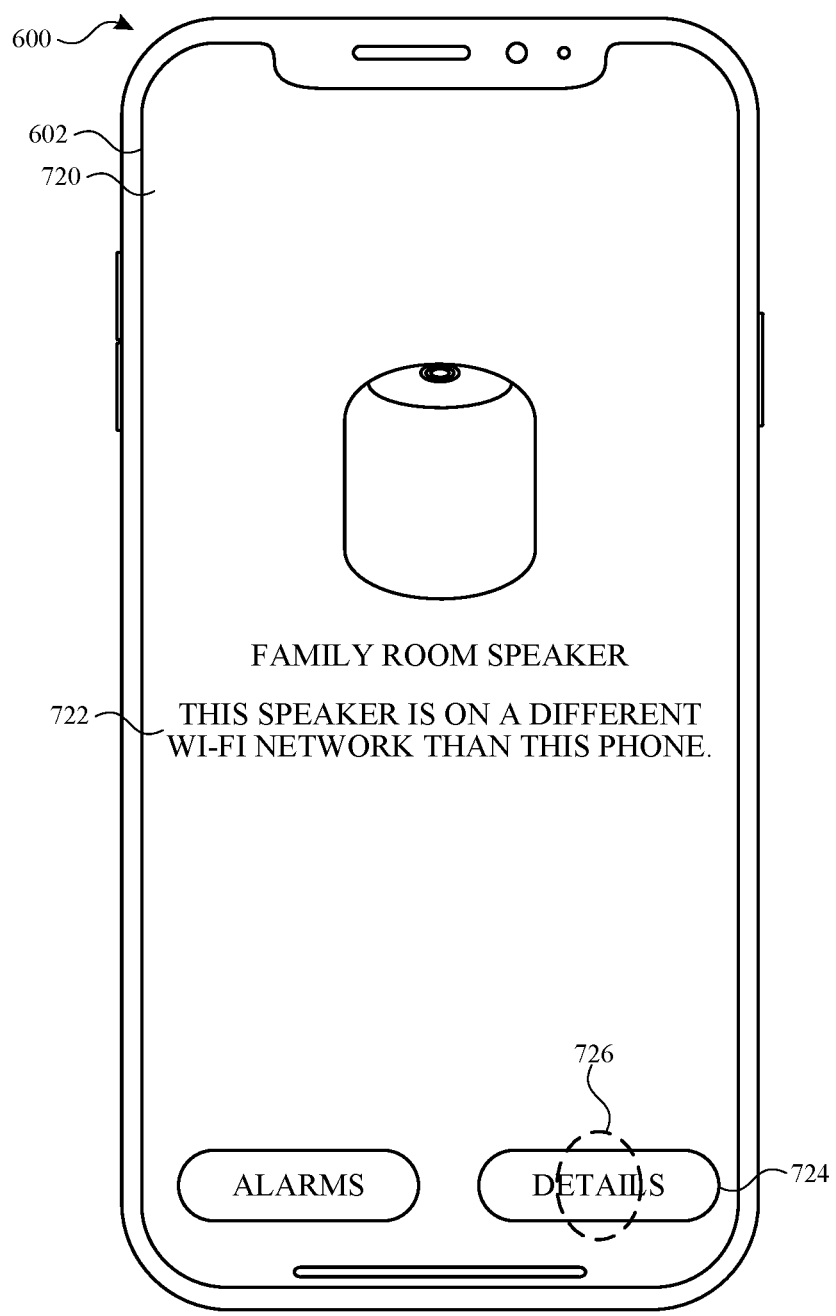
Figure 7E:
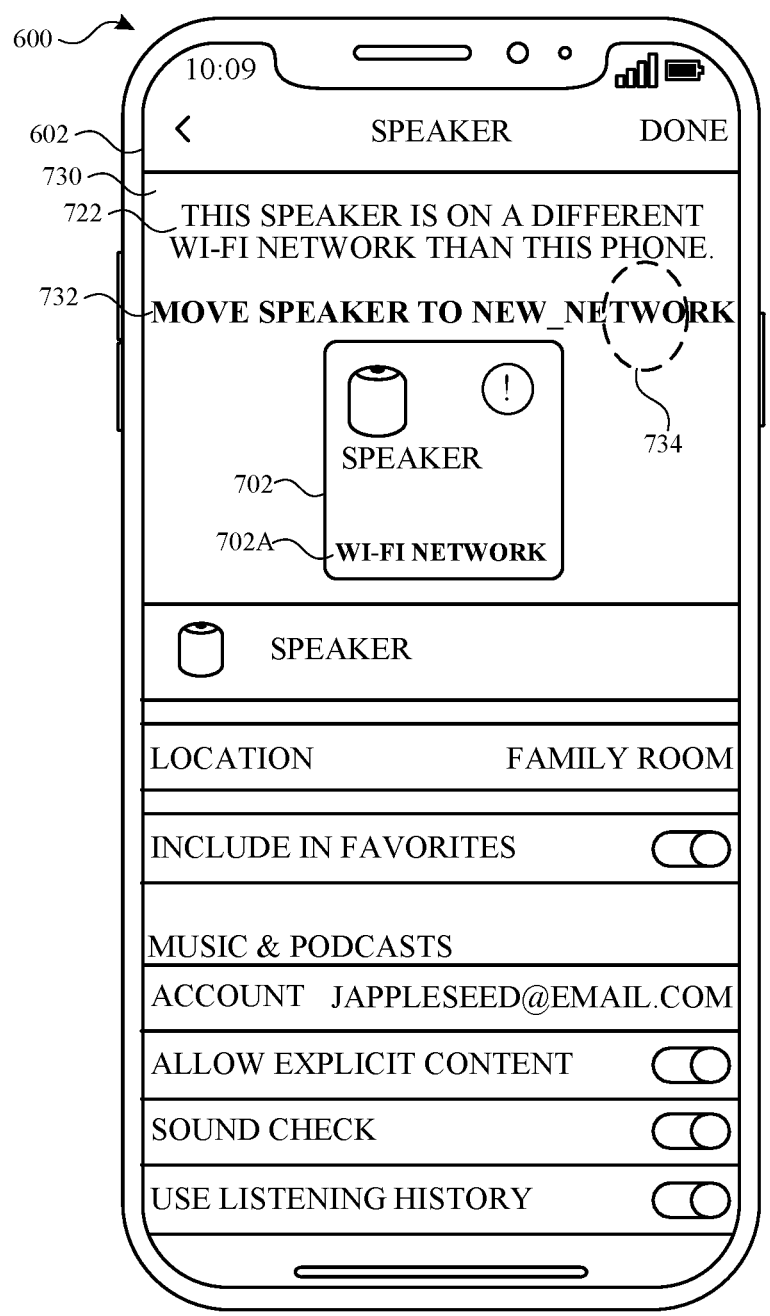

FIG. 7D illustrates an exemplary device status interface 720. For example, device 600 displays device status user interface 720 in response to receiving user input 714. Device status interface 720 includes a status message about the current status of external device 606 (named "FAMILY ROOM SPEAKER"), which includes a status message 726 notifying of a mismatch between the network settings of the device (e.g., 600) and the external device (e.g., 606). Notably, status message 726 specifically identifies that the currently selected device 606 is connected to a different Wi-Fi network than the device 600 displaying status interface 720: "THIS SPEAKER IS ON A DIFFERENT WI-FI NETWORK THAN THIS PHONE". Device status interface 720 also includes affordance 724, for accessing additional details regarding corresponding device 606. As shown in FIG. 7D, device 600 receives user input 726 (e.g., a tap) corresponding to selection of affordance 724.

FIG. 7E illustrates an exemplary device detail interface 730. For example, device detail interface 730 is displayed in response to user input 726. In another example, device detail interface 730 is displayed in response to user input at a home status interface (e.g., 712), such as selection (e.g., deep press) of device representation 702. In some embodiments, a device detail interface includes one or more of status messages, identifying information, and options for configuring the settings of the corresponding external device (e.g., 606). In this example, device detail interface 730 includes device representation 702, that also includes status message 702A, which is displayed in red.

As shown in FIG. 7E, device detail interface 730 includes status message 722, notifying of a mismatch between the network settings of the device (e.g., 600) and the external device (e.g., 606). Device detail interface 730 also includes an affordance 732 for changing the network settings of the external device 606 to match device 600, As shown in FIG. 7E, affordance 732 includes the text "MOVE SPEAKER TO NEW_NETWORK", where "NEW_NETWORK" is the name of the Wi-Fi network that device 600 will configure device 606 to connect to (and to which device 600 is currently connected).

As shown in FIG. 7E, device 600 receives user input 734 (e.g., a tap) corresponding to selection of affordance 732.

In some embodiments, a device (e.g., 600) displays an affordance (e.g., 732), for changing the network settings of an external device (e.g., 606) to match the device, at one or more of a home user interface (e.g., 700), a home status interface (e.g., 712), and a device status interface (e.g., 720). For example, affordance 732 can be displayed directly at home user interface 700, allowing the user to resolve the Wi-Fi mismatch without navigating to another interface.

In some embodiments, in response to selection of an affordance (e.g., 732) for changing a network setting of an external device, the device (e.g., 600) causes a network setting of the external device (e.g., 606) to be updated. For example, device 600 transmits data causing device 606 to update a stored network setting in response to selection of affordance 732. In some embodiments, causing a network setting of the external device to updated comprises causing the external device to connect to a network being used by the device (e.g., 600), that is not being used by the external device (e.g., 606). For example, in response to user input selection 734 of affordance 732, device 600 causes device 606 to cease being connected to "OLD_NETWORK" and to connect to "NEW_NETWORK" (which device 600 is connected to). Such an action is useful, for example, where device 606 has been moved (e.g., taken along with the user while on vacation, where the user's home network is not available) or where device 606 was erroneously configured with incorrect network information (e.g., at the time of configuration, device 600 was inadvertently connected to a neighbor's Wi-Fi network, and thus configured device 606 to connect to the neighbor's network rather than the user's own home network).

Figure 7F:
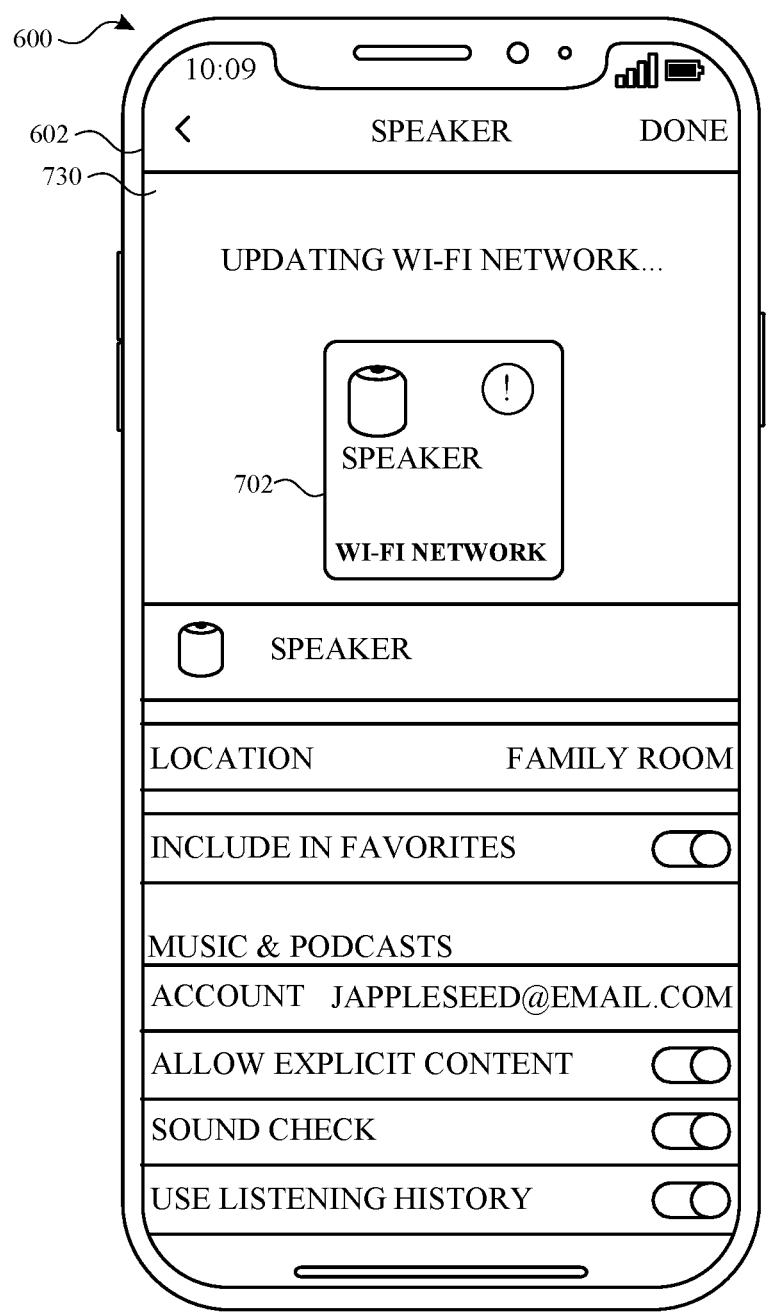

FIG. 7F illustrates an exemplary device detail user interface 730 displayed while the network settings of device 606 are being updated. For example, device detail user interface 730 of FIG. 7F includes the message "UPDATING WI-FI NETWORK . . . " and is displayed in response to receiving user input 734 corresponding to selection of affordance 732.

Figure 7G:
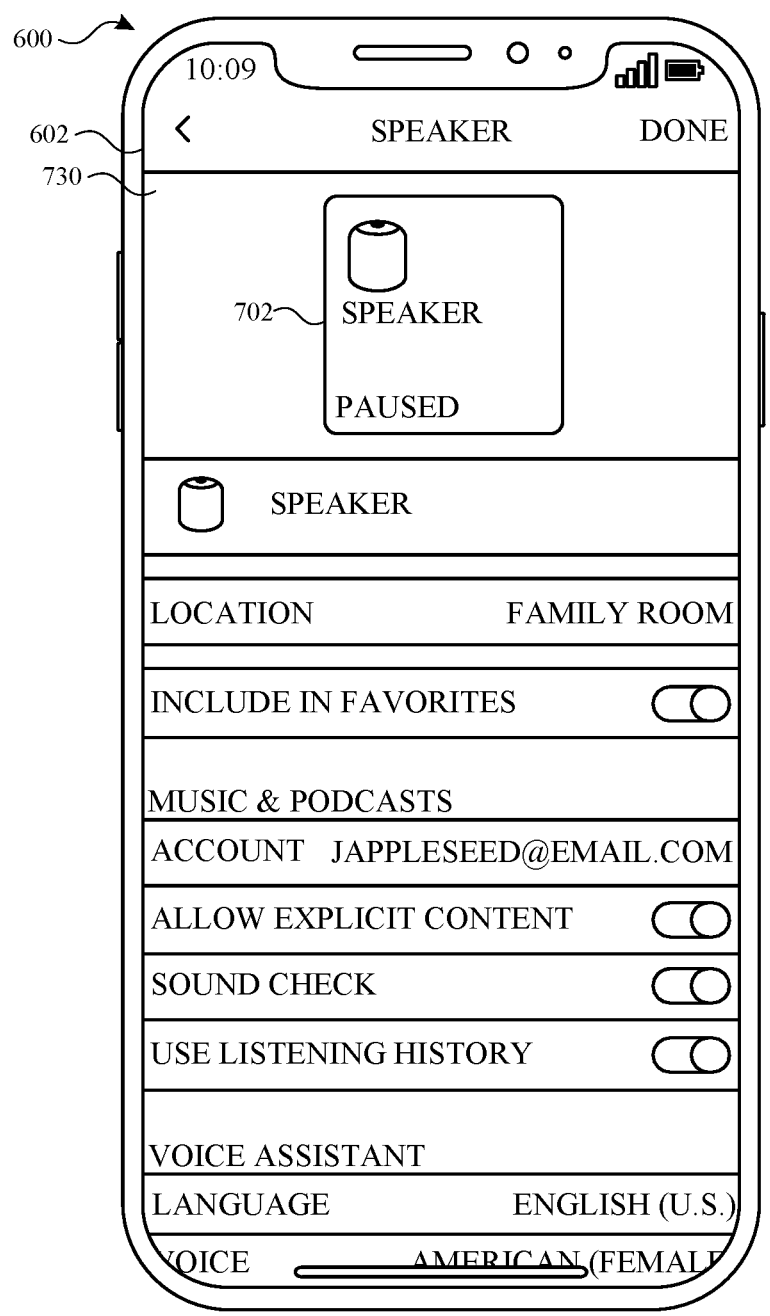

FIG. 7G illustrates an exemplary device detail user interface 730 displayed by a device (e.g., 600) when there is no mismatch between the network settings of the device and the external device (e.g., 606). For example, device 600 displays interface 730 as shown in FIG. 7G in response to receiving user input 734 corresponding to selection of affordance 732 (e.g., subsequent to, or instead of, interface 730 as shown in FIG. 7F). As shown in FIG. 7G, device detail user interface 730 no longer includes status message 722 notifying of the Wi-Fi mismatch. Additionally, affordance 732 is no longer displayed because the device 606 is now connected to the same wireless network as device 600. For example, device 600 and device 606 are now both connected to the wireless network "NEW_NETWORK", which is the preferred network because the user's personal device 600 (e.g., a smartphone) is connected to it. Also shown in FIG. 7G, device representation 702 no longer includes status message 702A (notifying of the mismatch), and now includes a normal status message associated with device 606 (e.g., the speaker is paused).

Figure 7H:
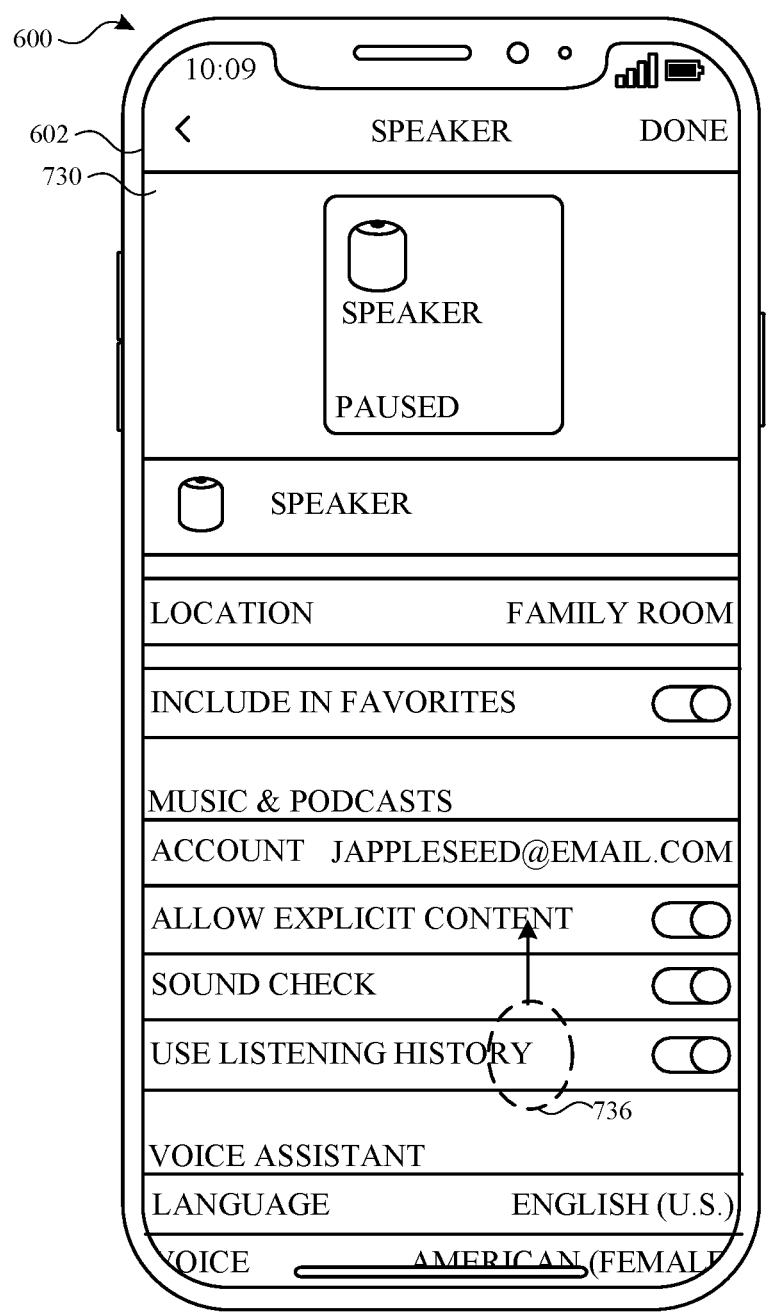
Figure 7I:
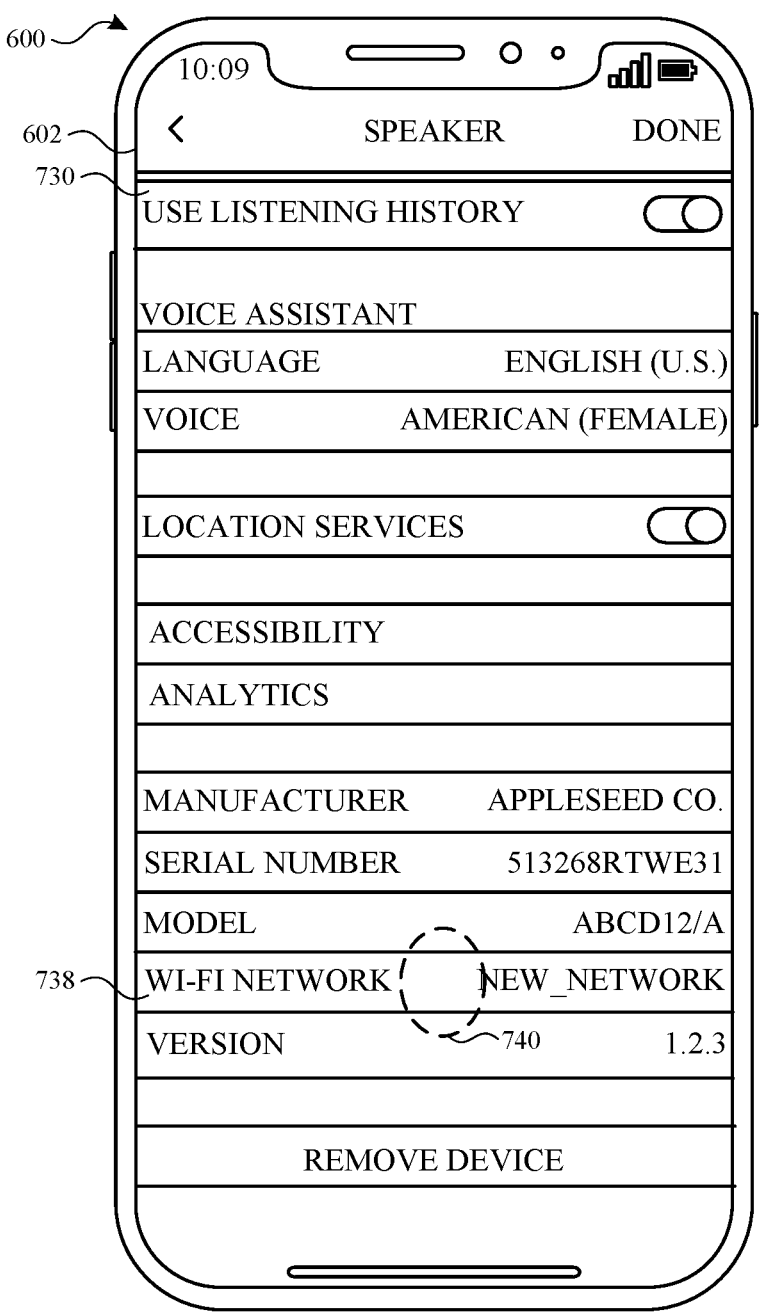
Figure 7J:
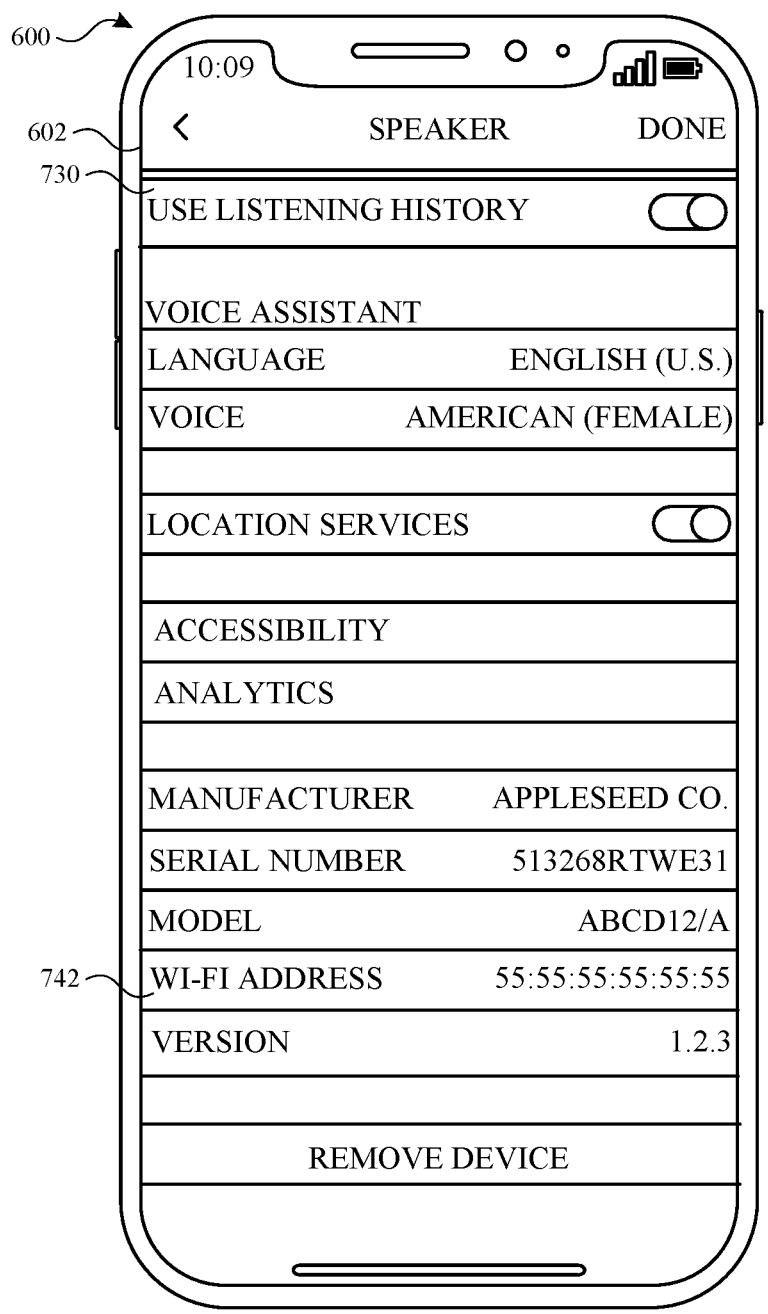

FIGS. 7H-7J illustrate exemplary interfaces for displaying additional information associated with an external device. As shown in FIG. 7H, device detail interface 730 includes a list of several options for viewing or toggling settings and information associated with device 606 (e.g., "MUSIC & PODCAST" settings, "VOICE ASSISTANT" settings). In this example, the list is scrollable. In FIG. 7H, device 600 receives user input 736 representing an upward swipe gesture at device detail user interface 730.

At FIG. 7I, device 600 has scrolled the display of device detail user interface 730 upward, in response to user input 736, to reveal additional settings and information regarding device 606. For example, device 600 now displays identifying information associated with device 606 (e.g., "SERIAL NUMBER", "MODEL"), including an identifier 738 labeled "WI-FI NETWORK" that provides information regarding a wireless network that device 606 is currently connected to. As shown in FIG. 7I, identifier 738 indicates that device 606 is currently connected to the Wi-Fi network with the SSID "NEW_NETWORK" (connected to in response to receiving user input 734).

In some embodiments, an identifier (e.g., 738) of the current wireless network of the external device (e.g., 606) is selectable. For example, at FIG. 7I, device 600 receives user input 740 (e.g., a tap) representing selection of identifier 738. In some embodiments, in response to selection of an identifier (e.g., 738), the device displays a media access control address (also referred to as a "MAC address" or a "Wi-Fi address"). For example, in FIG. 7J, identifier 738 has been replaced by identifier 742 labeled "WI-FI ADDRESS" that includes the Wi-Fi address "55:55:55:55:55:55". In this way, the user can use device 600 to access this information which can be used to uniquely identify the external device on the local area network, for example, to configure a permissions setting associated with the local area network (e.g., configure a network router to allow the external device to connect to the network "NEW_NETWORK").

FIGS. 8A-8C is a flow diagram illustrating a method for 800 using an electronic device in accordance with some embodiments. Method 800 is performed at a device (e.g., 100, 300, 500, 580) with a display and one or more wireless antennas. Some operations in method 800 are, optionally, combined, the orders of some operations are, optionally, changed, and some operations are, optionally, omitted.

As described below, method 800 provides an intuitive way for managing network connection settings of an external device. The method reduces the cognitive burden on a user for managing network connection settings of an external device, thereby creating a more efficient human-machine interface. For battery-operated computing devices, enabling a user to manage network connection settings of an external device faster and more efficiently conserves power and increases the time between battery charges.

The electronic device (e.g., 600), while the electronic device is connected, via the one or more wireless antennas, to a first local area network (e.g., a first Wi-Fi network, a Wi-Fi network having a first SSID), displays (802) a first external device management interface (e.g., 700, 712, 720, 730), wherein: the first external device management interface is associated with a first external device (e.g., 606) (e.g., a smart speaker, a smart watch, a Wi-Fi connected accessory (e.g., a connected light)) that is not connected to the first local area network (e.g., the network with SSID "NEW_NETWORK" described above with respect to FIG. 7E) (e.g., the external device is connected to a second local area network (e.g., "OLD_NETWORK" as described above) that is different than the first local area network; the external device is not currently connected to a local area network); and the first external device management interface includes a first affordance (e.g., 732 as shown in FIG. 7E).

The electronic device (e.g., 600) receives (804) a user input (e.g., 734) (e.g., a tap gesture on the affordance, a mouse click on the affordance) corresponding to selection of the first affordance (e.g., 732 as shown in FIG. 7E).

In response to receiving the user input (e.g., 734) corresponding to selection of the first affordance (e.g., 732), the electronic device (e.g., 600) causes (806) the first external device (e.g., 606) to (e.g., sends an instruction to the first external device to) connect to the first local area network (e.g., and disconnect from the second local area network).

Causing a first external device to connect to a first location area network in response to selection of an affordance at an external device management interface provides the user with an efficient means for updating network connection settings of the external device, reducing the number of inputs needed for doing so, and provides the user with more control of the external device. Providing more control of the external device to the user enhances the operability of the external device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the first external device management interface (e.g., 730), the electronic device (e.g., 600) receives (808) a request (e.g., user input selection of device representation 702; user input 714 or 726) to display an external device management interface (e.g., an interface for viewing and/or controlling one or more settings of an external device; the first external device management interface or an external device management interface different than the first external device management interface). In response to receiving (810) the request to display the external device management interface: in accordance with a determination that a set of network condition criteria are met, the set of network condition criteria including a criterion that is met when the first external device is connected to a local area network (e.g., "OLD_NETWORK" as described above) that is different than a local area network (e.g., "NEW_NETWORK as described above) that the electronic device is (e.g., currently) connected to, the electronic device displays (812) the first external device management interface (e.g., 730 as shown in FIG. 7E); and in accordance with a determination that the set of network condition criteria are not met, the electronic device displays (814) a second external device management interface (e.g., 730 as shown in FIG. 7G) that does not include the first affordance (e.g., 732 is not shown in FIG. 7G) (e.g., does not include an affordance that, when selected, causes the first external device to switch to a different local area network).

Displaying a first external device management interface (that includes a first affordance) or a second external device management interface (that does not include a first affordance) dependent on a determination of whether a set of network condition criteria are met provides the user with feedback about the current state of the external device and provides visual feedback to the user indicating that the network settings associated with the external device either do or do not require attention. Providing improved visual feedback to the user enhances the operability of the external device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of network condition criteria includes a criterion that is met when the electronic device (e.g., 600) and the first external device (e.g., 606) satisfy a proximity requirement (e.g., a proximity condition or threshold distance) (e.g., devices are within a predetermined distance of each other (e.g., as determined by GPS or other localization technology); the devices are within range of a communication protocol (e.g., Bluetooth, peer-to-peer Wi-Fi) that requires proximity). In some embodiments, the affordance (e.g., 732) for causing the first external device to connect to the same local area network as the electronic device is not displayed if the devices are not within proximity of each other (e.g., interface 730 is displayed as shown in FIG. 7G, which does not include affordance 732).

Displaying a first external device management interface (that includes a first affordance) or a second external device management interface (that does not include a first affordance) dependent on a determination of whether a set of network condition criteria are met, wherein the criteria include criterion met when a an electronic device and an external device meet a proximity condition, provides the user with feedback about the current state of the external device and provides visual feedback to the user indicating that the network settings associated with the external device either do or do not require attention, while also preventing the display of false errors. Providing improved visual feedback to the user enhances the operability of the external device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first external device management interface (e.g., 730) includes a second affordance (e.g., 738). The electronic device (e.g., 600) receives (822) a user input (e.g., 740) corresponding to selection of the second affordance. In response to receiving the user input corresponding to selection of the second affordance, the electronic device displays (824) a media access control address (e.g., a Wi-Fi address) of the first external device (e.g., WI-FI ADDRESS 55:55:55:55:55:55 as shown in identifier 742 of FIG. 7J).

In some embodiments, the second affordance (e.g., 738) includes an indication (e.g., a textual indication) of the local area network that the first external device (e.g., 606) is (e.g., currently) connected to (e.g., identifier 738 of FIG. 7I identifies the network named "NEW_NETWORK"), and displaying the media access control address of the first external device includes: replacing (826) the indication of the local area network that the first external device is connected to with the media access control address of the first external device. For example, in response to receiving user input 740 at FIG. 7I, device 600 replaces display of identifier 738 with identifier 742 as shown in FIG. 7J.

In some embodiments, the first external device management interface (e.g., 730) includes a third affordance (e.g., affordances labeled "INCLUDE IN FAVORITES" or "USE LISTENING HISTORY" as shown in FIG. 7H) associated with a setting (e.g., a setting affecting the availability of digital assistant access from the first external device, a setting affecting whether the first external device is designated as a favorite external device; a non-local-area-network-related setting) of the first external device (e.g., 606). The electronic device (e.g., 600) receives a user input corresponding to selection of the third affordance. In response to the user input corresponding to selection of the third affordance, the electronic device modifies the setting of the first external device (e.g., toggles the setting from a current value to a modified value, enabling or disabling a function associated with the setting). In some embodiments, the first external device management interface (e.g., 730) is an interface dedicated to viewing and/or controlling one or more settings of (e.g., only) the first external device. For example, interface 730 is dedicated to the settings associated specifically with device 606 (e.g., and no other devices). In some embodiments, the third affordance includes, or corresponds to, an indication (e.g., text) of the current value of the setting (e.g., left/right toggling affordance next to "INCLUDE IN FAVORITES" indicates an enabled or disabled state (e.g., left or right) of the setting; the "ACCOUNT" setting includes an indication of the email address "JAPPLESEED@EMAIL.COM").

In some embodiments, the first external device management (e.g., 700, 712) interface includes an affordance (e.g., 704) associated with a second external device (e.g., a lamp), different than the first external device (e.g., 606). In some embodiments, the affordance associated with the second external device, when selected, causes display of a user interface for viewing and/or controlling one or more settings of the second external device. For example, an interface similar to 730 can be displayed, but dedicated to settings associated with the lamp corresponding to device representation 704. In some embodiments, the affordance associated with the second external device, when selected, causes modification of a setting of the second electronic device. For example, selection (e.g., a tap) of device representation can cause the lamp to toggle being "ON" or "OFF". In some embodiments, the first external device management interface (e.g., 700, 712) is a centralized interface that displays the status of multiple external devices. For example, interfaces 700 and 712 are both centralized interfaces, which include statuses corresponding to multiple external devices (e.g., corresponding to 702 and 704).

In some embodiments, prior to displaying the first external device management interface (e.g., 730), the electronic device displays (816) a third external device management interface (e.g., 700) (e.g., an initial interface of an external device management application), including: an indication (e.g., 706, 716) (e.g., a non-selectable textual or graphical indicia) that one or more external devices (e.g., 606) (e.g., Wi-Fi connectable devices) are not connected to the first local area network (e.g., the network "NEW_NETWORK" as described above).

In some embodiments, the third external device management includes (e.g., 700) a fourth affordance (e.g., 708) associated with the first external device management interface (e.g., 712. 730). The electronic device (e.g., 600) receives (818) a user input (e.g., 710) corresponding to selection of the fourth affordance (e.g., 708). In response to receiving the user input corresponding to selection of the fourth affordance, the electronic device (e.g., 600) displays (820) the first external device management interface (e.g., 712, 730).

In some embodiments, the first external device management (e.g., 700, 712, 720, 730) interface includes (828) a second indication (e.g., 702A, 706, 716, 722) (e.g., a non-selectable textual or graphical indicia) that one or more external devices (e.g., 606) (e.g., Wi-Fi connectable devices; the first external device) are not connected to the first local area network (e.g., the network named "NEW_NETWORK" as described above). In some embodiments, the second indication (e.g., 702A) is textual indication that is displayed as part of a graphical identifier (e.g., 702) of the external device that the indication corresponds to (e.g., a tile associated with the relevant external device). In some embodiments, the second indication (e.g., 706, 716, 722) is a textual indication that is displayed in a region dedicated to displaying status indications for external devices that is separate from graphical identifiers (e.g., 702, 704) of those devices. For example, status messages 706, 716, and 722 are displayed separate from identifiers 702 and 704 (e.g., status message 716 is displayed above ATTENTION region of interface 712).

Displaying an indication that one or more external devices are not connected to the first local area network provides the user with feedback about the current state of one or more external devices and provides visual feedback to the user indicating that the network settings associated with the external device either do or do not require attention. Providing improved visual feedback to the user enhances the operability of the external device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in response to receiving the user input (e.g., 734) corresponding to selection of the first affordance (e.g., 732), the electronic device (e.g., 600) ceases to display (830) the second indication (e.g., 706, 716, 722) that one or more external devices are not connected to the first local area network. For example, in FIGS. 7F and 7G, status message 722 is no longer displayed. In some embodiments, the second indication is replaced by an indication that a the local area network that the first external device is connected to is being updated (e.g., as shown in FIG. 7F). In some embodiments, the second indication is replaced by an indication of a current status of the first electronic device, other than a local area network connection status. For example, in FIG. 7G, status message 702A is no longer displayed, and a status related to the playback of the device is displayed ("PAUSED").

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the management of network connection settings of an external device associated with a user. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted messages relevant to the management of network connection settings of an external device associated with a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of management of network connection settings of an external device associated with a user, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, network management notifications can be determined and delivered to users by inferring preferences based on non-personal information data or a bare minimum amount of personal information, such as the content being requested by the device associated with a user, other non-personal information available to a device management application, or publicly available information.

What is claimed is:

1. An electronic device, comprising:
a display;
one or more wireless antennas;
one or more processors; and
memory storing one or more programs configured to be executed by the one or more processors, the one or more programs including instructions for:
while the electronic device is connected, via the one or more wireless antennas, to a first local area network, receiving a request to display an external device management interface;
in response to receiving the request to display the external device management interface:
in accordance with a determination that a set of network condition criteria are met, the set of network condition criteria including a criterion that is met when a first external device is connected to a second local area network that is different than the first local area network that the electronic device is connected to, displaying a first external device management interface, wherein:
the first external device management interface is associated with the first external device that is not connected to the first local area network; and
the first external device management interface includes a first affordance;
in accordance with a determination that the set of network condition criteria are not met, displaying a second external device management interface that does not include the first affordance;
while displaying the first external device management interface, receiving a user input corresponding to selection of the first affordance; and
in response to receiving the user input corresponding to selection of the first affordance, causing the first external device to disconnect from the second local area network and connect to the first local area network.

2. The electronic device of claim 1, wherein the set of network condition criteria includes a criterion that is met when the electronic device and the first external device satisfy a proximity requirement.

3. The electronic device of claim 1, wherein the first external device management interface includes a second affordance, the one or more programs further including instructions for:
receiving a user input corresponding to selection of the second affordance;
in response to receiving the user input corresponding to selection of the second affordance, displaying a media access control address of the first external device.

4. The electronic device of claim 3, wherein:
the second affordance includes an indication of the local area network that the first external device is connected to, and
displaying the media access control address of the first external device includes:
replacing the indication of the local area network that the first external device is connected to with the media access control address of the first external device.

5. The electronic device of claim 1, wherein the first external device management interface includes a third affordance associated with a setting of the first external device, the one or more programs further including instructions for:
receiving a user input corresponding to selection of the third affordance; and
in response to the user input corresponding to selection of the third affordance, modifying the setting of the first external device.

6. The electronic device of claim 1, wherein the first external device management interface includes an affordance associated with a second external device, different than the first external device.

7. The electronic device of claim 1, the one or more programs further including instructions for:
prior to displaying the first external device management interface, displaying a third external device management interface, including:
an indication that one or more external devices are not connected to the first local area network.

8. The electronic device of claim 7, wherein the third external device management includes a fourth affordance associated with the first external device management interface, the one or more programs further including instructions for:
receiving a user input corresponding to selection of the fourth affordance; and
in response to receiving the user input corresponding to selection of the fourth affordance, displaying the first external device management interface.

9. The electronic device of claim 1, wherein the first external device management interface includes a second indication that one or more external devices are not connected to the first local area network.

10. The electronic device of claim 9, the one or more programs further including instructions for:
further in response to receiving the user input corresponding to selection of the first affordance, ceasing to display the second indication that one or more external devices are not connected to the first local area network.

11. A non-transitory computer-readable storage medium storing one or more programs configured to be executed by one or more processors of an electronic device with a display and one or more wireless antennas, the one or more programs including instructions for:
while the electronic device is connected, via the one or more wireless antennas, to a first local area network, receiving a request to display an external device management interface;
in response to receiving the request to display the external device management interface:
in accordance with a determination that a set of network condition criteria are met, the set of network condition criteria including a criterion that is met when a first external device is connected to a second local area network that is different than the first local area network that the electronic device is connected to, displaying a first external device management interface, wherein:
the first external device management interface is associated with the first external device that is not connected to the first local area network; and
the first external device management interface includes a first affordance;
in accordance with a determination that the set of network condition criteria are not met, displaying a second external device management interface that does not include the first affordance;

while displaying the first external device management interface, receiving a user input corresponding to selection of the first affordance; and in response to receiving the user input corresponding to selection of the first affordance, causing the first external device to disconnect from the second local area network and connect to the first local area network.

12. The non-transitory computer-readable storage medium of claim 11, wherein the set of network condition criteria includes a criterion that is met when the electronic device and the first external device satisfy a proximity requirement.

13. The non-transitory computer-readable storage medium of claim 11, wherein the first external device management interface includes a second affordance, the one or more programs further including instructions for:

receiving a user input corresponding to selection of the second affordance;

in response to receiving the user input corresponding to selection of the second affordance, displaying a media access control address of the first external device.

14. The non-transitory computer-readable storage medium of claim 13, wherein:

the second affordance includes an indication of the local area network that the first external device is connected to, and displaying the media access control address of the first external device includes:

replacing the indication of the local area network that the first external device is connected to with the media access control address of the first external device.

15. The non-transitory computer-readable storage medium of claim 11, wherein the first external device management interface includes a third affordance associated with a setting of the first external device, the one or more programs further including instructions for:

receiving a user input corresponding to selection of the third affordance; and in response to the user input corresponding to selection of the third affordance, modifying the setting of the first external device.

16. The non-transitory computer-readable storage medium of claim 11, wherein the first external device management interface includes an affordance associated with a second external device, different than the first external device.

17. The non-transitory computer-readable storage medium of claim 11, the one or more programs further including instructions for:

prior to displaying the first external device management interface, displaying a third external device management interface, including:

an indication that one or more external devices are not connected to the first local area network.

18. The non-transitory computer-readable storage medium of claim 17, wherein the third external device management includes a fourth affordance associated with the first external device management interface, the one or more programs further including instructions for:

receiving a user input corresponding to selection of the fourth affordance; and in response to receiving the user input corresponding to selection of the fourth affordance, displaying the first external device management interface.

19. The non-transitory computer-readable storage medium of claim 11, wherein the first external device management interface includes a second indication that one or more external devices are not connected to the first local area network.

20. The non-transitory computer-readable storage medium of claim 19, the one or more programs further including instructions for:

further in response to receiving the user input corresponding to selection of the first affordance, ceasing to display the second indication that one or more external devices are not connected to the first local area network.

21. A method comprising:

at an electronic device with a display and one or more wireless antennas:

while the electronic device is connected, via the one or more wireless antennas, to a first local area network, receiving a request to display an external device management interface;

in response to receiving the request to display the external device management interface:

in accordance with a determination that a set of network condition criteria are met, the set of network condition criteria including a criterion that is met when a first external device is connected to a second local area network that is different than the first local area network that the electronic device is connected to, displaying a first external device management interface, wherein:

the first external device management interface is associated with the first external device that is not connected to the first local area network; and the first external device management interface includes a first affordance;

in accordance with a determination that the set of network condition criteria are not met, displaying a second external device management interface that does not include the first affordance;

while displaying the first external device management interface, receiving a user input corresponding to selection of the first affordance; and in response to receiving the user input corresponding to selection of the first affordance, causing the first external device to disconnect from the second local area network and connect to the first local area network.

22. The method of claim 21, wherein the set of network condition criteria includes a criterion that is met when the electronic device and the first external device satisfy a proximity requirement.

23. The method of claim 21, wherein the first external device management interface includes a second affordance, further comprising:

receiving a user input corresponding to selection of the second affordance;

in response to receiving the user input corresponding to selection of the second affordance, displaying a media access control address of the first external device.

24. The method of claim 23, wherein:
the second affordance includes an indication of the local area network that the first external device is connected to, and
displaying the media access control address of the first external device includes:
replacing the indication of the local area network that the first external device is connected to with the media access control address of the first external device.

25. The method of claim 21, wherein the first external device management interface includes a third affordance associated with a setting of the first external device, further comprising:
receiving a user input corresponding to selection of the third affordance; and
in response to the user input corresponding to selection of the third affordance, modifying the setting of the first external device.

26. The method of claim 21, wherein the first external device management interface includes an affordance associated with a second external device, different than the first external device.

27. The method of claim 21, further comprising:
prior to displaying the first external device management interface, displaying a third external device management interface, including:
an indication that one or more external devices are not connected to the first local area network.

28. The method of claim 27, wherein the third external device management includes a fourth affordance associated with the first external device management interface, further comprising:
receiving a user input corresponding to selection of the fourth affordance; and
in response to receiving the user input corresponding to selection of the fourth affordance, displaying the first external device management interface.

29. The method of claim 21, wherein the first external device management interface includes a second indication that one or more external devices are not connected to the first local area network.

30. The method of claim 29, further comprising:
further in response to receiving the user input corresponding to selection of the first affordance, ceasing to display the second indication that one or more external devices are not connected to the first local area network.

* * * * *